US008020183B2

(12) United States Patent
Ferman et al.

(10) Patent No.: US 8,020,183 B2
(45) Date of Patent: Sep. 13, 2011

(54) AUDIOVISUAL MANAGEMENT SYSTEM

(75) Inventors: Ahmet Mufit Ferman, Vancouver, WA (US); Petrus J. L. van Beek, Vancouver, WA (US); James H. Errico, Portland, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 2310 days.

(21) Appl. No.: 09/823,377

(22) Filed: Mar. 30, 2001

(65) Prior Publication Data

US 2002/0059584 A1 May 16, 2002

Related U.S. Application Data

(60) Provisional application No. 60/232,377, filed on Sep. 14, 2000.

(51) Int. Cl.
*H04N 7/16* (2006.01)
*H04N 5/445* (2006.01)

(52) U.S. Cl. ............... 725/46; 725/50; 725/10; 709/223

(58) Field of Classification Search .............. 725/46–49, 725/87–105, 116, 10–21; 709/223, 231–233
See application file for complete search history.

(56) References Cited

U.S. PATENT DOCUMENTS

| | | | |
|---|---|---|---|
| 4,183,056 | A | 1/1980 | Evans et al. |
| 4,253,108 | A | 2/1981 | Engel |
| 4,298,884 | A | 11/1981 | Reneau |
| 4,321,635 | A | 3/1982 | Tsuyuguchi |
| 4,324,402 | A | 4/1982 | Klose |
| 4,520,404 | A | 5/1985 | Von Kohorn |
| 4,729,044 | A | 3/1988 | Kiesel |
| 4,937,685 | A | 6/1990 | Barker et al. |
| 5,012,334 | A | 4/1991 | Etra |
| 5,027,400 | A | 6/1991 | Baji et al. |
| 5,101,364 | A | 3/1992 | Davenport et al. |
| 5,109,482 | A | 4/1992 | Bohrman |
| 5,148,154 | A | 9/1992 | MacKay et al. |
| 5,200,825 | A | 4/1993 | Perine |
| 5,222,924 | A | 6/1993 | Shin et al. |
| 5,223,924 | A | 6/1993 | Strubbe |
| 5,241,671 | A | 8/1993 | Reed et al. |
| 5,288,069 | A | 2/1994 | Matsumoto |
| D348,251 | S | 6/1994 | Hendricks |
| 5,333,091 | A | 7/1994 | Iggulden et al. |
| 5,339,393 | A | 8/1994 | Duffy et al. |
| D354,059 | S | 1/1995 | Hendricks |
| 5,381,477 | A | 1/1995 | Beyers, II et al. |
| 5,404,316 | A | 4/1995 | Klingler et al. |
| 5,410,344 | A | 4/1995 | Graves et al. |

(Continued)

FOREIGN PATENT DOCUMENTS

EP 0 854 645 7/1998

(Continued)

OTHER PUBLICATIONS

ISO/IEC JTC1/SC29/WG11 N2859, *MPEG-U Requirements Document V. 9*, Jul. 1999, Vancouver, Canada.

(Continued)

*Primary Examiner* — Annan Q Shang
(74) *Attorney, Agent, or Firm* — Chernoff, Vilhauer, McClung & Stenzel

(57) ABSTRACT

A system for structuring usage history for audiovisual materials.

29 Claims, 60 Drawing Sheets

U.S. PATENT DOCUMENTS 5,424,770 A 6/1995 Schmelzer et al.
5,434,678 A 7/1995 Abecassis
5,444,499 A 8/1995 Saitoh
5,452,016 A 9/1995 Ohara et al.
5,459,830 A 10/1995 Ohba et al.
5,483,278 A 1/1996 Strubbe et al.
D368,263 S 3/1996 Hendricks
5,521,841 A 5/1996 Arman et al.
5,550,965 A 8/1996 Gabbe et al.
5,559,549 A 9/1996 Hendricks et al.
5,589,945 A 12/1996 Abecassis
5,600,364 A 2/1997 Hendricks et al.
5,600,573 A 2/1997 Hendricks et al.
5,600,781 A 2/1997 Root et al.
5,610,653 A 3/1997 Abecassis
5,634,849 A 6/1997 Abecassis
5,635,982 A 6/1997 Zhang et al.
D381,991 S 8/1997 Hendricks
5,654,769 A 8/1997 Ohara et al.
5,659,350 A 8/1997 Hendricks et al.
5,664,046 A 9/1997 Abecassis
5,664,227 A 9/1997 Mauldin et al.
5,675,752 A 10/1997 Scott et al.
5,682,195 A 10/1997 Hendricks et al.
5,682,460 A 10/1997 Hyziak et al.
5,684,918 A 11/1997 Abecassis
5,694,163 A 12/1997 Harrison
5,696,869 A 12/1997 Abecassis
5,696,965 A 12/1997 Dedrick
5,710,884 A 1/1998 Dedrick
5,717,814 A 2/1998 Abecassis
5,717,879 A 2/1998 Moran et al.
5,717,923 A 2/1998 Dedrick
5,724,472 A 3/1998 Abecassis
5,727,129 A 3/1998 Barrett et al.
5,732,216 A 3/1998 Logan et al.
5,734,853 A 3/1998 Hendricks et al.
5,751,953 A 5/1998 Shiels et al.
5,758,257 A 5/1998 Herz et al.
5,758,259 A 5/1998 Lawler
5,761,881 A 6/1998 Wall
5,764,916 A 6/1998 Busey et al.
5,774,357 A 6/1998 Hoffberg et al.
5,774,666 A 6/1998 Portuesi
5,778,108 A 7/1998 Coleman, Jr.
5,781,188 A 7/1998 Amiot et al.
5,794,210 A 8/1998 Goldhaber et al.
5,797,001 A 8/1998 Augenbraun et al.
5,798,785 A 8/1998 Hendricks et al.
5,805,733 A 9/1998 Wang et al.
5,809,426 A * 9/1998 Radojevic et al. ............ 455/502
5,821,945 A 10/1998 Yeo et al.
5,822,537 A 10/1998 Katseff et al.
5,828,809 A 10/1998 Chang et al.
5,828,839 A 10/1998 Moncreiff
5,835,087 A 11/1998 Herz et al.
D402,310 S 12/1998 Hendricks
5,848,396 A 12/1998 Gerace
5,857,190 A 1/1999 Brown
5,861,881 A 1/1999 Freeman et al.
5,867,226 A 2/1999 Wehmeyer et al.
5,867,386 A 2/1999 Hoffberg et al.
5,875,107 A 2/1999 Nagai et al.
5,875,108 A 2/1999 Hoffberg et al.
5,877,821 A 3/1999 Newlin et al.
5,878,222 A 3/1999 Harrison
5,892,536 A 4/1999 Logan et al.
5,900,867 A 5/1999 Schindler et al.
5,901,246 A 5/1999 Hoffberg et al.
5,903,454 A 5/1999 Hoffberg et al.
5,907,324 A * 5/1999 Larson et al. ................ 715/753
5,913,013 A 6/1999 Abecassis
5,913,030 A * 6/1999 Lotspiech et al. ............ 709/203
5,920,300 A 7/1999 Yamazaki et al.
5,920,360 A 7/1999 Coleman, Jr.
5,920,477 A 7/1999 Hoffberg et al.
5,923,365 A 7/1999 Tamir et al.
5,926,624 A 7/1999 Katz et al.
5,930,783 A 7/1999 Li et al.
5,933,811 A 8/1999 Angles et al.
5,945,988 A * 8/1999 Williams et al. .............. 715/747
5,956,026 A 9/1999 Ratakonda
5,956,037 A * 9/1999 Osawa et al. ................ 345/418
5,958,006 A 9/1999 Eggleston et al.
5,959,681 A 9/1999 Cho
5,959,697 A 9/1999 Coleman, Jr.
5,969,755 A 10/1999 Courtney
5,973,683 A 10/1999 Cragun et al.
5,977,964 A 11/1999 Williams et al.
5,986,690 A 11/1999 Hendricks
5,986,692 A 11/1999 Logan et al.
5,987,211 A 11/1999 Abecassis
5,990,927 A 11/1999 Hendricks et al.
5,990,980 A 11/1999 Golin
5,995,094 A 11/1999 Eggen
5,995,095 A 11/1999 Ratakonda
6,002,833 A 12/1999 Abecassis
6,005,565 A 12/1999 Legall et al.
6,005,597 A 12/1999 Barrett et al.
6,006,265 A 12/1999 Rangan et al.
6,011,895 A 1/2000 Abecassis
6,014,183 A 1/2000 Hoang
6,020,883 A 2/2000 Herz et al.
6,029,195 A 2/2000 Herz
6,038,367 A 3/2000 Abecassis
6,041,323 A 3/2000 Kubota
6,049,821 A 4/2000 Theriault et al.
6,052,554 A 4/2000 Hendricks et al.
6,055,018 A 4/2000 Swan
6,055,569 A 4/2000 O'Brien et al.
6,060,167 A 5/2000 Morgan et al.
6,064,385 A 5/2000 Sturgeon et al.
6,064,449 A 5/2000 White et al.
6,067,401 A 5/2000 Abecassis
6,070,167 A 5/2000 Qian et al.
6,072,934 A 6/2000 Abecassis
6,076,166 A 6/2000 Moshfeghi et al.
6,078,917 A 6/2000 Paulsen, Jr. et al.
6,078,928 A * 6/2000 Schnase et al. ............ 707/104.1
6,081,278 A 6/2000 Chen
6,081,750 A 6/2000 Hoffberg et al.
6,088,455 A 7/2000 Logan et al.
6,088,722 A * 7/2000 Herz et al. .................... 709/217
6,091,886 A 7/2000 Abecassis
RE36,801 E 8/2000 Logan et al.
6,100,941 A 8/2000 Dimitrova et al.
6,115,709 A 9/2000 Gilmour et al.
6,122,657 A 9/2000 Hoffman, Jr. et al.
6,128,624 A 10/2000 Papierniak et al.
6,133,909 A 10/2000 Schein et al.
6,137,486 A 10/2000 Yoshida et al.
6,141,041 A 10/2000 Carlbom et al.
6,141,060 A 10/2000 Honey et al.
6,144,375 A 11/2000 Jain et al.
6,151,444 A 11/2000 Abecassis
D435,561 S 12/2000 Pettigrew et al.
6,157,377 A 12/2000 Shah-Nazaroff et al.
6,160,989 A 12/2000 Hendricks et al.
6,161,142 A 12/2000 Wolfe et al.
6,163,316 A 12/2000 Killian
6,163,779 A 12/2000 Mantha et al.
6,169,542 B1 1/2001 Hooks et al.
6,177,931 B1 * 1/2001 Alexander et al. .............. 725/52
6,181,335 B1 1/2001 Hendricks et al.
6,185,625 B1 2/2001 Tso et al.
6,195,497 B1 2/2001 Nagasaka et al.
6,198,767 B1 3/2001 Greenfield et al.
6,199,076 B1 3/2001 Logan et al.
6,201,536 B1 3/2001 Hendricks et al.
6,208,805 B1 3/2001 Abecassis
6,212,527 B1 4/2001 Gustman
6,215,526 B1 4/2001 Barton et al.
6,216,129 B1 4/2001 Eldering
6,219,837 B1 4/2001 Yeo et al.
6,226,678 B1 * 5/2001 Mattaway et al. ............ 709/230
6,230,172 B1 5/2001 Purnaveja et al.
6,230,501 B1 5/2001 Bailey, Sr. et al.

6,233,289 B1 5/2001 Fredrickson
6,233,389 B1 5/2001 Barton et al.
6,233,586 B1 5/2001 Chang et al.
6,233,590 B1 5/2001 Shaw et al.
6,236,395 B1 5/2001 Sezan et al.
6,240,406 B1 5/2001 Tannen
6,252,544 B1 6/2001 Hoffberg
6,253,203 B1 6/2001 O'Flaherty et al.
6,269,216 B1 7/2001 Abecassis
6,275,268 B1 8/2001 Ellis et al.
6,286,140 B1 * 9/2001 Ivanyi ............................ 725/14
6,286,141 B1 9/2001 Browne et al.
6,289,165 B1 9/2001 Abecassis
6,298,482 B1 * 10/2001 Seidman et al. .............. 725/101
6,304,665 B1 10/2001 Cavallaro et al.
6,304,715 B1 10/2001 Abecassis
6,311,189 B1 10/2001 DeVries et al.
6,317,718 B1 11/2001 Fano
6,317,881 B1 11/2001 Shah-Nazaroff et al.
6,320,624 B1 11/2001 Ayer et al.
6,324,338 B1 11/2001 Wood et al.
6,339,842 B1 1/2002 Fernandez et al.
6,342,904 B1 1/2002 Vasudevan et al.
6,353,444 B1 3/2002 Katta et al.
6,363,160 B1 3/2002 Bradski et al.
6,363,380 B1 3/2002 Dimitrova
6,370,504 B1 4/2002 Zick et al.
6,370,688 B1 4/2002 Hejna, Jr.
6,374,404 B1 4/2002 Brotz et al.
6,405,371 B1 6/2002 Oosterhout et al.
6,412,008 B1 6/2002 Fields et al.
6,418,168 B1 7/2002 Narita
6,421,680 B1 7/2002 Kumhyr et al.
6,425,133 B1 7/2002 Leary
6,426,761 B1 7/2002 Kanevsky et al.
6,426,974 B2 7/2002 Takahashi et al.
6,438,579 B1 8/2002 Hosken
6,439,572 B1 8/2002 Bowen
6,446,261 B1 9/2002 Rosser
6,470,378 B1 10/2002 Tracton et al.
6,480,667 B1 11/2002 O'Connor
6,487,390 B1 11/2002 Virine et al.
6,490,320 B1 12/2002 Vetro et al.
6,498,783 B1 12/2002 Lin
6,522,342 B1 2/2003 Gagnon et al.
6,530,082 B1 * 3/2003 Del Sesto et al. ................. 725/9
6,535,639 B1 3/2003 Uchihachi et al.
6,542,546 B1 4/2003 Vetro et al.
6,543,053 B1 4/2003 Li et al.
6,546,555 B1 4/2003 Hjelsvold et al.
6,549,643 B1 4/2003 Toklu et al.
6,553,178 B2 4/2003 Abecassis
6,556,767 B2 4/2003 Okayama et al.
6,571,279 B1 * 5/2003 Herz et al. .................... 709/217
6,578,075 B1 6/2003 Nieminen et al.
6,581,207 B1 6/2003 Sumita et al.
6,587,127 B1 7/2003 Leeke et al.
6,593,936 B1 7/2003 Huang et al.
6,594,699 B1 * 7/2003 Sahai et al. ................... 709/228
6,597,859 B1 7/2003 Leinhart et al.
6,611,876 B1 8/2003 Barrett et al.
6,614,987 B1 9/2003 Ismail et al.
6,621,895 B1 9/2003 Giese
6,628,302 B2 9/2003 White et al.
6,637,029 B1 * 10/2003 Maissel et al. .................. 725/46
6,637,032 B1 10/2003 Feinleib
6,658,095 B1 12/2003 Yoakum et al.
6,665,423 B1 12/2003 Mehrotra et al.
6,675,158 B1 1/2004 Rising et al.
6,678,635 B2 1/2004 Tovinkere et al.
6,678,659 B1 1/2004 Van Kommer
6,681,395 B1 1/2004 Nishi
6,691,126 B1 2/2004 Syeda-Mahmood
6,697,523 B1 2/2004 Divakaran et al.
6,704,929 B1 * 3/2004 Ozer et al. ...................... 725/13
6,724,933 B1 4/2004 Lin et al.
6,741,655 B1 5/2004 Chang et al.
6,754,904 B1 6/2004 Cooper et al.
6,754,906 B1 6/2004 Finseth et al.
6,766,362 B1 * 7/2004 Miyasaka et al. ............. 709/219
6,774,917 B1 8/2004 Foote et al.
6,810,200 B1 10/2004 Aoyama et al.
6,813,775 B1 11/2004 Finseth et al.
6,820,278 B1 11/2004 Ellis
6,829,781 B1 12/2004 Bhagavath et al.
6,868,440 B1 3/2005 Gupta et al.
6,880,171 B1 4/2005 Ahmad et al.
6,898,762 B2 * 5/2005 Ellis et al. ..................... 715/716
6,925,455 B2 8/2005 Gong et al.
6,931,595 B2 8/2005 Pan et al.
6,934,964 B1 8/2005 Schaffer et al.
6,961,954 B1 11/2005 Maybury et al.
6,970,510 B1 11/2005 Wee et al.
6,971,105 B1 11/2005 Weber et al.
6,981,129 B1 12/2005 Boggs et al.
6,983,478 B1 1/2006 Grauch et al.
6,990,679 B2 1/2006 Curreri
6,993,245 B1 1/2006 Harville
7,003,792 B1 2/2006 Yuen
7,026,964 B2 4/2006 Baldwin et al.
7,055,168 B1 5/2006 Errico et al.
7,065,709 B2 6/2006 Ellis et al.
7,096,486 B1 8/2006 Ukai et al.
7,127,735 B1 * 10/2006 Lee et al. ........................ 725/87
7,130,866 B2 10/2006 Schaffer
7,136,710 B1 11/2006 Hoffberg et al.
7,146,626 B1 12/2006 Arsenault et al.
7,150,030 B1 12/2006 Eldering et al.
7,185,355 B1 2/2007 Ellis et al.
7,199,798 B1 4/2007 Echigo et al.
7,249,366 B1 7/2007 Flavin
7,296,285 B1 11/2007 Jun et al.
7,343,381 B2 3/2008 Shin
7,380,262 B2 5/2008 Wang et al.
7,454,775 B1 11/2008 Schaffer et al.
2001/0030664 A1 * 10/2001 Shulman et al. .............. 345/835
2001/0043744 A1 11/2001 Hieda
2002/0013943 A1 1/2002 Haberman et al.
2002/0018594 A1 2/2002 Xu et al.
2002/0026345 A1 * 2/2002 Juels .............................. 705/10
2002/0069218 A1 6/2002 Sull et al.
2002/0079165 A1 6/2002 Wolfe
2002/0080162 A1 6/2002 Pan et al.
2002/0083473 A1 6/2002 Agnihotri et al.
2002/0087967 A1 7/2002 Conkwright et al.
2002/0093591 A1 7/2002 Gong et al.
2002/0097165 A1 * 7/2002 Hulme ..................... 340/825.72
2002/0104087 A1 8/2002 Schaffer et al.
2002/0108112 A1 8/2002 Wallace et al.
2002/0120929 A1 8/2002 Schwalb et al.
2002/0133412 A1 9/2002 Oliver et al.
2002/0140719 A1 10/2002 Amir et al.
2002/0141619 A1 10/2002 Standridge et al.
2002/0156909 A1 10/2002 Harrington
2002/0178135 A1 11/2002 Tanaka
2002/0184220 A1 12/2002 Teraguchi et al.
2002/0190991 A1 12/2002 Efran et al.
2002/0194589 A1 12/2002 Cristofalo et al.
2003/0001880 A1 1/2003 Holtz et al.
2003/0007555 A1 1/2003 Divakaran et al.
2003/0026592 A1 2/2003 Kawahara et al.
2003/0033288 A1 2/2003 Shanahan et al.
2003/0066068 A1 4/2003 Gutta et al.
2003/0067554 A1 4/2003 Klarfeld et al.
2003/0072440 A1 4/2003 Murray et al.
2003/0081937 A1 5/2003 Li
2003/0084448 A1 5/2003 Soundararajan
2003/0084450 A1 5/2003 Thurston et al.
2003/0088872 A1 5/2003 Maissel et al.
2003/0093792 A1 * 5/2003 Labeeb et al. .................. 725/46
2003/0105682 A1 6/2003 Dicker et al.
2003/0172374 A1 9/2003 Vinson et al.
2003/0177503 A1 9/2003 Sull et al.
2003/0182663 A1 9/2003 Gudorf et al.
2003/0187650 A1 10/2003 Moore et al.
2003/0229900 A1 12/2003 Reisman
2004/0003041 A1 1/2004 Moore et al.
2004/0015569 A1 1/2004 Lonnfors et al.

| | | | |
|---|---|---|---|
| 2004/0017389 | A1 | 1/2004 | Pan et al. |
| 2004/0030750 | A1 | 2/2004 | Moore et al. |
| 2004/0032486 | A1 | 2/2004 | Shusman |
| 2004/0088289 | A1 | 5/2004 | Xu et al. |
| 2004/0098754 | A1 | 5/2004 | Vella et al. |
| 2004/0125124 | A1 | 7/2004 | Kim et al. |
| 2004/0125877 | A1 | 7/2004 | Chang et al. |
| 2004/0197088 | A1 | 10/2004 | Ferman et al. |
| 2004/0227768 | A1 | 11/2004 | Bates et al. |
| 2004/0231003 | A1 | 11/2004 | Cooper et al. |
| 2004/0250272 | A1 | 12/2004 | Durden et al. |
| 2005/0021784 | A1 | 1/2005 | Prehofer |
| 2005/0028194 | A1 | 2/2005 | Elenbaas et al. |
| 2005/0055713 | A1 | 3/2005 | Lee et al. |
| 2005/0102202 | A1 | 5/2005 | Linden et al. |
| 2005/0131906 | A1 | 6/2005 | Shin |
| 2005/0251827 | A1 | 11/2005 | Ellis et al. |
| 2005/0262542 | A1 | 11/2005 | DeWeese et al. |
| 2006/0129544 | A1 | 6/2006 | Yoon et al. |
| 2007/0011148 | A1 | 1/2007 | Burkey et al. |

FOREIGN PATENT DOCUMENTS

| | | |
|---|---|---|
| EP | 0 878964 | 11/1998 |
| EP | 1250807 | 10/2002 |
| GB | 2 325 537 | 11/1998 |
| JP | 08125957 | 5/1996 |
| JP | 09322154 | 12/1997 |
| JP | 11-032267 | 2/1999 |
| JP | 11-261908 | 9/1999 |
| JP | 2000- 013755 | 1/2000 |
| JP | 2000-013755 | 1/2000 |
| JP | 2001-036861 | 2/2001 |
| JP | 2002-503896 | 2/2002 |
| WO | WO 94/14284 | 6/1994 |
| WO | WO 98/56188 | 12/1998 |
| WO | WO 99/01984 | 1/1999 |
| WO | WO 99/04143 | 1/1999 |
| WO | WO 99/12194 | 3/1999 |
| WO | WO 99/65237 | 12/1999 |
| WO | WO 01/50753 | 7/2001 |

OTHER PUBLICATIONS

ISO/IEC JTC1/SC29/WG11, 4601, *MPEG-7 Requirements for Description of Users*, authors: van Beek, et. al., Mar. 1999.

ISO/IEC JTC1/SC29/WG11— MPEG-7 Proposal, ID No. 429, *Description Schemes for Consumer Video Applications*, authored by Qian, et al., Feb. 1999.

ISO/IEC JTC1/SC29/WG11 Mxxx, *MPEG-7 Media/Meta DSs upgrade*, VO. 2 ,, Oct. 1999, Melbourne, Australia.

ISO/IEC JTC1/SC29/WG11 N2844, *MPEG-7 Description Schemes* (*VO.5*), Jul. 1999, Vancouver, Canada.

*XML Schema Part 1: Structures*, W3C Working Draft, May 6, 1999, web site: http://www.3org/1999/0S/06-xmischema-1/.

ISO/IEC JTC1/SC29/WG11 M5748 "Specificartion of the Usage History DS" Noordwijerhaus Mar. 2000.

ISO/IEC JTC1/SC29/WG11 M6259 "Proposal of Usage History DS" Beijing Jul. 2000.

CPExchnge Specification v. 1.0, Oct. 2000.

Ehrmantraut, Harder, Wittig, & Steinmetz, "The Personal Electronic Program Guide—Towards the Pre-selection of Individual TV Programs, " Proceedings of the International Conference on Information and Knowledge Management CIKM, ACM, New York, NY, US, Nov. 12, 1996, pp. 243-250.

Yuichi Yagawa et al., "TV Program Planning Agent using Analysis Method of User's Taste", Technical report of IEICE, vol. 98, No. 437, AI98-54-61 , Dec. 1, 1998.

"User Preference Description for MPEG-7," ISO/IEC JTC1/SC29/WG11, MPEG 99/MXXX, Maui, Hawaii, Dec. 1999, pp. 1-18.

Michael G. Christel, Alexander G. Hauptmann, Adrienne S. Warmack, Scott A. Crosby, "Adjustable Filmstrips and Skims as Abstractions for a Digital Video Library," Computer Science Department, Carnegie Mellon University, Pittsburgh, PA 15213 USA.

Peng Xu, et al., "Algorithms and System for High-Level Structure Analysis and Event Detection in Soccer Video." Columbia University, Advent—Technical Report #111, Jun. 2001.

Keith Millar and David White, "A Schema for TV-Anytime: Segmentation Metadata AN195," NDS Contribution from MyTV, NDS Limited 2000, 27 pages.

Keith Millar et al., "A Schema for TVAnytime Segmentation Metadata AN195r1 myTV project," NDS Systems Division, NDS Limited 2000, 28 pages.

S.E. Levinson, L. R. Rabiner, and M. M. Sondhi, "An Introduction to the Application of the Theory of Probabilistic Functions of a Markov Process to Automatic Speech Recognition," Copyright 1983 American Telephone and Telegraph company, The Bell system Technical Journal, vol. 62, No. 4, Apr. 1983, pp. 1035-1074.

Dennis Yow, et al., "Analysis and Presentation of Soccer Highlights from Digital Video," to appear in the Proceedings, Second Asian Conference on Computer Vision (ACCV '95).

Drew D. Saur, et al. 'Automated Analysis and Annotation of Basketball Video,' SPIE vol. 3022, pp. 176-187, 1997.

Hao Pan, et al., "Automatic Detection of Replay Segments in Broadcast Sports Programs by Detection of Logos in Scene Transitions" 2002 IEEE, pp. IV-3385-IV-3388.

Yihong Gong, et al., "Automatic Parsing of TV soccer Programs" 1995 IEEE, pp. 167-174.

Jonathan D. Courtney, "Automatic Video Indexing via Object Motion Analysis," Pattern Recognition, vol. 30, No. 4, pp. 607-625, 1997.

Yong Rui, et al. "Automatically Extracting Highlights for TV Baseball Programs," ACM Multimedia 2000 Los Angeles, CA, USA, pp. 105-115.

Nuno Vasconcelos and Andrew Lippman, "Bayesian Modeling of Video Editing and Structure: Semantic Features for Video Summarization and Browsing," 1998 IEEE, pp. 153-157.

Padhraic Smyth, "Belief Networks, Hidden Markov Models, and Markov Random Fields: a Unifying View," To appear in Pattern Recognition Letters, 1998, Information and Computer Science Department, University of California, Irvine, CA 92697-3425, Mar. 20, 1998.

Francis C. Li et al., "Browsing Digital Video," CHI 2000 Apr. 1-6, 2000, CHI Letters vol. 2 issue 1, pp. 169-176.

T. Lambrou, et al., "Classification of Audio Signals Using Statistical Features on Time and Wavelet Transform Domains," 1998 IEEE, pp. 3621-3624.

Joshua Alspector,et al., "Comparing Feature-based and Clique-based User Models for Movie Selection," Digital Libraries 98, Pittsburgh, PA, Copyright ACM 1998, pp. 11-18.

Rainer Lienhart, "Comparison of Automatic Shot Boundary Detection Algorithms," Part of the IS&T/SPIE conference on Storage and Retrieval for Image and Video Databases VII, San Jose, CA, Jan. 1999, SPIE vol. 3656. pp. 290-301.

John Canny. "A Computational Approach to Edge Detection," IEEE Transactions on Pattern Analysis and Machine Intelligence, vol. PAMI-8, No. 6, Nov. 1986, IEEE 1986, pp. 679-698.

Richard Qian et al., "A Computational Approach to Semantic Event Detection," 1999 IEEE, pp. 200-206.

F. Arman, et al., "Content-based Browsing of Video Sequences," to appear in the Proceedings of ACM International Conference on Multimedia '94, Oct. 15-20, San Francisco, CA, 7 pages.

Hongjiang Zhang, et al. "Content-Based Video Browsing Tools," SPIE vol. 2417, 1995, pp. 389-398.

Stephen W. Smoliar, et al. "Content-Based Video Indexing and Retrieval," 1994 IEEE, pp. 62-72.

Stefan Eickeler, at al., "Content-based Video Indexing of TV Broadcast News Using Hidden Markov Models," Proceedings of IEEE International Conference on Acoustics, Speech, and Signal Processing, Phoenix, AZ, 1999, 4 pages.

Jane Hunter (DSTC Pty Ltd), Editor, "DDL Working Draft 3.0," ISO/IEC JTC1/SC29/WG11 N3391. MPEG 00/May 2000 (Geneva), 23 pages.

Vikrant Kobla, et al. "Detection of Slow-Motion Replay Sequences for Identifying Sports Videos," Laboratory for Language and Media Processing, University of Maryland, College Park, MD 20742-3275, USA, 6 pages.

Zhu Liu and Qian Huang, "Detecting News Reporting Using Audio/Visual Information," 1999 IEEE, pp. 324-328.

Y Kawai, "Detection of Replay Scenes in Broadcasted Sports Video by focusing on digital Video Effects," IEICE (D-II), vol. J84-D-II, No. 2, pp. 432-435, Feb. 2001, (in Japanese), pp. 432-437.
Vikrant Kobla, et al., "Detection of Slow-Motion Replay Sequences for Identifying Sports Videos," Laboratory for Language and Media Processing, University of Maryland, College Park, MD 20742-3275, USA, pp. 135-140.
H. Pan, at al. " Detection of Slow-Motion Replay Segments in sports Video for Highlights Generation," Proceedings of IEEE International Conference on Acoustics, Speech, and signal Processing, Salt Lake City, UT 2001, 4 pages.
Alan E Bell, "The dynamic digital disk," IEEE Spectrum, Oct. 1999, pp. 28-35.
Baoxin Li and M. Ibrahim Sezan, "Event Detection and Summarization in Sports Video," Sharp Laboratories of America, 5750 NW Pacific Rim Blvd., Camas, WA 98607, USA, 5 pages.
Minerva Yeung, "Extracting Story Units from Long Programs for Video Browsing and Navigation," Proceedings of Multimedia 1996, 1996 IEEE, pp. 296-304.
Boon-Lock Yeo at al., "On the Extraction of DC Sequence from MPEG Compressed Video," 1995 IEEE, pp. 260-263.
FAP Specifications, MPEG-4 Compliant Facial Animation, http://www.dsp.dist.unige.it/~pok/RESEARCH/MPEG/fapspec.htm 4 pages.
Frank R. Kschischang, et al., "Factor Graphs and the Sum-Product Algorithm," IEEE Transactions on Information Theory, vol. 47, No. 2, Feb. 2001, pp. 498-519.
John S. Boreczky, et al. "A Hidden Markov Model Framework for Video Segmentation Using Audio and Image Features" Proceedings of IEEE International Conference on Acoustics, Speech, and Signal Processing, Seattle, WA, 1998, 4 pages.
Wayne Wolf, "Hidden Markov Model Parsing of Video Programs;" Proceedings of the 1997 IEEE International Conference on Acoustics, Speech, and Signal Processing (ICASSP '97), pp. 2609-2611.
Bilge Gunsel, et al., "Hierarchical Temporal video Segmentation and content Characterization," Dept. of Electrical Engineering and Center for Electronic Imaging Systems, University of Rochester, Rochester, NY 14627, SPIE vol. 3229, 1997.
M. R. Naphade, et al. "A High-Performance Shot Boundary Detection Algorithm Using Multiple Cues," Proceedings of IEEE International Conference on Image Processing, Chicago, IL, 1998, pp. 884-887.
Josh Bernoff, "How Cable TV Can Beat Satellite," WholeView TechStrategy Rsearch, Apr. 2002 Forrester Research, Inc., 400 Technology Square, Cambridge, MA 02139 USA.
Vikrant Kobla, et al., "Identifying sports videos using replay, text, and camera motion features," Laboratory for Language and Media Processing, University of Maryland, College Park, MD 20742-3275, USA, Date Unknown.
B. B. Chaudhuri, et al., "Improved fractal geometry based texture segmentation technique" IEE Proceedings-E, vol. 140, No. 5, Sep. 1993, pp. 233-241.
Toshio Kawashima, et al., "Indexing of Baseball Telecast for Content-based Video Retrieval," Dept. of Information engineering, Hokkaido University, Kita-13, Nishi-8, Sapporo, 060-8628, Japan, 1998 IEEE, pp. 871-874.
Nathaniel J. Thurston, at al. "Intelligent Audience guidance: The New Paradigm in Television Navigation," Predictive Networks, Inc., Feb. 21, 2002, 9 pages.
Dulce Ponceleon, et al. "Key to Effective Video Retrieval: Effective Cataloging and Browsing," ACM Multimedia '98, Bristol, UK, 1998, pp. 99-107.
Henry Lieberman, et al. "Let's Browse: A collaborative Web Browsing Agent," Massachusetts Institute of Technology. 20 Ames Street #E15-305, Cambridge, MA 02139, USA, Copyright ACM 1999, pp. 65-68.
Noboru Babaguchi, et al.. "Linking Live and Replay Scenes in Broadcasted Sports Video," ACM Multimedia Workshop, Marina Del Rey, CA, USA, Copyright ACM 2000, pp. 205-208.
Giridharan Iyengar, et al., "Models for automatic classification of video sequences," SPIE vol. 3312, 1997, pp. 216-227.
Nevenka Dimitrova, et al., "Motion Recovery for Video Content Classification," ACM Transactions on Information Systems, vol. 13, No. 4, Oct. 1995, pp. 408-439.
Peter Van Beek, et al, Editors, "MPEG-7 Multimedia Description Schemes WD (Version 3.0)," ISO/IEC JTC 1/SC 29/WG 11/N3411, May 2000, Geneva.
Peter Van Beek, et al., Editors, "MPEG-7 Multimedia Description Schemes XM (Version 3.0)," ISO/IEC JTC 1/SC29/WG 11/N3410, May 2000, Geneva.
Sylvie Jeannin, et al., Editors, "MPEG-7 Visual part of eXperimentation Model Version 6.0," ISO/IEC JTC1/SC29/WG11/N3398, Geneva, Jun. 2000.
Kaushal Kurapati, et al., "A Multi-Agent TV Recommender," Adaptive Systems Department, Philips Research Briarcliff, 345 Scarborough Rd., Briarcliff Manor, NY 10510, USA, Date Unknown.
Peter Van Beek, et al., "Text of 15938-5 FCD Information Technology—Multimedia Content Description Interface—Part 5 Multimedia Description Schemes," ISO/IEC JTC 1/SC 29 N3966 Mar. 12, 2001, 500 pages.
Yao Wang, et al., "Multimedia Content Analysis," IEEE Signal Processing Magazine, Nov. 2000, pp. 12-35.
Mark T. Maybury, et al., "Multimedia Summaries of Broadcast News" Advanced Information Systems Center, The MITRE Corporation, 202 Burlington Road, Bedford, MA 01730, USA, pp. 442-449.
Shinichi Satoh, et al., "Name-It: Association of Face and Name in Video," School of Computer Science, Carnegie Mellon University, Pittsburgh, PA 15213, Dec. 20, 1996, 19 pages.
Stuart J. Golin, "New metric to detect wipes and other gradual transitions in . . ." Part of the IS&T/SPIE Conference on Visual communications and Image Processing '99, San Jose, CA Jan. 1999, SPIE vol. 3653, pp. 1464-474.
Ullas Gargi, et al., "Transactions Letters: Performance Characterization of Video-Shot-Change Detection Methods," IEEE Transactions on Circuits and Systems for Video Technology, vol. 10, No. 1, Feb. 2000, 13 pages.
Marc Light, et al., "Personalized Multimedia Information Access," Communications of the ACM, vol. 45, No. 5, May 2002, pp. 54-59.
Michael T. Chan, et al., "Real-Time Lip Tracking and Bimodal Continuous Speech Recognition," Rockwell Science Center, 1049 Camino Dos Rios, Thousand Oaks, CA 91360, 6 pages, date unknown.
Boon-Lock Yeo, et al., "Retrieving and Visualizing Video," Communications of the ACM, Dec. 1997, vol. 40, No. 12, pp. 43-52.
H.B. Lu, et al., "Robust Gradual Scene Change Detection," Proceedings of IEEE International Conference on Image Processing, Kobe, Japan, 1999, 5 pages.
Richard J. Qian et al., "A Robust Real-Time Face Tracking Algorithm," Sharp Laboratories of America, 5750 N. W. Pacific Rim Blvd., Camas, WA 98607, 1998 IEEE, pp. 131-135.
Lexing Lie, "Segmentation and Event Detection in Soccer Audio," EE 6820 Project, Soccer Audio, May 15, 2001, 9 pages.
Riccardo Leonardi , et al., "Content-Based Multimedia Indexing and Retrieval: Semantic Indexing of Multimedia Documents," IEEE 2002. pp. 44-51.
R. W. Picard, "A Society of Models for Video and Image Libraries," IBM Systems Journal, vol. 35, Nos. 3 8 4, 1996, pp. 292-312.
Alberto Del Bimbo, et al. "A Spatial Logic for Symbolic Description of Image Contents," Journal of Visual Languages and Computing (1994) 5, pp. 267-286.
Lexing Xie, et al., "Structure Analysis of Soccer Video with Hidden Markov Models," Department of Electrical Engineering, Columbia University, New York, NY, 4 pages.
Selim Aksoy, et al., "Textural Features for Image Database Retrieval," Intelligent Systems Laboratory, Department of Electrical Engineering, University of Washington, Seattle, WA 98195-2500, 5 pages.
B. S. Manjunath, et al., "Texture Features for Browsing and Retrieval of Image Data," IEEE Transactions on Pattern Analysis and Machine Intelligence, vol. 18, No. 8, Aug. 1996, pp. 837-842.

Richard W. Conners, et al., "A Theoretical comparison of Texture Algorithms," IEEE Transactions on Pattern Analysis and Machine Intelligence, vol. PAMI-2, No. 3, May 1980, pp. 204-222.
Noboru Babaguchi, "Towards Abstracting Sports Video by Highlights," ISIR, Osaka University, Ibaraki, Osaka 567-0047, Japan, 2000 IEEE, pp. 1519-1522.
Stephen S. Intille, "Tracking Using a Local Closed-World Assumption: Tracking in the Football Domain," MIT Media Lab Perceptual computing group Technical Report No. 296, pp. 1-62.
Lawrence R. Rabiner, "A Tutorial on Hidden Markov Models and Selected Applications in Speech Recognition," Proceedings of the IEEE, vol. 77, No. 2, Feb. 1989, pp. 257-286.
Jim Stroud, "TV Personalization: A Key Component of Interactive TV," The Cannel Group, 2001, 9 pages.
Richard O. Duda et al., "Use of the Hough Transformation to Detect Lines and Curves in Pictures,"Communications of the ACM, Jan. 1972, vol. 15, No. 1, pp. 11-15.
Rainer Lienhart, et al., "Video Abstracting," Communications of the ACM, Dec. 1997/ vol. 40, No. 12, pp. 55-62.
Shingo Uchihashi, et al., "Video Manga: Generating Semantically Meaningful Video Summaries," FX Palo Alto Laboratory, 3400 Hillview Avenue, Palo Alto, CA 94304, USA, pp. 383-392.
Michael A. Smith, et al., "Video Skimming for Quick Browsing based on Audio and Image Characterization," School of Computer Science, Carnegie Mellon University, Pittsburgh, PA 15213, Jul. 30, 1995, 24 pages.
Daniel Dementhon, et al., "Video summarization by Curve Simplification," Language and Media Processing (LAMP), University of Maryland, College Park, MD 20742-3275, 1998 ACM, pp. 211-218.
Chung-Lin Huang, et al., "Video summarization using Hidden Markov Model" Electrical Engineering Department, National Tsing-Hua University, Hsin-Chu, Taiwan, Roc, 2001 IEEE, pp. 473-477.
Ken Masumitsu, et al., "Video Summarization Using Reinforcement Learning in Eigenspace," IBM Research, Tokyo Research Laboratory. 1623-14. Shimotsuruma, Yamato-shi, Kanagawa, Japan, 4 pages.
Yihong Gong, et al., "Video Summarization Using Singular Value Decomposition," C&C Research laboratories, NEc USA, Inc. 110 Rio Robles, San Jose, CA 95134, USA, 2000 IEEE, 7 pages.
Yihong Gong, at al., "Video Summarization with Minimal Visual Content Redundancies," C&C Research Laboratories, NEC USA, Inc., 110 Rio robles, San Jose, CA 95134, USA, 2001 IEEE, pp. 362-365.
Minerva M. Yeung, et al., "Video visualization for Compact Presentation and Fast Browsing of Pictorial Content," IEEE Transactions on circuits and Systems for Video Technology, vol. 7, No. 5, Oct. 1997, pp. 771-785.
Stephen S. Intille, et al., "Visual Tracking Using closed-Worlds,", MIT Media Laboratory Perceptual computing Section Technical Report No. 294, Nov. 1994, pp. 1-18.
Leszek Cieplinski, at al. "Visual Working Draft 3.0," ISO/IEC JTC1/SC29/WG11/N3399, Jun. 2000 (Geneva), 92 pages.
Sunghoon Choi, et al., "Where are the ball and players?: Soccer Game Analysis with Color-based Tracking and Image Mosaick," Dept. of EE, Pohang University of Science and Technology, San 31 Hyoja Dong, Pohang, 790-784, Republic of Korea, pp. 1-15.
Paul V. Birch, et al., editors, "XML Schema Part 2: Datatypes, World Wide Web Consortium Working Draft," May 6, 1999, http://www.w3.org/1999/05/06-xmlschema-2/ 37 pages.
*Composite Capability/Preference Profiles* (*CC/PP*): *A User Side Framework for Content Negotiation*, a work in progress, W3C Note Jul. 27, 1999: this web site version: http://www.w3.org/1999/07/NOTE-CCPP-19990727/.
ISO/IEC JTC1/SC29/WG11 M5222, a *Proposal for User Preference Descriptions in MPEG-7*, Oct. 4, 1999.
ISO/IEC JTCI SC29, WG11, *User Preference Deseription.s for MPEG-7*, updated by Beek on Oct. 14, 1999 and updated by Yoon Oct. 29,1999.
Lewis, Ted, "UbiNet The Ubiquitous Internet Will be Wireless," article from IEEE Computer Magazine, Oct. 1999.
ISO/IEC JTC1/SC2/WG11 N2966, *MPEG-7 Generic AV Description Schemes* (vol. 7), including "Summary Description Scheme," and "Media Format DS," Melbourne, Australia, Oct. 1999.
ISO/IEC JTC1 /SC29/WG11/ N2997, *MPEG-7 Description Definition Language Document V 2* (*DDL*).
ISO/IEC JTC 29/WG11, 4601, *MPEG-7 Requirements for Description of Users*, authors: van Beek, et. al., Mar. 1999.
ISO/IEC JTCl/SC29/WG11—WPEG-7 Proposal, ID No. 429, *Description Schemes for Consumer Video Applications*, authored by Qian, et al., Feb. 1999.
ISO/IEC JTC1 /SC29/WG11 Mxxx, *MPEG-7 Media/Meta DSs upgrade, VO. 2* , Oct. 1999, Melbourne, Australia.
ISO/IEC JTC1/SC29/WG11 N2844, *MPEG-7 Description Schemes* (*VO.5*), Jul. 1999, Vancouver, Canada.
*XML Schema Part 1: Structures*, W3C Working Draft, May 6, 1999, web site: http://www.3org/1999/05/06-xmischema-1/.

* cited by examiner

Thumbnail View (Category)

Frame View

| Name | Location | TestOp | InterOp | IntraOp |
|---|---|---|---|---|
| FilteringAndSearch Preferences/ CreationPreferences | /Program /*CreationMetaInformation /*Creation | match-case-insens | AND | AND |
| Creator/role | //*Creator/role | NULL | CAND | OR |
| Creator/Individual/ FamilyName | //*Creator/Individual /FamilyName | substring-case-insens | CAND | OR |
| Creator/Individual/ GivenName | //*Creator/Individual /*GivenName | substring-case-insens | CAND | OR |

FIG. 36

| Test Operator | Description |
|---|---|
| substring-case-insensitive | Test that the preference value string [is a substring of] / [matches] the Program Description element value, [with] / [without] being case sensitive. |
| substring-case-sensitive | |
| string-match-case-insensitive | |
| string-match-case-sensitive | |
| value-less-than | Test that the Program Description element value converted to a number is [<, < = >, > =, = =, > <, > = < =, ~ ] the preference value converted to number[s]. In the case of range tests (> <, > = < =), the preference value is assumed to be a pair of comma-delimited numbers. The approximate operator may have a second number describing the rolloff form the target number. |
| value-less-than-or-equal | |
| value-greater-than | |
| value-greater-than-or-equal | |
| value-equal | |
| value-greater-than-less-than | |
| value-greater-than-equal-less-than-equal | |
| value-approximately | |
| count-less-than | Test that the quantity of Program Description elements is [ <, < >, >, = =, > <, ~ ] the preference value converted to number[s]. In the case of range tests (> <), the preference value is assumed to be a pair of comma-delimited numbers. The approximate operator may have a second number describing the rolloff from the target number. |
| count-greater-than | |
| count-equal | |
| count-greater-than-less-than | |
| count-approximately | |

FIG. 37

| Combinatorial Operator | Description |
|---|---|
| AND | The result of this Individual Preference test is boolean ANDed with others. If all the results in this combination are non-zero, the combined result is one, otherwise zero. |
| OR | The result of this Individual Preference test is boolean ORed with others. If any of the results in this combination are non-zero, the combined result is one, otherwise zero. |
| CAND | The Individual Preferences in this combination are evaluated form a Constrained common node. If all the results in this combination are non-zero, the combined result is one, otherwise zero. |
| MAX | The result of this Individual Preference test is combined arithmetically in a Maximum function with others. The combined result is the largest of all the results in this combination. |
| MIN | The result of this Individual Preference test is combined arithmetically in a Minimum function with others. The combined result is the smallest of all the results in this combination. |
| PROD | The result of this Individual Preference test is combined arithmetically in a Product function with others. The combined result is the product of all the results in this combination. |
| SAND | The result of this Individual Preference test is fuzzy ANDed with others. The combined result is the product of all the fuzzy-transformed (mapped to an S-curve profile) results. |
| SUM | The result of this Individual Preference test is combined arithmetically in a Sum function with others. The combined result is the sum of all the results in this combination. The result may be further bounded to a maximum result value. |
| FREQ | The result of this Individual Preference test is boolean counted with others, and the sum is normalized. The combined result is the count of all non-zero results, divided by a fixed maximum frequency number. The result may be further bounded to a maximum result value. |
| RATIO | The result of this Individual Preference test is boolean counted with others, and the sum is normalized by the number of Individual Preference tests in this combination. The combined result is the count of all non-zero results, divided by the count of all results. |

FIG. 38

Mapping Table:

| name | interOp |
|---|---|
| A | OR |
| B | OR |
| E | AND |
| F | AND |

A single leaf Test is composed of:

| | |
|---|---|
| mapped location | reference point in ProgramDS |
| mapped operation | comparison to be performed |
| query value | right operand of comparison |

For example:

| | |
|---|---|
| mapped location | /Program/CreationmetaInformation/Title/TitleText |
| mapped operation | string_equals |
| query value | "Westside Story" |

Mapping Table:

| name | interOp | intraOp |
|---|---|---|
| A | OR | |
| B | OR | |
| C | OR | AND |
| D | OR | OR |
| E | AND | |
| F | AND | |
| G | AND | AND |
| H | AND | OR |

Mapping Table:

| name | interOp | intraOp |
|---|---|---|
| A | AND | OR |
| B | AND | OR |
| C | AND | OR |

Mapping Table:

| name | interOp | intraOp |
|---|---|---|
| R (root) | AND | OR |
| D | AND | AND |
| P (parent) | AND | OR |
| A | AND | OR |
| B | AND | OR |

Mapping Table:

| name | location | interOp |
|---|---|---|
| R | r/s/t | |
| P | p | |
| X | x | CAND |
| Y | y/z | CAND |

Mapping Table:

| name | interOp | intraOp |
|---|---|---|
| A | OR | |
| B | OR | |
| C | OR | AND |
| D | OR | OR |
| E | AND | |
| F | AND | |
| G | AND | AND |
| H | AND | OR |
| E | CAND | |
| F | CAND | |
| G | CAND | AND |
| H | CAND | OR |

| Name | Location | TestOp | InterOp | IntraOp |
|---|---|---|---|---|
| **Level 0 Preferences** | | | | |
| FilteringAndSearchPreferences | null | NA | NA | OR |
| BrowsingPreferences | null | NA | NA | OR |
| **Level 1 Preferences** | | | | |
| *Children of FilteringAndSearchPreferences* | | | | |
| CreationPreferences | /Program/*CreationMetaInformation /*Creation | NA | AND | AND |
| ClassificationPreferences | /Program/*CreationMetaInformation /*Classification | NA | AND | AND |
| SourcePreferences | /Program/*UsageMetaInformation | NA | AND | AND |
| ClassificationPreferences/Country | /Program/*CreationMetaInformation /*Classification/*Country | STR_ISUB | AND | OR |
| *Children of BrowsingPreferences* | | | | |
| SummaryPreferences | /Program/*Summarization | NA | AND | AND |
| **Level 2 Preferences** | | | | |
| *Children of CreationPreferences* | | | | |
| Title | /*Title/TitleText | STR_ISUB | AND | OR |
| CreationDescription | /*CreationDescription | NA | AND | OR |
| Creator | //*Creator | NA | AND | OR |
| CreationLocation | /*CreationLocation | NA | AND | OR |
| CreationDate | /*CreationDate | NA | AND | OR |
| CreationMaterial | /*CreationMaterial | NA | AND | OR |
| CreationLocation/Country | /*CreationLocation/Country | STR_ISUB | AND | OR |
| *Children of ClassificationPreferences* | | | | |
| Language | /*Language | STR_ISUB | AND | OR |
| Genre | /*Genre | STR_ISUB | AND | OR |
| PackageType | /*PackageType | STR_ISUB | AND | OR |

FIG. 47A

| Name | Location | TestOp | InterOp | IntraOp |
|---|---|---|---|---|
| *Children of SourcePreferences* | | | | |
| PublicationType | /*Publication/PublicationType | STR_ISUB | AND | NA |
| *Children of SummaryPreferences* | | | | |
| SummaryTypePreference | /*HierarchicalSummary%summaryType | STR_ISUB | AND | OR |
| SummaryName | /*HierarchicalSummary%name | STR_ISUB | AND | OR |
| NumOfKeyFrames | /*HierarchicalSummary/*HighlightLevel %numberOfKeyFrames | VAL_EQ | AND | OR |
| MinNumOfKeyfrmaes | /*HierarchicalSummary/*HighlightLevel %numberOfKeyFrames | VAL_GTE | AND | OR |
| MaxNumOfKeyframes | /*HierarchicalSummary/*HighlightLevel %numberOfKeyFrames | VAL_LTE | AND | OR |
| SmmaryDuration | /*HierarchicalSummary/*HighlightLevel /Duration | VAL_EQ | AND | OR |
| MinSummaryDuration | /*HierarchicalSummary/*HighlightLevel /Duration | VAL_GTE | AND | OR |
| MaxSummaryDuration | /*HierarchicalSummary/*HighlightLevel /Duration | VAL_LTE | AND | OR |
| **Level 3 Preferences** | | | | |
| *Children of CreationDescription* | | | | |
| Who | /Who | STR_ISUB | AND | OR |
| TextAnnotation | /TextAnnotation | STR_ISUB | AND | OR |
| *Children of Creator* | | | | |
| role | /role | STR_IEQ | CAND | NA |
| *Children of Creator, RealPerson* | | | | |
| Individual | /Individual | NA | AND | OR |
| QuasiPerson | /QuasiPerson | NA | AND | OR |
| *Children of CreationLocation* | | | | |

FIG. 47B

| | | | | |
|---|---|---|---|---|
| PlaceName | /*PlaceName | STR_ISUB | AND | OR |
| PlaceRole | /PlaceRole | STR_ISUB | AND | NA |
| Planet | /Planet | STR_ISUB | AND | NA |
| GPSCoordinates | /GPSCoordinates | STR_ISUB | AND | NA |
| Region | /Region | STR_ISUB | AND | NA |
| PostingIdentifier | /PostingIdentifier | STR_ISUB | AND | NA |
| AdministrativeUnit | /AdministrativeUnit | STR_ISUB | AND | NA |
| PostalAddress | /PostalAddress | STR_ISUB | AND | NA |
| InternalCoordinates | /InternalCoordinates | STR_ISUB | AND | NA |
| *Children of CreationMaterial* | | | | |
| device_instrument | /device_instrument | STR_ISUB | AND | NA |
| device_setting | /device_setting | STR_ISUB | AND | NA |
| **Level 4 Preferences** | | | | |
| *Children of Individual, ContactPerson* | | | | |
| FamilyName | /FamilyName | STR_ISUB | CAND | NA |
| GivenName | /*GivenName | STR_ISUB | CAND | OR |
| SecondFamilyName | /*SecondFamilyName | STR_ISUB | CAND | OR |
| Initial | /*Initial | STR_ISUB | CAND | OR |
| ProfessionalName | /*ProfessionalName | STR_ISUB | CAND | OR |
| *Children of QuasiPerson* | | | | |
| CharacterName | /*CharacterName | STR_ISUB | CAND | OR |
| RealPerson | /*RealPerson | NA | CAND | OR |
| *Children of Organization* | | | | |
| OrganizationName | /OrganizationName | STR_ISUB | CAND | NA |
| ContactPerson | /*ContactPerson | NA | CAND | OR |
| Address | /*Address | NA | CAND | OR |
| **Preference Types** | | | | |
| FilteringAndSearchPreferenceType | /*FilteringAndSearchPreferenceType | NA | NA | OR |
| BrowsingPreferenceType | /*BrowsingPreferenceType | NA | NA | OR |

FIG. 47C

Preference Values

| | |
|---|---|
| 620 | Nominal Value |
| 622 | Neutral Value |
| 624 | Maximum Value |
| 626 | Minimum Value |
| 628 | Other Value |

| Program | | PVa = 1 OR | PVb = 1 | Score | Rank |
|---|---|---|---|---|---|
| J | A = B = 1 | 1 | 1 | 2 | 1 |
| K | A = 1, B = 0 | 1 | 0 | 1 | 2 |

| Program | | PVa = 1 OR | PVb = 1 | Score | Rank |
|---|---|---|---|---|---|
| J | A = 1, B = 0.01 | 1 | 0.01 | 1.01 | 1 |
| K | A = 1, B = 0 | 1 | 0 | 1 | 2 |

| Program | | PVa = 4 OR | PVb = 1 OR | PVc = 1 | Score | Rank |
|---|---|---|---|---|---|---|
| J | A = 1, B = C = 0 | 4 | 0 | 0 | 4 | 1 |
| K | A = 0, B = C = 1 | 0 | 1 | 1 | 2 | 2 |

| Program | | PVa = 4 OR | PVb = 1 OR | PVc = 1 | Score | Rank |
|---|---|---|---|---|---|---|
| J | A = 0.4, B = C = 0 | 1.6 | 0 | 0 | 1.6 | 3 |
| K | A = 0.5, B = C = 0 | 2 | 0 | 0 | 2 | 2 tied |
| L | A = 0, B = C = 1 | 0 | 1 | 1 | 2 | 2 tied |
| M | A = 0.1, B = C = 1 | 0.4 | 1 | 1 | 2.4 | 1 |

| Program | | PVa = 1 AND PVb = 1 | | Score | Rank |
|---|---|---|---|---|---|
| J | A = B = 1 | 1 | 1 | 1 | 1 |
| K | A = 1, B = 0.5 | 1 | 0.5 | 0.75 | 2 |

| Program | | PVa = 1 AND PVb = 1 | | Score | Rank |
|---|---|---|---|---|---|
| J | A = B = 0.6 | 0.6 | 0.6 | 0.6 | 1 |
| K | A = 1, B = 0.1 | 1 | 0.1 | 0.55 | 2 |
| L | A = B = 0.5 | 0.5 | 0.5 | 0.5 | 3 |

| Program | | PVa = 1 AND PVb = 1 | | Score | Rank |
|---|---|---|---|---|---|
| J | A = 1, B = 0.9 | 1 | 0.9 | 0.95 | 1 |
| K | A = B = 0.9 | 0.9 | 0.9 | 0.9 | 2 |
| L | A = 1, B = 0 | 1 | 0 | 0.5 | 3 |

| Program | | PVa = 1 AND PVb = 1 | | Score | Rank |
|---|---|---|---|---|---|
| L | A = 1, B = 0 | 1 | 0 | 0.5 | reject |

| Program | | PVx = 1 OR PVy = 1 | | | | | | Score | Rank |
|---|---|---|---|---|---|---|---|---|---|
| | | PVa=1 OR PVb=1 OR PVc=1 OR PVd=1 | | | | PVd=1 OR PVe=1 | | | |
| J | A=B=C=1, D=E=F=0 | 1 | 1 | 1 | 0 | 0 | 0 | 3 | 1 |
| K | A=B=C=D =0, E=F=1 | 0 | 0 | 0 | 0 | 1 | 1 | 2 | 2 |

| Program | | PVx = 1 OR PVy = 1 | | | | | | Score | Rank |
|---|---|---|---|---|---|---|---|---|---|
| | | PVa=1 OR PVb=1 OR PVc=1 OR PVd=1 | | | | PVd=2 OR PVe=2 | | | |
| J | A=B=C=1, D=E=F=0 | 1 | 1 | 1 | 0 | 0 | 0 | 3 | 2 |
| K | A=B=C=D =0, E=F=1 | 0 | 0 | 0 | 0 | 2 | 2 | 4 | 1 |

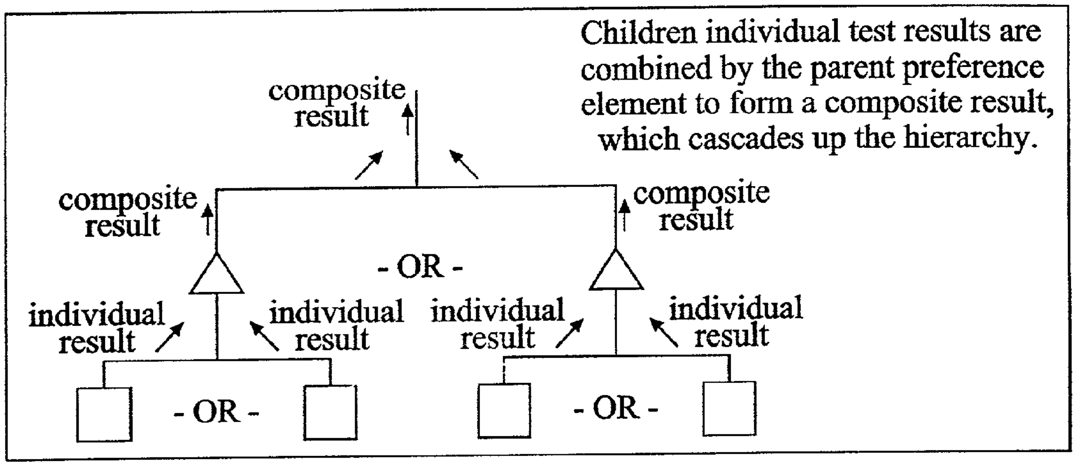
FIG. 68
| Program | | PVx = 0.8 OR PVy = 1 | | | | Score | Rank |
|---|---|---|---|---|---|---|---|
| | | PVa=1 OR PVb=1 | | PVc=1 OR PVd=0.5 | | | |
| J | A=1, B=C=D=0 | 0.8 | 0 | 0 | 0 | 0.8 | 1 |
| K | A=B=C=0, D=1 | 0 | 0 | 0 | 0.5 | 0.5 | 2 |
FIG. 69
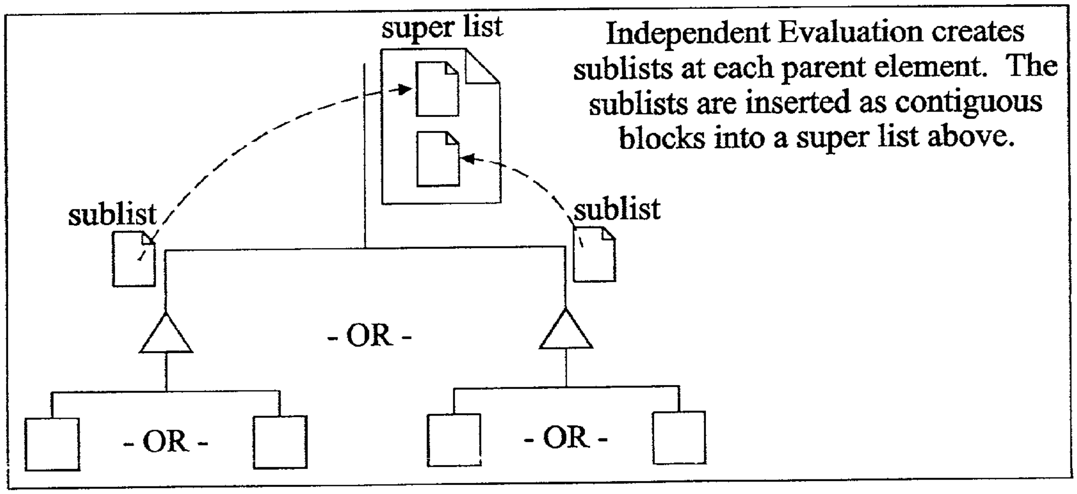
FIG. 70

| Program | | PVa = 1 OR PVb = 1 | | Score | Rank |
|---|---|---|---|---|---|
| J | A = 1, B=C=D=0 | 1 | 0 | 1 | 1 |
| K | A=B=C=0, D = 1 | 0 | 0 | 0 | reject |

FIG. 71

| Program | | PVc=1 OR PVd=0.5 | | Score | Rank |
|---|---|---|---|---|---|
| J | A = 1, B=C=D=0 | 0 | 0 | 0 | reject |
| K | A=B=C=0, D = 1 | 0 | 0.5 | 0.5 | 1 |

FIG. 72

Merging of SubLists into SuperList:

| SubLists sorted by Preference Value | Programs in SubList | Rank |
|---|---|---|
| SubList Y with PVy = 1 | K | 1 |
| SubList X with PVx = 0.8 | J | 2 |

FIG. 73

| | | PVx = 2 AND PVy = 1 | | | | | |
|---|---|---|---|---|---|---|---|
| Program | | PVa=1 OR PVb=1 | | PVc=1 OR PVd=1 | | Score | Rank |
| J | A=0.9, B=C=D=1 | 0.9 | 1 | 1 | 1 | 2.9 | 2 |
| K | A=B=C=1, D=0.9 | 1 | 1 | 1 | 0.9 | 2.95 | 1 |

FIG. 74

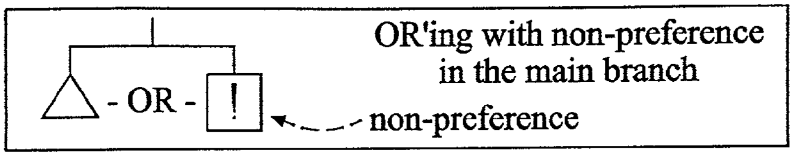
FIG. 75
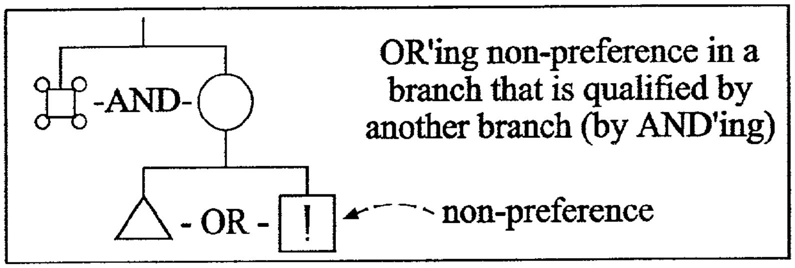
FIG. 76
| Program | | PVa = 1 OR PVb = -1 | | Score | Rank |
|---|---|---|---|---|---|
| J | A = B = 1 | 1 | 0 | 1 | 2 |
| K | A = 1, B = 0 | 1 | 1 | 2 | 1 |
FIG. 77
| Program | | PVa = 1 AND PVb = -1 | | Score | Rank |
|---|---|---|---|---|---|
| J | A = 1, B = 0.01 | 1 | -0.01 | 0.495 | 2 |
| K | A = 1, B = 0 | 1 | 0 | 0.5 | 1 |
FIG. 78
| Program | | PVa=1 AND PVb=-100 | | Score | Rank |
|---|---|---|---|---|---|
| J | A = 1, B = 0.01 | 1 | -1 | 0 | reject |
FIG. 79
| Program | | PVa = 1 AND PVb = -1 | | Score | Rank |
|---|---|---|---|---|---|
| J | A = 1, B = 0.01 | 1 | -0.01 | NA | reject |
FIG. 80

AUDIOVISUAL MANAGEMENT SYSTEM

CROSS-REFERENCE TO RELATED APPLICATIONS

This application claims the benefit of U.S. Provisional Application No. 60/232,377, filed Sep. 14, 2000.

BACKGROUND OF THE INVENTION

The present invention relates to a system for managing audiovisual information.

Video cassette recorders (VCRs) may record video programs in response to pressing a record button or may be programmed to record video programs based on the time of day. However, the viewer must program the VCR based on information from a television guide to identify relevant programs to record. After recording, the viewer scans through the entire video tape to select relevant portions of the program for viewing using the functionality provided by the VCR, such as fast forward and fast reverse. Unfortunately, the searching and viewing is based on a linear search, which may require significant time to locate the desired portions of the program(s) and fast forward to the desired portion of the tape. In addition, it is time consuming to program the VCR in light of the television guide to record desired programs. Also, unless the viewer recognizes the programs from the television guide as desirable it is unlikely that the viewer will select such programs to be recorded.

RePlayTV and TiVo have developed hard disk based systems that receive, record, and play television broadcasts in a manner similar to a VCR. The systems may be programmed with the viewer's viewing preferences. The systems use a telephone line interface to receive scheduling information similar to that available from a television guide. Based upon the system programming and the scheduling information, the system automatically records programs that may be of potential interest to the viewer. Unfortunately, viewing the recorded programs occurs in a linear manner and may require substantial time. In addition, each system must be programmed for an individual's preference, likely in a different manner.

Freeman et al., U.S. Pat. No. 5,861,881, disclose an interactive computer system where subscribers can receive individualized content.

With all the aforementioned systems, each individual viewer is required to program the device according to his particular viewing preferences. Unfortunately, each different type of device has different capabilities and limitations which limit the selections of the viewer. In addition, each device includes a different interface which the viewer may be unfamiliar with. Further, if the operator's manual is inadvertently misplaced it may be difficult for the viewer to efficiently program the device.

BRIEF DESCRIPTION OF THE SEVERAL VIEWS OF THE DRAWINGS

FIG. 36 is an exemplary embodiment of a mapping table.

FIG. 37 is an exemplary embodiment of a set of test operators.

FIG. 38 is an exemplary embodiment of combinatorial operators.

FIGS. 47A-47C is an exemplary embodiment of is an example of a mapping table.

FIG. 68 is a composite scoring combination.

FIG. 69 is a composite scoring implementation.

FIG. 70 is an independent evaluation diagram.

FIG. 71 is an independent evaluation of sublist X.

FIG. 72 is an independent evaluation of sublist Y.

FIG. 73 is a merging of sublists shown in FIGS. 71 and 72 into a combined list.

FIG. 74 is a comparing various presence values across hierarchy AND'ing combination.

FIG. 75 is an OR'ing non-preferences in main branch combination.

FIG. 76 is an OR'ing non-preference qualified combination.

FIG. 77 is an implementation of FIG. 76.

FIG. 78 is an implementation of a non-preference score first, any presence yields lower ranking.

FIG. 79 is an alternative implementation of a non-preference score first, any presence yields lower ranking.

FIG. 80 an implementation of a non-preference filter-first, any presence yields rejection.

DETAILED DESCRIPTION OF THE PREFERRED EMBODIMENT

Figure 1:
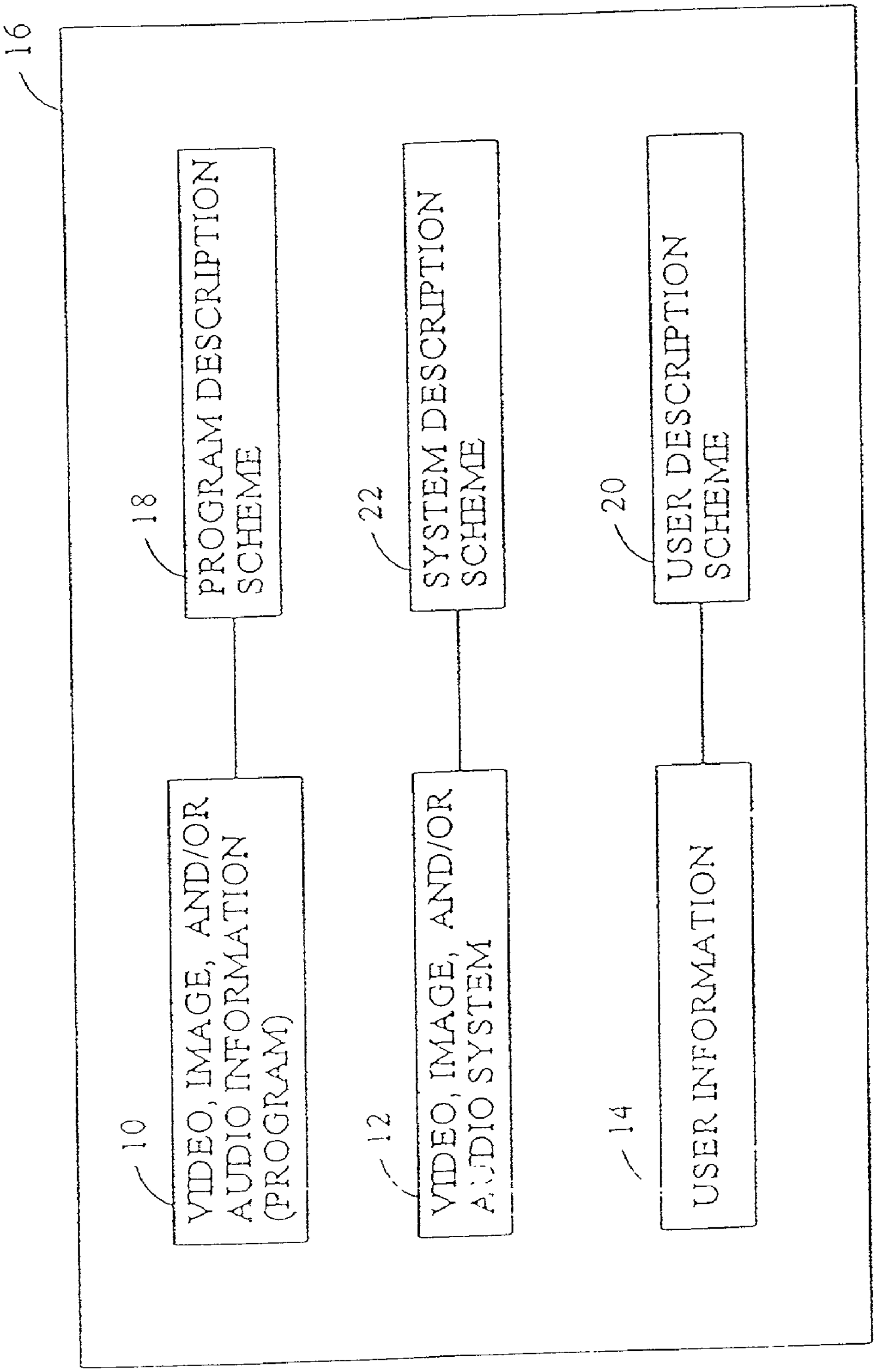
FIG. 1 is an exemplary embodiment of a program, a system, and a user, with associated description schemes, of an audiovisual system of the present invention.

Many households today have many sources of audio and video information, such as multiple television sets, multiple VCR's, a home stereo, a home entertainment center, cable television, satellite television, internet broadcasts, world wide web, data services, specialized Internet services, portable radio devices, and a stereo in each of their vehicles. For each of these devices, a different interface is normally used to obtain, select, record, and play the video and/or audio content. For example, a VCR permits the selection of the recording times but the user has to correlate the television guide with the desired recording times. Another example is the user selecting a preferred set of preselected radio stations for his home stereo and also presumably selecting the same set of preselected stations for each of the user's vehicles. If another household member desires a different set of preselected stereo selections, the programming of each audio device would need to be reprogrammed at substantial inconvenience.

The present inventors came to the realization that users of visual information and listeners to audio information, such as for example radio, audio tapes, video tapes, movies, and news, desire to be entertained and informed in more than merely one uniform manner. In other words, the audiovisual information presented to a particular user should be in a format and include content suited to their particular viewing preferences. In addition, the format should be dependent on the content of the particular audiovisual information. The amount of information presented to a user or a listener should be limited to only the amount of detail desired by the particular user at the particular time. For example with the ever increasing demands on the user's time, the user may desire to watch only 10 minutes of or merely the highlights of a basketball game. In addition, the present inventors came to the realization that the necessity of programming multiple audio and visual devices with their particular viewing preferences is a burdensome task, especially when presented with unfamiliar recording devices when traveling. When traveling, users desire to easily configure unfamiliar devices, such as audiovisual devices in a hotel room, with their viewing and listening preferences in a efficient manner.

The present inventors came to the further realization that a convenient technique of merely recording the desired audio and video information is not sufficient because the presentation of the information should be in a manner that is time efficient, especially in light of the limited time frequently available for the presentation of such information. In addition, the user should be able to access only that portion of all of the available information that the user is interested in, while skipping the remainder of the information.

A user is not capable of watching or otherwise listening to the vast potential amount of information available through all, or even a small portion of, the sources of audio and video information. In addition, with the increasing information potentially available, the user is not likely even aware of the potential content of information that he may be interested in. In light of the vast amount of audio, image, and video information, the present inventors came to the realization that a system that records and presents to the user audio and video information based upon the user's prior viewing and listening habits, preferences, and personal characteristics, generally referred to as user information, is desirable. In addition, the system may present such information based on the capabilities of the system devices. This permits the system to record desirable information and to customize itself automatically to the user and/or listener. It is to be understood that user, viewer, and/or listener terms may be used interchangeability for any type of content. Also, the user information should be portable between and usable by different devices so that other devices may likewise be configured automatically to the particular user's preferences upon receiving the viewing information.

In light of the foregoing realizations and motivations, the present inventors analyzed a typical audio and video presentation environment to determine the significant portions of the typical audiovisual environment. First, referring to FIG. 1 the video, image, and/or audio information 10 is provided or otherwise made available to a user and/or a (device) system. Second, the video, image, and/or audio information is presented to the user from the system 12 (device), such as a television set or a radio. Third, the user interacts both with the system (device) 12 to view the information 10 in a desirable manner and has preferences to define which audio, image, and/or video information is obtained in accordance with the user information 14. After the proper identification of the different major aspects of an audiovisual system the present inventors then realized that information is needed to describe the informational content of each portion of the audiovisual system 16.

With three portions of the audiovisual presentation system 16 identified, the functionality of each portion is identified together with its interrelationship to the other portions. To define the necessary interrelationships, a set of description schemes containing data describing each portion is defined. The description schemes include data that is auxiliary to the programs 10, the system 12, and the user 14, to store a set of information, ranging from human readable text to encoded data, that can be used in enabling browsing, filtering, searching, archiving, and personalization. By providing a separate description scheme describing the program(s) 10, the user 14, and the system 12, the three portions (program, user, and system) may be combined together to provide an interactivity not previously achievable. In addition, different programs 10, different users 14, and different systems 12 may be combined together in any combination, while still maintaining fall compatibility and functionality. It is to be understood that the description scheme may contain the data itself or include links to the data, as desired.

A program description scheme 18 related to the video, still image, and/or audio information 10 preferably includes two sets of information, namely, program views and program profiles. The program views define logical structures of the frames of a video that define how the video frames are potentially to be viewed suitable for efficient browsing. For example the program views may contain a set of fields that contain data for the identification of key frames, segment definitions between shots, highlight definitions, video summary definitions, different lengths of highlights, thumbnail set of frames, individual shots or scenes, representative frame of the video, grouping of different events, and a close-up view. The program view descriptions may contain thumbnail, slide, key frame, highlights, and close-up views so that users can filter and search not only at the program level but also within a particular program. The description scheme also enables users to access information in varying detail amounts by supporting, for example, a key frame view as a part of a program view providing multiple levels of summary ranging from coarse to fine. The program profiles define distinctive characteristics of the content of the program, such as actors, stars, rating, director, release date, time stamps, keyword identification, trigger profile, still profile, event profile, character profile, object profile, color profile, texture profile, shape profile, motion profile, and categories. The program profiles are especially suitable to facilitate filtering and searching of the audio and video information. The description scheme enables users to have the provision of discovering interesting programs that they may be unaware of by providing a user description scheme. The user description scheme provides information to a software agent that in turn performs a search and filtering on behalf of the user by possibly using the system description scheme and the program description scheme information. It is to be understood that in one of the embodiments of the invention merely the program description scheme is included.

Program views contained in the program description scheme are a feature that supports a functionality such as close-up view. In the close-up view, a certain image object, e.g., a famous basketball player such as Michael Jordan, can be viewed up close by playing back a close-up sequence that is separate from the original program. An alternative view can be incorporated in a straightforward manner. Character profile on the other hand may contain spatio-temporal position and size of a rectangular region around the character of interest. This region can be enlarged by the presentation engine, or the presentation engine may darken outside the region to focus the user's attention to the characters spanning a certain number of frames. Information within the program description scheme may contain data about the initial size or location of the region, movement of the region from one frame to another, and duration and terms of the number of frames featuring the region. The character profile also provides provision for including text annotation and audio annotation about the character as well as web page information, and any other suitable information. Such character profiles may include the audio annotation which is separate from and in addition to the associated audio track of the video.

The program description scheme may likewise contain similar information regarding audio (such as radio broadcasts) and images (such as analog or digital photographs or a frame of a video).

The user description scheme 20 preferably includes the user's personal preferences, and information regarding the user's viewing history such as for example browsing history, filtering history, searching history, and device setting history. The user's personal preferences includes information regarding particular programs and categorizations of programs that the user prefers to view. The user description scheme may also include personal information about the particular user, such as demographic and geographic information, e.g. zip code and age. The explicit definition of the particular programs or attributes related thereto permits the system 16 to select those programs from the information contained within the available program description schemes 18 that may be of interest to the user. Frequently, the user does not desire to learn to program the device nor desire to explicitly program the device. In addition, the user description scheme 20 may not be sufficiently robust to include explicit definitions describing all desirable programs for a particular user. In such a case, the capability of the user description scheme 20 to adapt to the viewing habits of the user to accommodate different viewing characteristics not explicitly provided for or otherwise difficult to describe is useful. In such a case, the user description scheme 20 may be augmented or any technique can be used to compare the information contained in the user description scheme 20 to the available information contained in the program description scheme 18 to make selections. The user description scheme provides a technique for holding user preferences ranging from program categories to program views, as well as usage history. User description scheme information is persistent but can be updated by the user or by an intelligent software agent on behalf of the user at any arbitrary time. It may also be disabled by the user, at any time, if the user decides to do so. In addition, the user description scheme is modular and portable so that users can carry or port it from one device to another, such as with a handheld electronic device or smart card or transported over a network connecting multiple devices. When user description scheme is standardized among different manufacturers or products, user preferences become portable. For example, a user can personalize the television receiver in a hotel room permitting users to access information they prefer at any time and anywhere. In a sense, the user description scheme is persistent and timeless based. In addition, selected information within the program description scheme may be encrypted since at least part of the information may be deemed to be private (e.g., demographics). A user description scheme may be associated with an audiovisual program broadcast and compared with a particular user's description scheme of the receiver to readily determine whether or not the program's intended audience profile matches that of the user. It is to be understood that in one of the embodiments of the invention merely the user description scheme is included.

The system description scheme 22 preferably manages the individual programs and other data. The management may include maintaining lists of programs, categories, channels, users, videos, audio, and images. The management may include the capabilities of a device for providing the audio, video, and/or images. Such capabilities may include, for example, screen size, stereo, AC3, DTS, color, black/white, etc. The management may also include relationships between any one or more of the user, the audio, and the images in relation to one or more of a program description scheme(s) and a user description scheme(s). In a similar manner the management may include relationships between one or more of the program description scheme(s) and user description scheme(s). It is to be understood that in one of the embodiments of the invention merely the system description scheme is included.

The descriptors of the program description scheme and the user description scheme should overlap, at least partially, so that potential desirability of the program can be determined by comparing descriptors representative of the same information. For example, the program and user description scheme may include the same set of categories and actors. The program description scheme has no knowledge of the user description scheme, and vice versa, so that each description scheme is not dependant on the other for its existence. It is not necessary for the description schemes to be fully populated. It is also beneficial not to include the program description scheme with the user description scheme because there will likely be thousands of programs with associated description schemes which if combined with the user description scheme would result in a unnecessarily large user description scheme. It is desirable to maintain the user description scheme small so that it is more readily portable. Accordingly, a system including only the program description scheme and the user description scheme would be beneficial.

The user description scheme and the system description scheme should include at least partially overlapping fields. With overlapping fields the system can capture the desired information, which would otherwise not be recognized as desirable. The system description scheme preferably includes a list of users and available programs. Based on the master list of available programs, and associated program description scheme, the system can match the desired programs. It is also beneficial not to include the system description scheme with the user description scheme because there will likely be thousands of programs stored in the system description schemes which if combined with the user description scheme would result in a unnecessarily large user description scheme. It is desirable to maintain the user description scheme small so that it is more readily portable. For example, the user description scheme may include radio station preselected frequencies and/or types of stations, while the system description scheme includes the available stations for radio stations in particular cities. When traveling to a different city the user description scheme together with the system description scheme will permit reprogramming the radio stations. Accordingly, a system including only the system description scheme and the user description scheme would be beneficial.

The program description scheme and the system description scheme should include at least partially overlapping fields. With the overlapping fields, the system description scheme will be capable of storing the information contained within the program description scheme, so that the information is properly indexed. With proper indexing, the system is capable of matching such information with the user information, if available, for obtaining and recording suitable programs. If the program description scheme and the system description scheme were not overlapping then no information would be extracted from the programs and stored. System capabilities specified within the system description scheme of a particular viewing system can be correlated with a program description scheme to determine the views that can be supported by the viewing system. For instance, if the viewing device is not capable of playing back video, its system description scheme may describe its viewing capabilities as limited to keyframe view and slide view only. Program description scheme of a particular program and system description scheme of the viewing system are utilized to present the appropriate views to the viewing system. Thus, a server of programs serves the appropriate views according to a particular viewing system's capabilities, which may be communicated over a network or communication channel connecting the server with user's viewing device. It is preferred to maintain the program description scheme separate from the system description scheme because the content providers repackage the content and description schemes in different styles, times, and formats. Preferably, the program description scheme is associated with the program, even if displayed at a different time. Accordingly, a system including only the system description scheme and the program description scheme would be beneficial.

Figure 2:
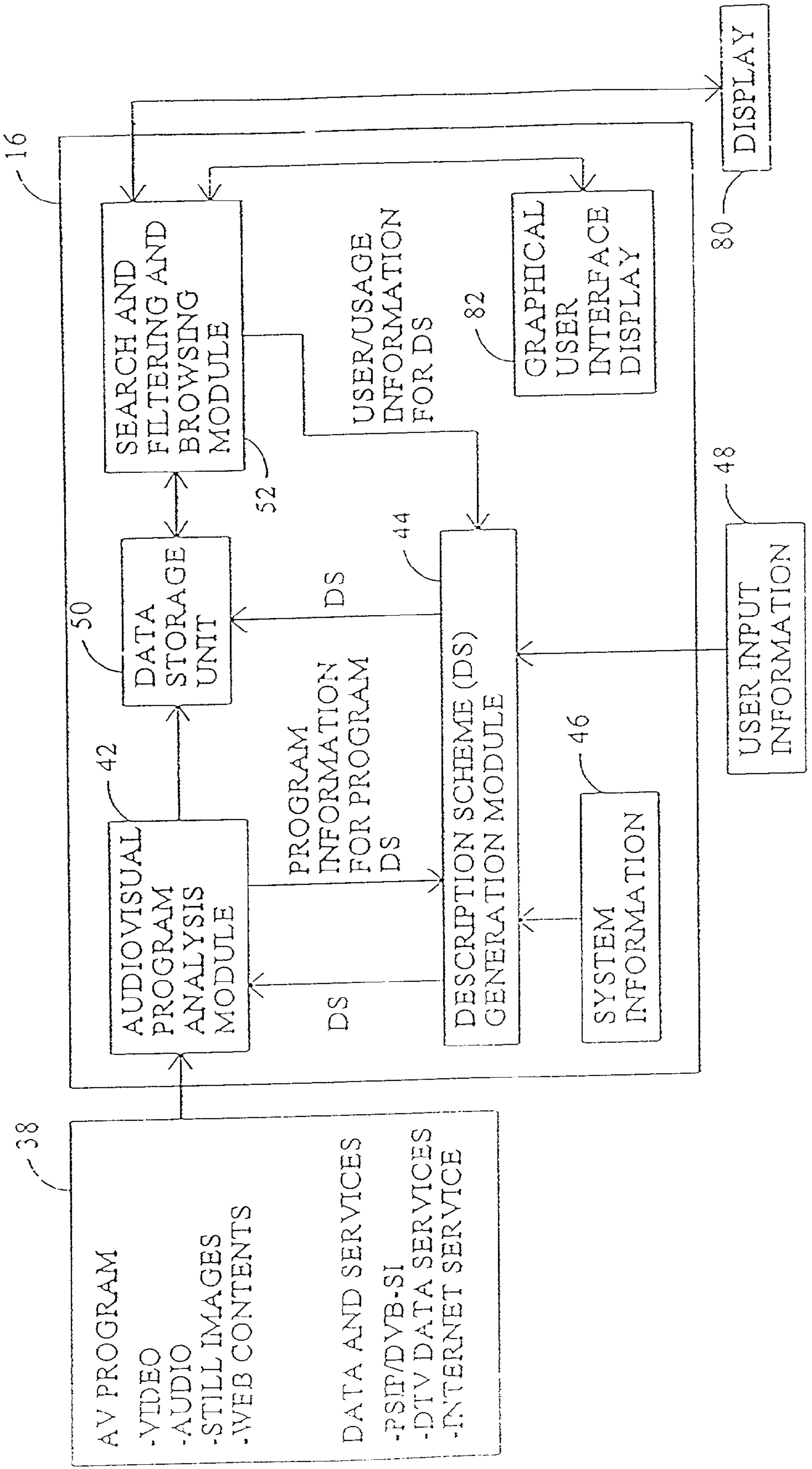
FIG. 2 is an exemplary embodiment of the audiovisual system, including an analysis module, of FIG. 1.

By preferably maintaining the independence of each of the three description schemes while having fields that correlate the same information, the programs 10, the users 14, and the system 12 may be interchanged with one another while maintaining the functionality of the entire system 16. Referring to FIG. 2, the audio, visual, or audiovisual program 38, is received by the system 16. The program 38 may originate at any suitable source, such as for example broadcast television, cable television, satellite television, digital television, Internet broadcasts, world wide web, digital video discs, still images, video cameras, laser discs, magnetic media, computer hard drive, video tape, audio tape, data services, radio broadcasts, and microwave communications. The program description stream may originate from any suitable source, such as for example PSIP/DVB-SI information in digital television broadcasts, specialized digital television data services, specialized Internet services, world wide web, data files, data over the telephone, and memory, such as computer memory. The program, user, and/or system description scheme may be transported over a network (communication channel). For example, the system description scheme may be transported to the source to provide the source with views or other capabilities that the device is capable of using. In response, the source provides the device with image, audio, and/or video content customized or otherwise suitable for the particular device. The system 16 may include any device(s) suitable to receive any one or more of such programs 38 An audiovisual program analysis module 42 performs an analysis of the received programs 38 to extract and provide program related information (descriptors) to the description scheme (DS) generation module 44 The program related information may be extracted from the data stream including the program 38 or obtained from any other source, such as for example data transferred over a telephone line, data already transferred to the system 16 in the past, or data from an associated file. The program related information preferably includes data defining both the program views and the program profiles available for the particular program 38 The analysis module 42 performs an analysis of the programs 38 using information obtained from (i) automatic audio-video analysis methods on the basis of low-level features that are extracted from the program(s), (ii) event detection techniques, (iii) data that is available (or extractable) from data sources or electronic program guides (EPGs, DVB-SI, and PSIP), and (iv) user information obtained from the user description scheme 20 to provide data defining the program description scheme.

Figure 3:
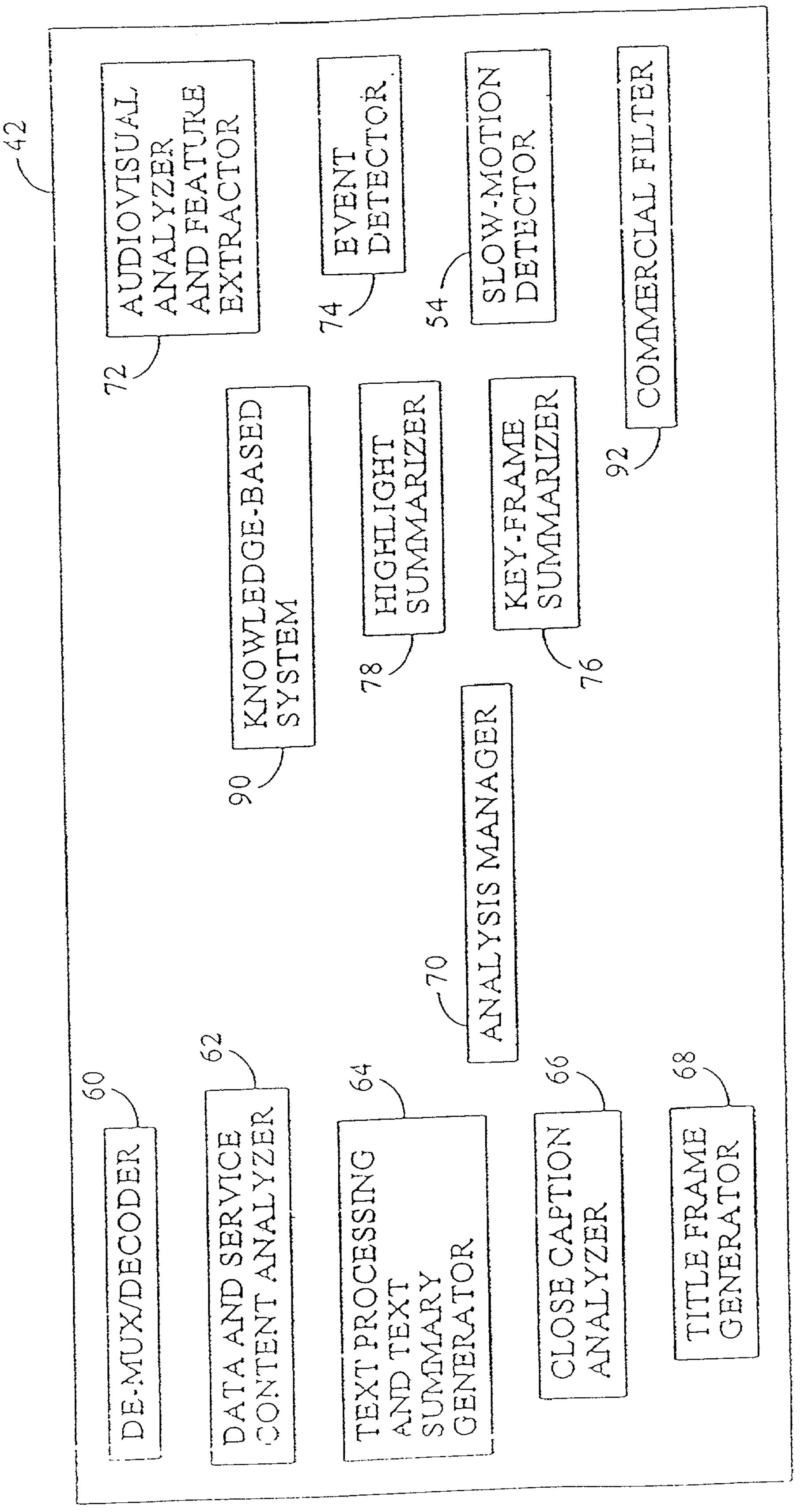
FIG. 3 is an exemplary embodiment of the analysis module of FIG. 2.

The selection of a particular program analysis technique depends on the amount of readily available data and the user preferences. For example, if a user prefers to watch a 5 minute video highlight of a particular program, such as a basketball game, the analysis module 42 may invoke a knowledge based system 90 (FIG. 3) to determine the highlights that form the best 5 minute summary. The knowledge based system 90 may invoke a commercial filter 92 to remove commercials and a slow motion detector 54 to assist in creating the video summary. The analysis module 42 may also invoke other modules to bring information together (e.g., textual information) to author particular program views. For example, if the program 38 is a home video where there is no further information available then the analysis module 42 may create a key-frame summary by identifying key-frames of a multi-level summary and passing the information to be used to generate the program views, and in particular a key frame view, to the description scheme. Referring also to FIG. 3, the analysis module 42 may also include other sub-modules, such as for example, a de-mux/decoder 60, a data and service content analyzer 62, a text processing and text summary generator 64, a close caption analyzer 66, a title frame generator 68, an analysis manager 70, an audiovisual analysis and feature extractor 72, an event detector 74, a key-frame summarizer 76, and a highlight summarizer 78.

The generation module 44 receives the system information 46, for the system description scheme. The system information 46 preferably includes data for the system description scheme 22 generated by the generation module 44 The generation module 44 also receives user information 48 including data for the user description scheme. The user information 48 preferably includes data for the user description scheme generated within the generation module 44 The user input 48 may include, for example, meta information to be included in the program and system description scheme. The user description scheme (or corresponding information) is provided to the analysis module 42 for selective analysis of the program(s) 38 For example, the user description scheme may be suitable for triggering the highlight generation functionality for a particular program and thus generating the preferred views and storing associated data in the program description scheme. The generation module 44 and the analysis module 42 provide data to a data storage unit 50 The storage unit 50 may be any storage device, such as memory or magnetic media.

A search, filtering, and browsing (SFB) module 52 implements the description scheme technique by parsing and extracting information contained within the description scheme. The SFB module 52 may perform filtering, searching, and browsing of the programs 38, on the basis of the information contained in the description schemes. An intelligent software agent is preferably included within the SFB module 52 that gathers and provides user specific information to the generation module 44 to be used in authoring and updating the user description scheme (through the generation module 44). In this manner, desirable content may be provided to the user though a display 80. The selections of the desired program(s) to be retrieved, stored, and/or viewed may be programmed, at least in part, through a graphical user interface 82. The graphical user interface may also include or be connected to a presentation engine for presenting the information to the user through the graphical user interface.

The intelligent management and consumption of audiovisual information using the multi-part description stream device provides a next-generation device suitable for the modem era of information overload. The device responds to changing lifestyles of individuals and families, and allows everyone to obtain the information they desire anytime and anywhere they want.

An example of the use of the device may be as follows. A user comes home from work late Friday evening being happy the work week is finally over. The user desires to catch up with the events of the world and then watch ABC's 20/20 show later that evening. It is now 9 PM and the 20/20 show will start in an hour at 10 PM. The user is interested in the sporting events of the week, and all the news about the Microsoft case with the Department of Justice. The user description scheme may include a profile indicating a desire that the particular user wants to obtain all available information regarding the Microsoft trial and selected sporting events for particular teams. In addition, the system description scheme and program description scheme provide information regarding the content of the available information that may selectively be obtained and recorded. The system, in an autonomous manner, periodically obtains and records the audiovisual information that may be of interest to the user during the past week based on the three description schemes. The device most likely has recorded more than one hour of audiovisual information so the information needs to be condensed in some manner. The user starts interacting with the system with a pointer or voice commands to indicate a desire to view recorded sporting programs. On the display, the user is presented with a list of recorded sporting events including Basketball and Soccer. Apparently the user's favorite Football team did not play that week because it was not recorded. The user is interested in basketball games and indicates a desire to view games. A set of title frames is presented on the display that captures an important moment of each game. The user selects the Chicago Bulls game and indicates a desire to view a 5 minute highlight of the game. The system automatically generates highlights. The highlights may be generated by audio or video analysis, or the program description scheme includes data indicating the frames that are presented for a 5 minute highlight. The system may have also recorded web-based textual information regarding the particular Chicago-Bulls game which may be selected by the user for viewing. If desired, the summarized information may be recorded onto a storage device, such as a DVD with a label. The stored information may also include an index code so that it can be located at a later time. After viewing the sporting events the user may decide to read the news about the Microsoft trial. It is now 9:50 PM and the user is done viewing the news. In fact, the user has selected to delete all the recorded news items after viewing them. The user then remembers to do one last thing before 10 PM in the evening. The next day, the user desires to watch the VHS tape that he received from his brother that day, containing footage about his brother's new baby girl and his vacation to Peru last summer. The user wants to watch the whole 2-hour tape but he is anxious to see what the baby looks like and also the new stadium built in Lima, which was not there last time he visited Peru. The user plans to take a quick look at a visual summary of the tape, browse, and perhaps watch a few segments for a couple of minutes, before the user takes his daughter to her piano lesson at 10 AM the next morning. The user plugs in the tape into his VCR, that is connected to the system, and invokes the summarization functionality of the system to scan the tape and prepare a summary. The user can then view the summary the next morning to quickly discover the baby's looks, and playback segments between the key-frames of the summary to catch a glimpse of the crying baby. The system may also record the tape content onto the system hard drive (or storage device) so the video summary can be viewed quickly. It is now 10:10 PM, and it seems that the user is 10 minutes late for viewing 20/20. Fortunately, the system, based on the three description schemes, has already been recording 20/20 since 10 PM. Now the user can start watching the recorded portion of 20/20 as the recording of 20/20 proceeds. The user will be done viewing 20/20 at 11:10 PM.

The average consumer has an ever increasing number of multimedia devices, such as a home audio system, a car stereo, several home television sets, web browsers, etc. The user currently has to customize each of the devices for optimal viewing and/or listening preferences. By storing the user preferences on a removable storage device, such as a smart card, the user may insert the card including the user preferences into such media devices for automatic customization. This results in the desired programs being automatically recorded on the VCR, and setting of the radio stations for the car stereo and home audio system. In this manner the user only has to specify his preferences at most once, on a single device and subsequently, the descriptors are automatically uploaded into devices by the removable storage device. The user description scheme may also be loaded into other devices using a wired or wireless network connection, e.g. that of a home network. Alternatively, the system can store the user history and create entries in the user description scheme based on the's audio and video viewing habits. In this manner, the user would never need to program the viewing information to obtain desired information. In a sense, the user descriptor scheme enables modeling of the user by providing a central storage for the user's listening, viewing, browsing preferences, and user's behavior. This enables devices to be quickly personalized, and enables other components, such as intelligent agents, to communicate on the basis of a standardized description format, and to make smart inferences regarding the user's preferences.

Many different realizations and applications can be readily derived from FIGS. 2 and 3 by appropriately organizing and utilizing their different parts, or by adding peripherals and extensions as needed. In its most general form, FIG. 2 depicts an audiovisual searching, filtering, browsing, and/or recording appliance that is personalizable. The list of more specific applications/implementations given below is not exhaustive but covers a range.

The user description scheme is a major enabler for personalizable audiovisual appliances. If the structure (syntax and semantics) of the description schemes is known amongst multiple appliances, the user (user) can carry (or otherwise transfer) the information contained within his user description scheme from one appliance to another, perhaps via a smart card—where these appliances support smart card interface—in order to personalize them. Personalization can range from device settings, such as display contrast and volume control, to settings of television channels, radio stations, web stations, web sites, geographic information, and demographic information such as age, zip code etc. Appliances that can be personalized may access content from different sources. They may be connected to the web, terrestrial or cable broadcast, etc., and they may also access multiple or different types of single media such as video, music, etc.

For example, one can personalize the car stereo using a smart card plugged out of the home system and plugged into the car stereo system to be able to tune to favorite stations at certain times. As another example, one can also personalize television viewing, for example, by plugging the smart card into a remote control that in turn will autonomously command the television receiving system to present the user information about current and future programs that fits the user's preferences. Different members of the household can instantly personalize the viewing experience by inserting their own smart card into the family remote. In the absence of such a remote, this same type of personalization can be achieved by plugging in the smart card directly to the television system. The remote may likewise control audio systems. In another implementation, the television receiving system holds user description schemes for multiple users (users) in local storage and identify different users (or group of users) by using an appropriate input interface. For example an interface using user-voice identification technology. It is noted that in a networked system the user description scheme may be transported over the network.

The user description scheme is generated by direct user input, and by using a software that watches the user to determine his/her usage pattern and usage history. User description scheme can be updated in a dynamic fashion by the user or automatically. A well defined and structured description scheme design allows different devices to interoperate with each other. A modular design also provides portability.

The description scheme adds new functionality to those of the current VCR. An advanced VCR system can learn from the user via direct input of preferences, or by watching the usage pattern and history of the user. The user description scheme holds user's preferences users and usage history. An intelligent agent can then consult with the user description scheme and obtain information that it needs for acting on behalf of the user. Through the intelligent agent, the system acts on behalf of the user to discover programs that fit the taste of the user, alert the user about such programs, and/or record them autonomously. An agent can also manage the storage in the system according to the user description scheme, i.e., prioritizing the deletion of programs (or alerting the user for transfer to a removable media), or determining their compression factor (which directly impacts their visual quality) according to user's preferences and history.

The program description scheme and the system description scheme work in collaboration with the user description scheme in achieving some tasks. In addition, the program description scheme and system description scheme in an advanced VCR or other system will enable the user to browse, search, and filter audiovisual programs. Browsing in the system offers capabilities that are well beyond fast forwarding and rewinding. For instance, the user can view a thumbnail view of different categories of programs stored in the system. The user then may choose frame view, shot view, key frame view, or highlight view, depending on their availability and user's preference. These views can be readily invoked using the relevant information in the program description scheme, especially in program views. The user at any time can start viewing the program either in parts, or in its entirety.

In this application, the program description scheme may be readily available from many services such as: (i) from broadcast (carried by EPG defined as a part of ATSC-PSIP (ATSC-Program Service Integration Protocol) in USA or DVB-SI (Digital Video Broadcast-Service Information) in Europe); (ii) from specialized data services (in addition to PSIP/DVB-SI); (iii) from specialized web sites; (iv) from the media storage unit containing the audiovisual content (e.g., DVD); (v) from advanced cameras (discussed later), and/or may be generated (i.e., for programs that are being stored) by the analysis module 42 or by user input 48.

Contents of digital still and video cameras can be stored and managed by a system that implements the description schemes, e.g., a system as shown in FIG. 2. Advanced cameras can store a program description scheme, for instance, in addition to the audiovisual content itself. The program description scheme can be generated either in part or in its entirety on the camera itself via an appropriate user input interface (e.g., speech, visual menu drive, etc.). Users can input to the camera the program description scheme information, especially those high-level (or semantic) information that may otherwise be difficult to automatically extract by the system. Some camera settings and parameters (e.g., date and time), as well as quantities computed in the camera (e.g., color histogram to be included in the color profile), can also be used in generating the program description scheme. Once the camera is connected, the system can browse the camera content, or transfer the camera content and its description scheme to the local storage for future use. It is also possible to update or add information to the description scheme generated in the camera.

The IEEE 1394 and Havi standard specifications enable this type of "audiovisual content" centric communication among devices. The description scheme API's can be used in the context of Havi to browse and/or search the contents of a camera or a DVD which also contain a description scheme associated with their content, i.e., doing more than merely invoking the PLAY API to play back and linearly view the media. The description schemes may be used in archiving audiovisual programs in a database. The search engine uses the information contained in the program description scheme to retrieve programs on the basis of their content. The program description scheme can also be used in navigating through the contents of the database or the query results. The user description scheme can be used in prioritizing the results of the user query during presentation. It is possible of course to make the program description scheme more comprehensive depending on the nature of the particular application.

The description scheme fulfills the user's desire to have applications that pay attention and are responsive to their viewing and usage habits, preferences, and personal demographics. The proposed user description scheme directly addresses this desire in its selection of fields and interrelationship to other description schemes. Because the description schemes are modular in nature, the user can port his user description scheme from one device to another in order to "personalize" the device.

The proposed description schemes can be incorporated into current products similar to those from TiVo and Replay TV in order to extend their entertainment informational value. In particular, the description scheme will enable audiovisual browsing and searching of programs and enable filtering within a particular program by supporting multiple program views such as the highlight view. In addition, the description scheme will handle programs coming from sources other than television broadcasts for which TiVo and Replay TV are not designed to handle. In addition, by standardization of TiVo and Replay TV type of devices, other products may be interconnected to such devices to extend their capabilities, such as devices supporting an MPEG 7 description. MPEG-7 is the Moving Pictures Experts Group-7, acting to standardize descriptions and description schemes for audiovisual information. The device may also be extended to be personalized by multiple users, as desired.

Because the description scheme is defined, the intelligent software agents can communicate among themselves to make intelligent inferences regarding the user's preferences. In addition, the development and upgrade of intelligent software agents for browsing and filtering applications can be simplified based on the standardized user description scheme.

The description scheme is multi-modal in the following sense that it holds both high level (semantic) and low level features and/or descriptors. For example, the high and low level descriptors are actor name and motion model parameters, respectively. High level descriptors are easily readable by humans while low level descriptors are more easily read by machines and less understandable by humans. The program description scheme can be readily harmonized with existing EPG, PSIP, and DVB-SI information facilitating search and filtering of broadcast programs. Existing services can be extended in the future by incorporating additional information using the compliant description scheme.

For example, one case may include audiovisual programs that are prerecorded on a media such as a digital video disc where the digital video disc also contains a description scheme that has the same syntax and semantics of the description scheme that the FSB module uses. If the FSB module uses a different description scheme, a transcoder (converter) of the description scheme may be employed. The user may want to browse and view the content of the digital video disc. In this case, the user may not need to invoke the analysis module to author a program description. However, the user may want to invoke his or her user description scheme in filtering, searching and browsing the digital video disc content. Other sources of program information may likewise be used in the same manner.

It is to be understood that any of the techniques described herein with relation to video are equally applicable to images (such as still image or a frame of a video) and audio (such as radio).

Figure 4:
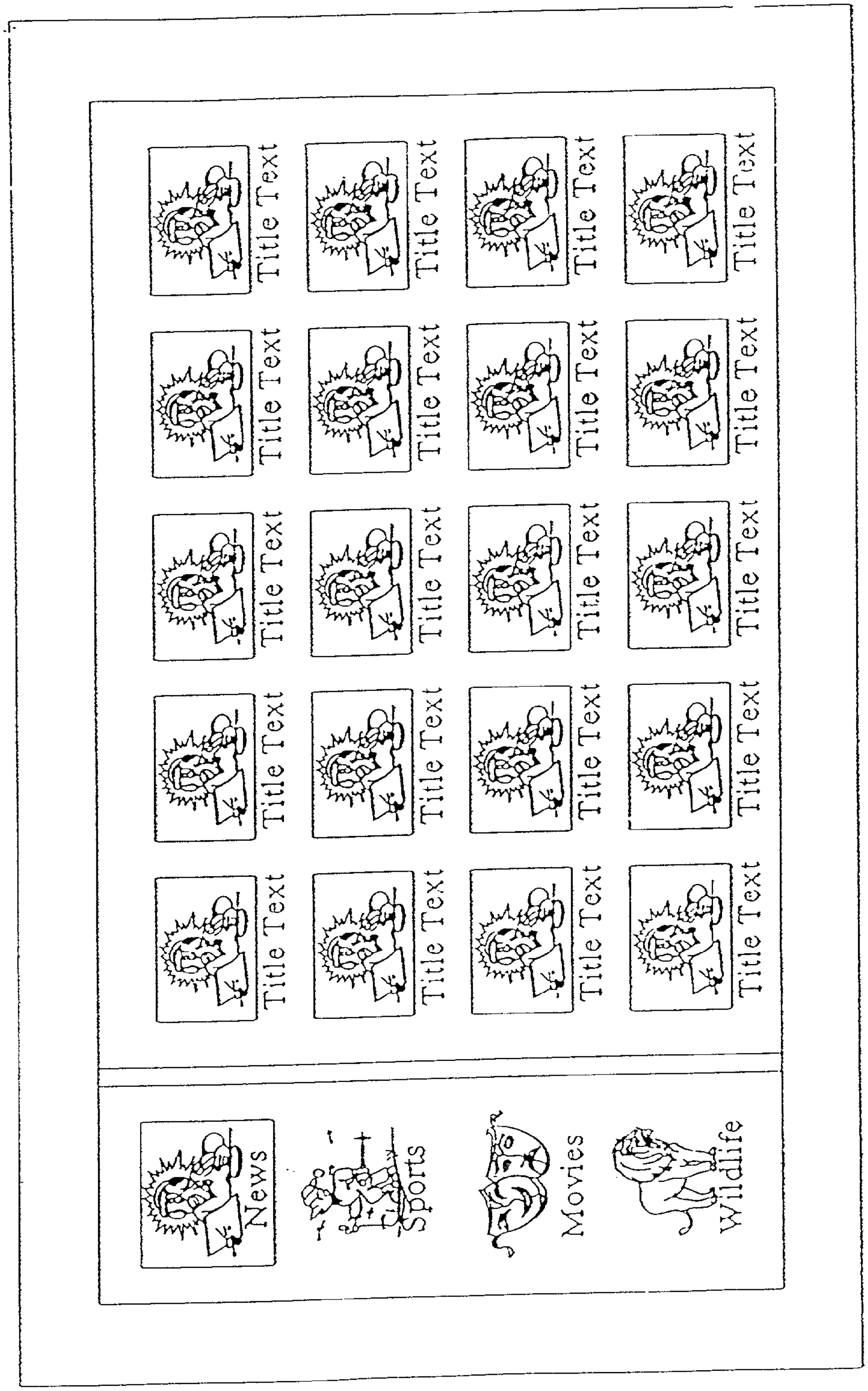
FIG. 4 is an illustration of a thumbnail view (category) for the audiovisual system.
Figure 5:
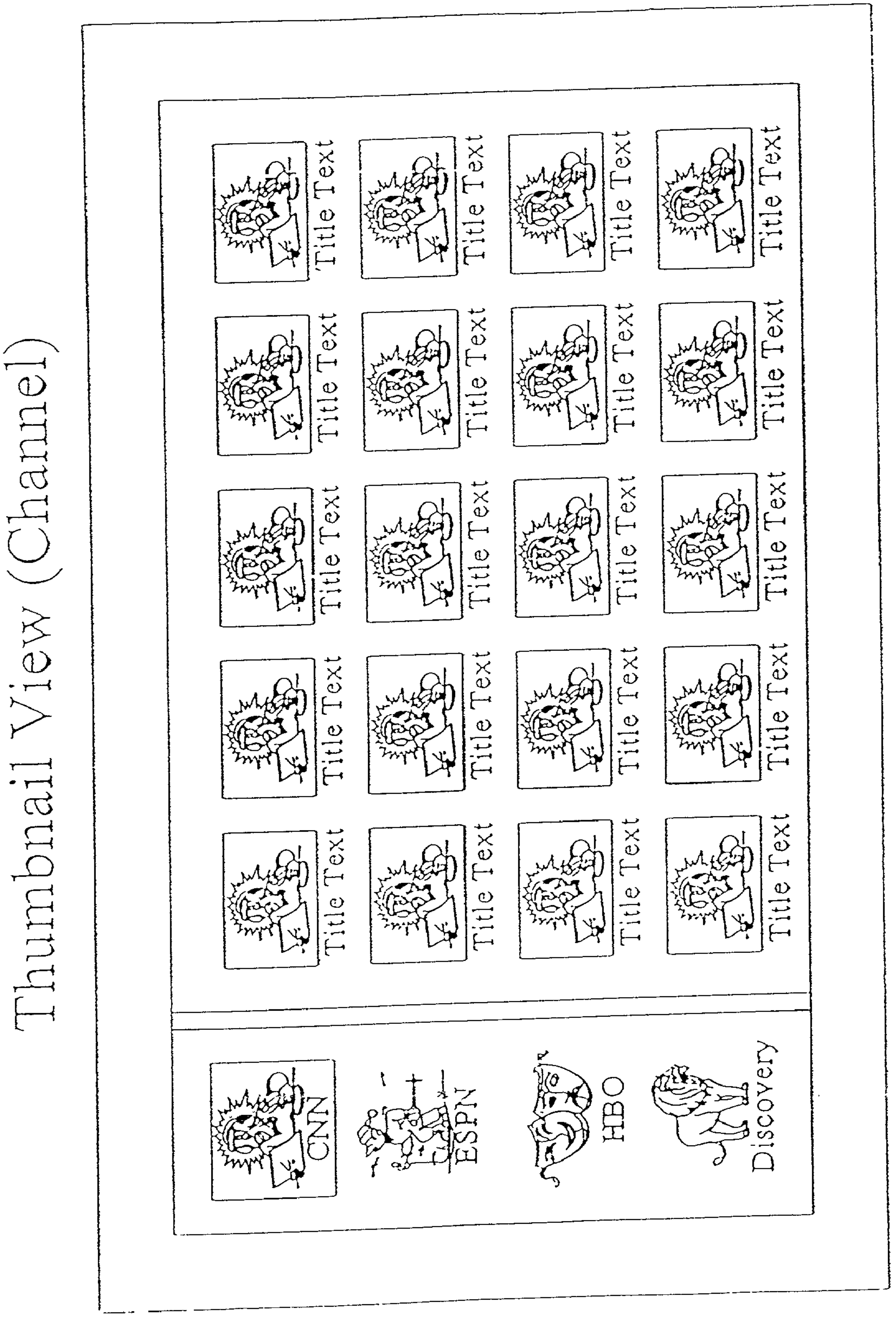
FIG. 5 is an illustration of a thumbnail view (channel) for the audiovisual system.
Figure 6:
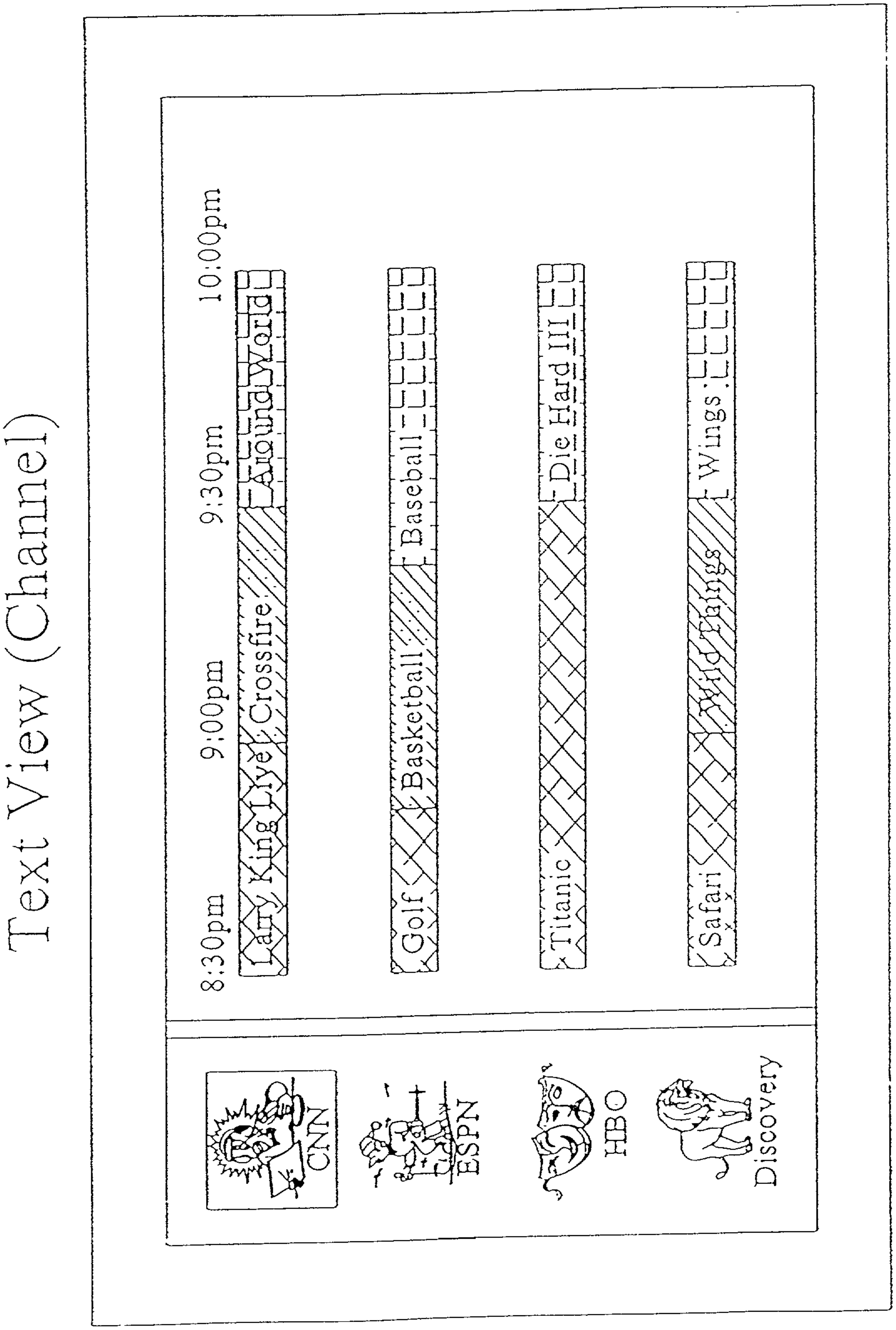
FIG. 6 is an illustration of a text view (channel) for the audiovisual system.
Figure 7:
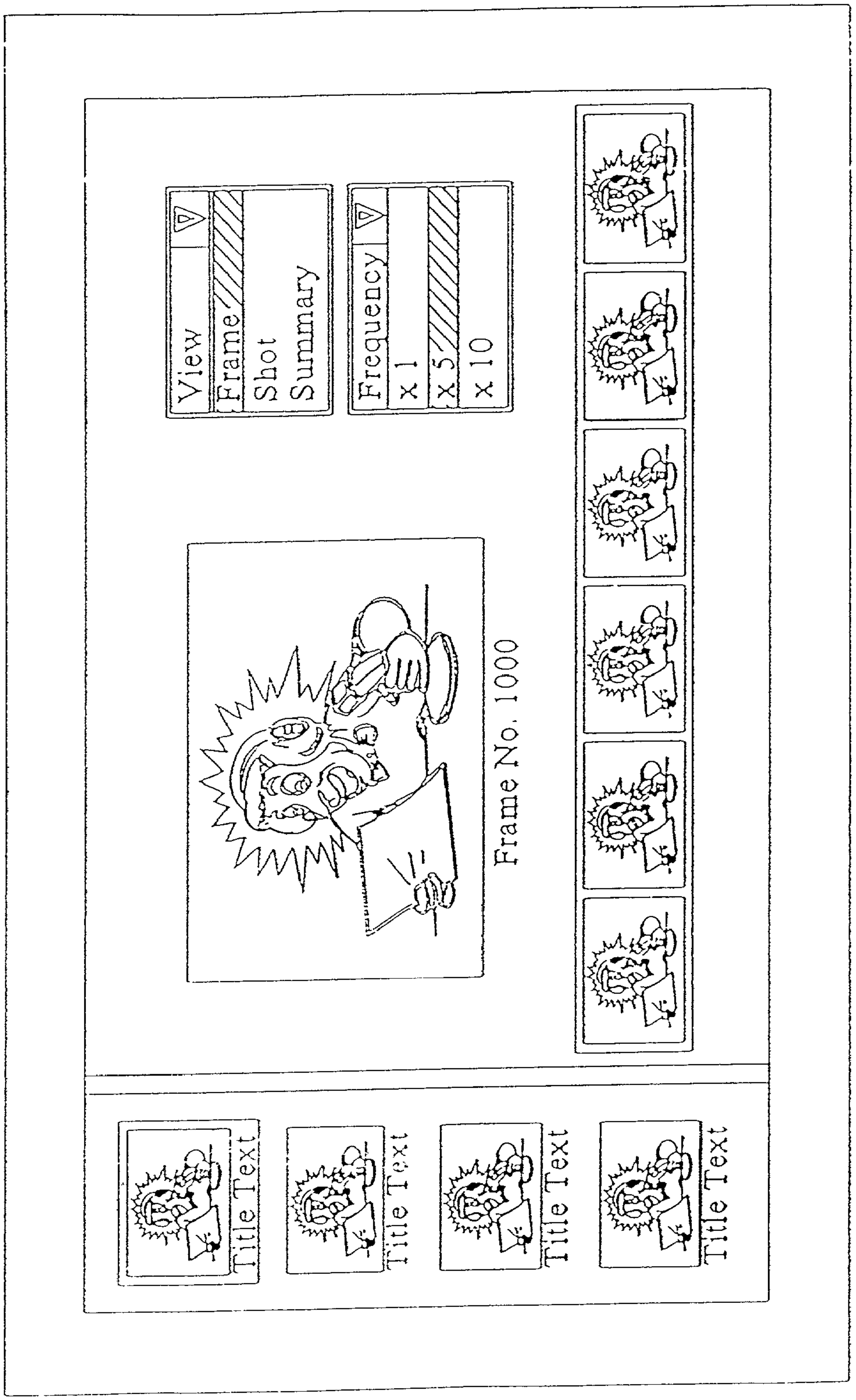
FIG. 7 is an illustration of a frame view for the audiovisual system.
Figure 8:
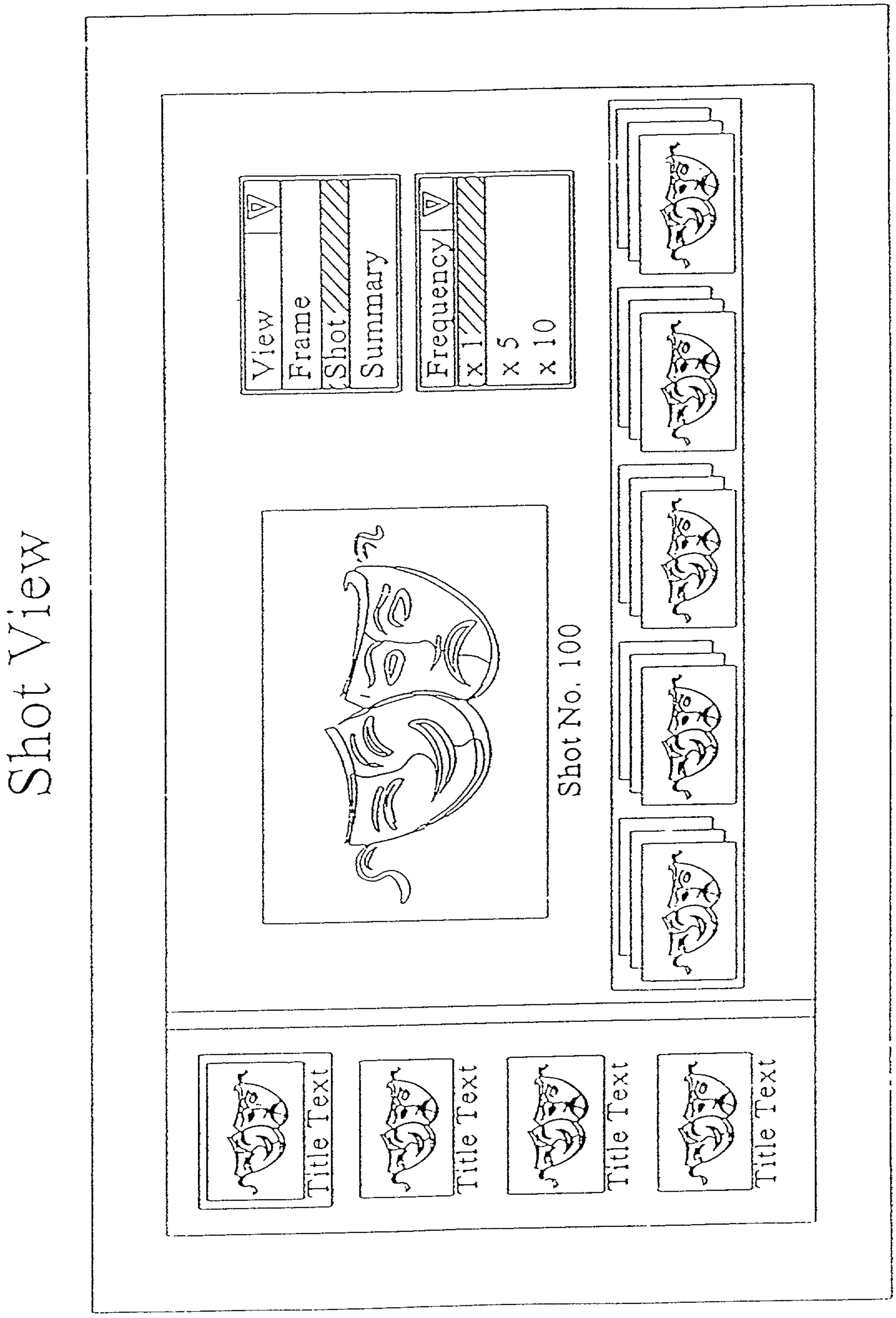
FIG. 8 is an illustration of a shot view for the audiovisual system.
Figure 9:
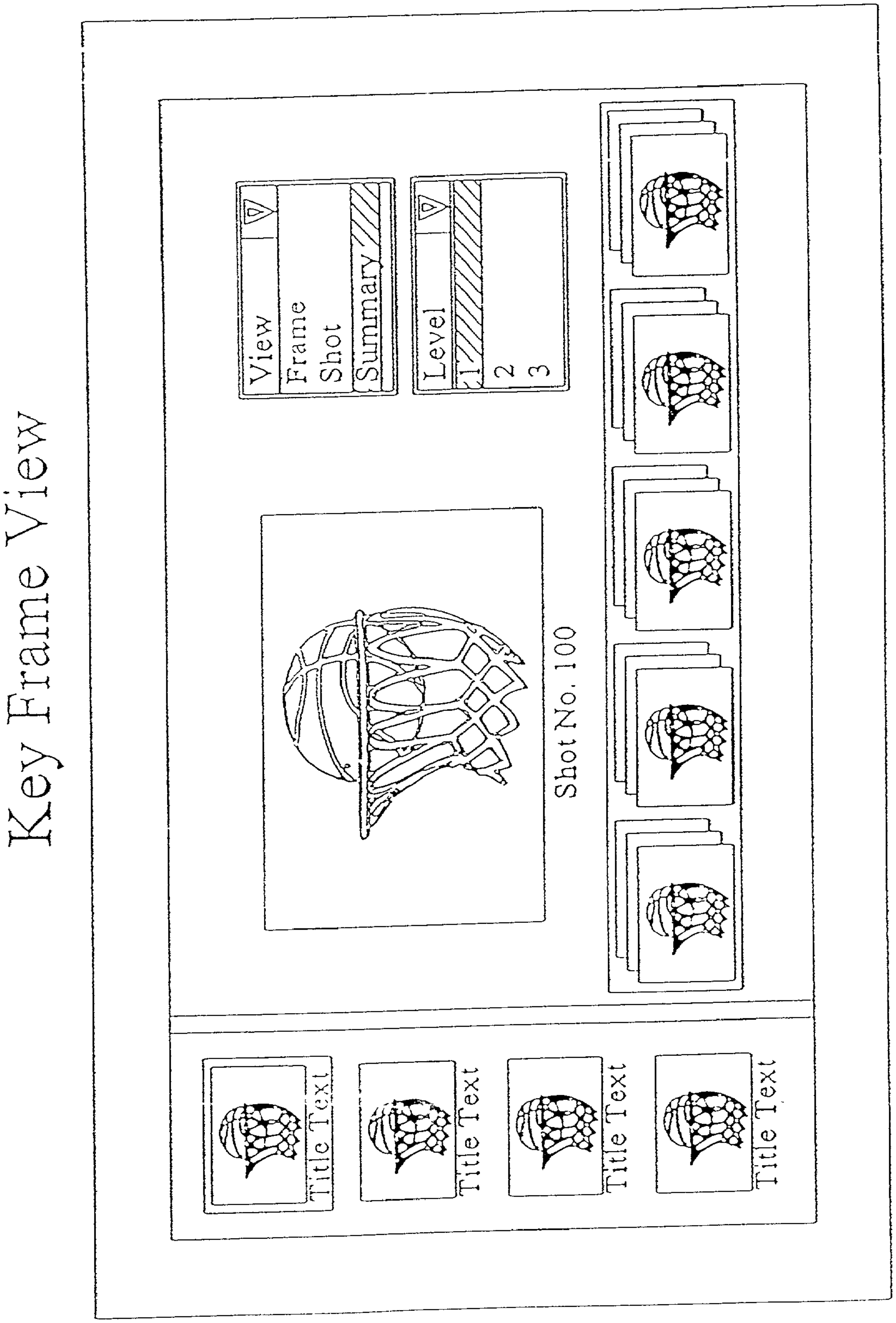
FIG. 9 is an illustration of a key frame view the audiovisual system.
Figure 10:
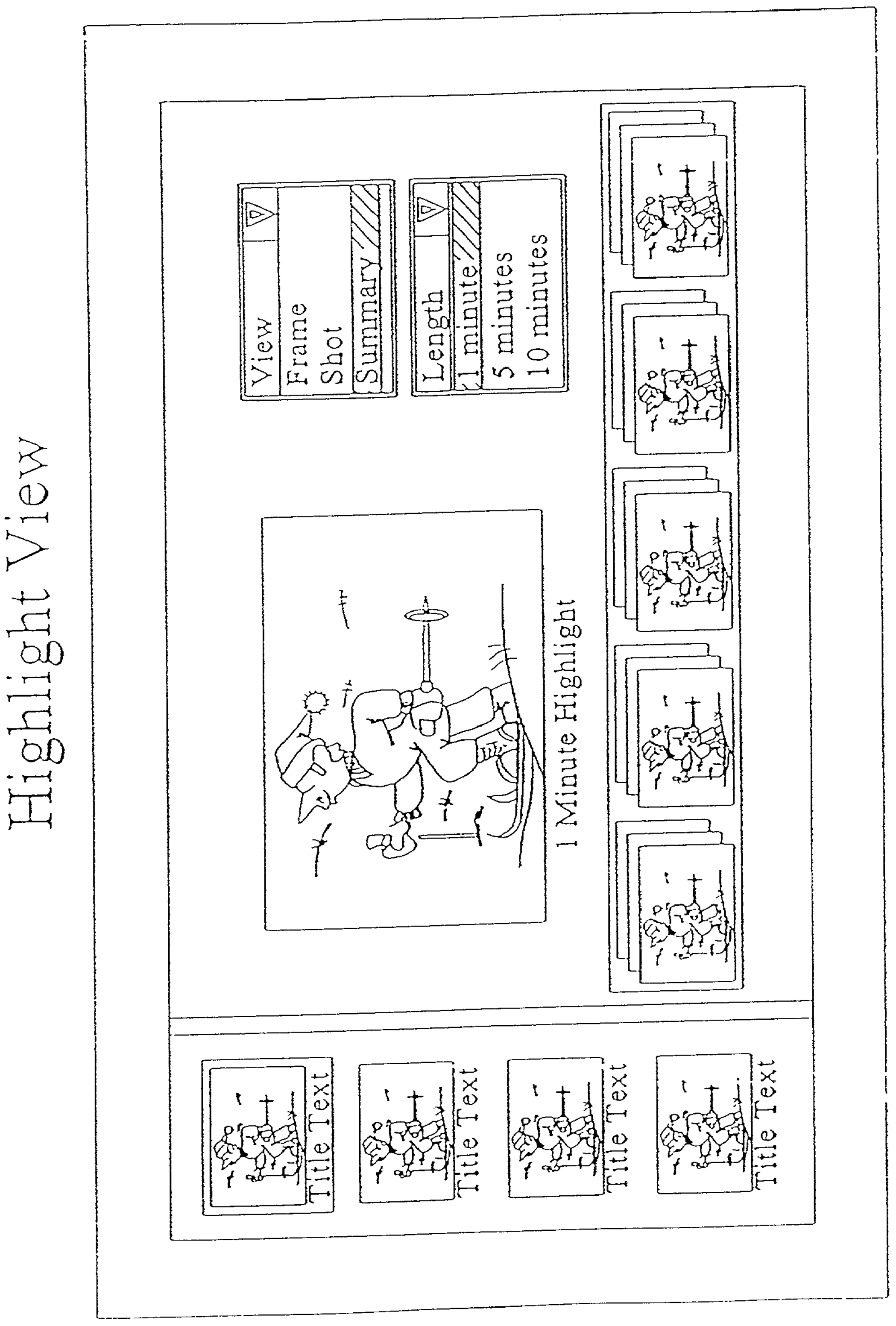
FIG. 10 is an illustration of a highlight view for the audiovisual system.
Figure 11:
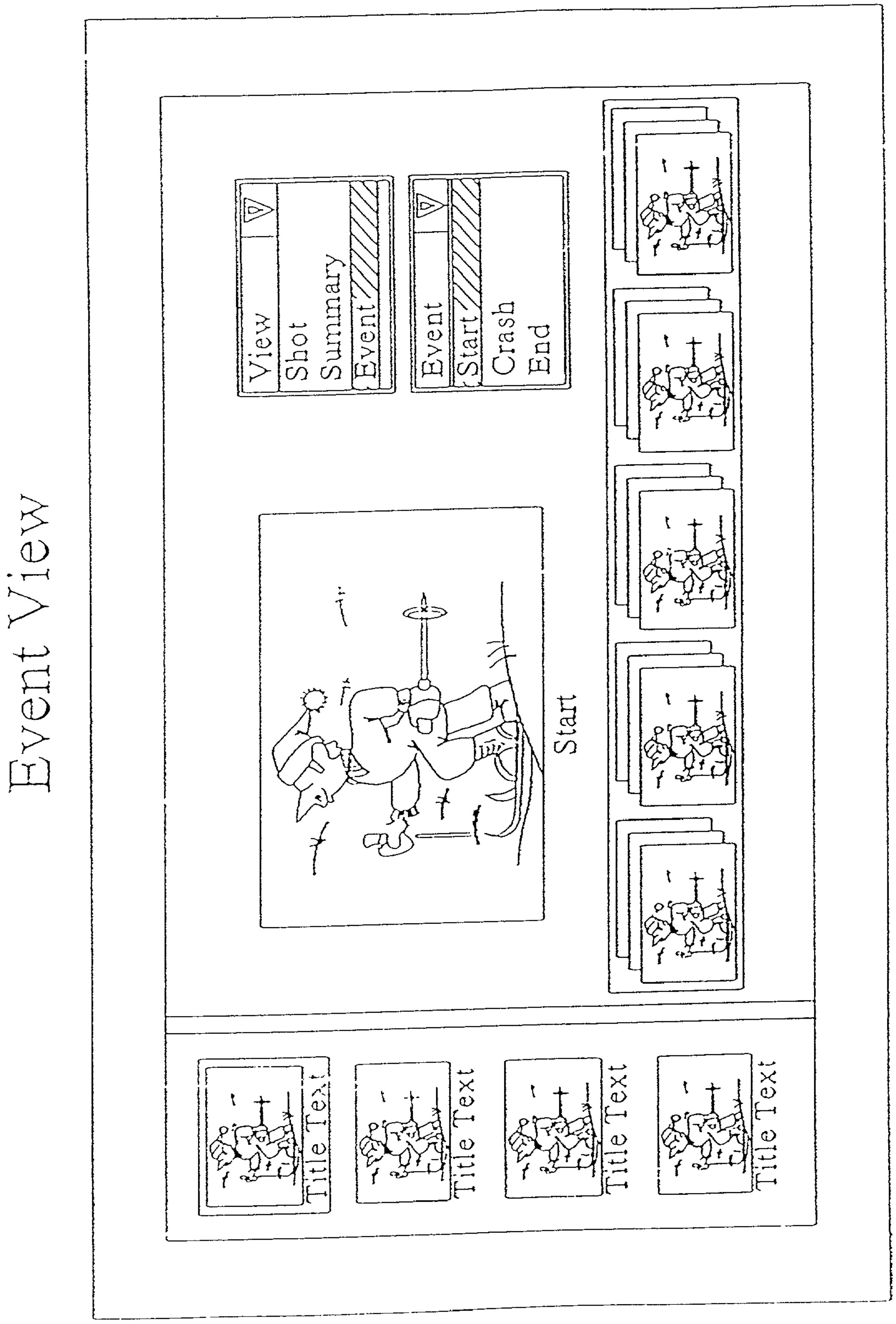
FIG. 11 is an illustration of an event view for the audiovisual system.
Figure 12:
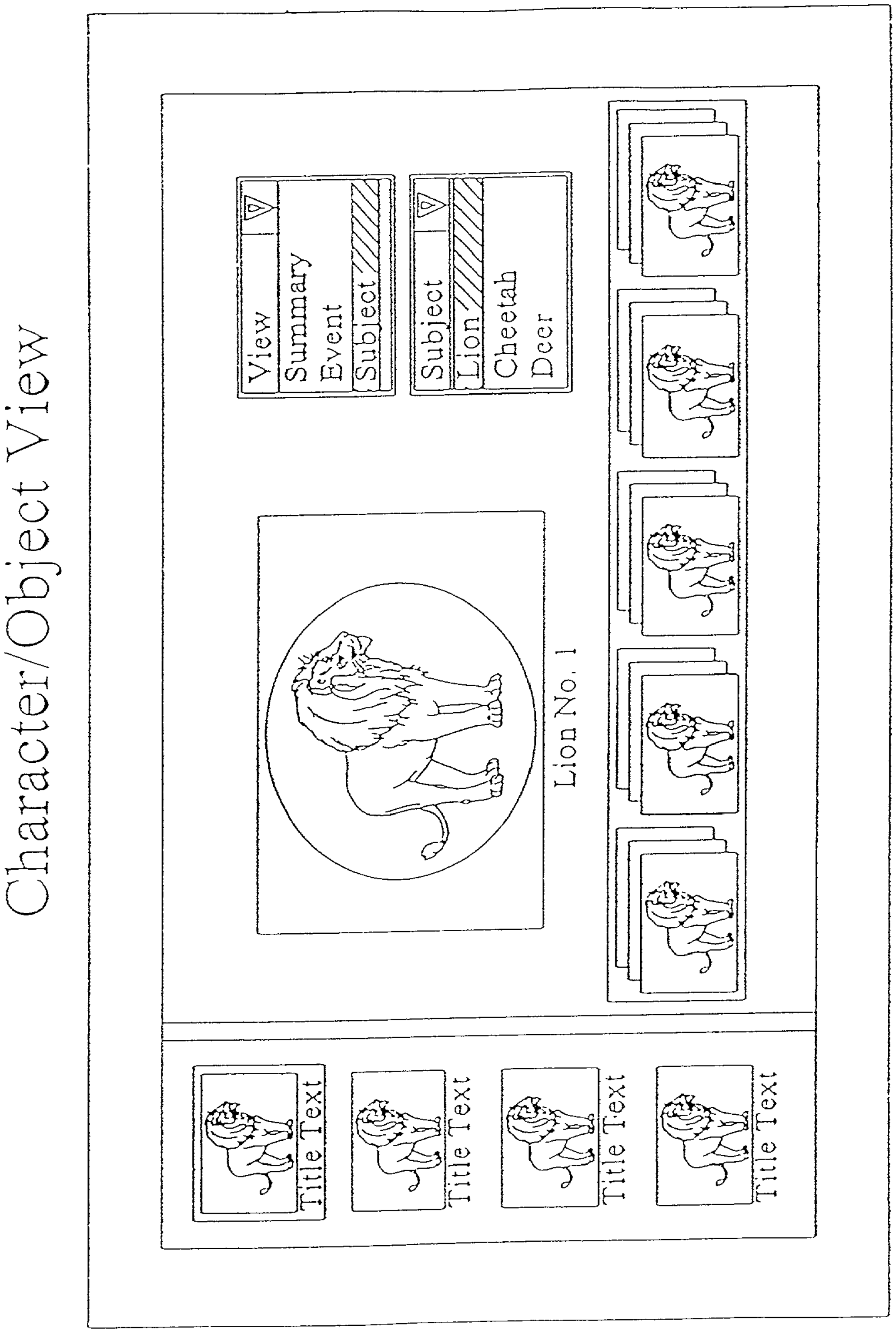
FIG. 12 is an illustration of a character/object view for the audiovisual system.

An example of an audiovisual interface is shown in FIGS. 4-12 which is suitable for the preferred audiovisual description scheme. Referring to FIG. 4, by selecting the thumbnail function as a function of category provides a display with a set of categories on the left hand side. Selecting a particular category, such as news, provides a set of thumbnail views of different programs that are currently available for viewing. In addition, the different programs may also include programs that will be available at a different time for viewing. The thumbnail views are short video segments that provide an indication of the content of the respective actual program that it corresponds with. Referring to FIG. 5, a thumbnail view of available programs in terms of channels may be displayed, if desired. Referring to FIG. 6, a text view of available programs in terms of channels may be displayed, if desired. Referring to FIG. 7, a frame view of particular programs may be displayed, if desired. A representative frame is displayed in the center of the display with a set of representative frames of different programs in the left hand column. The frequency of the number of frames may be selected, as desired. Also a set of frames are displayed on the lower portion of the display representative of different frames during the particular selected program. Referring to FIG. 8, a shot view of particular programs may be displayed, as desired. A representative frame of a shot is displayed in the center of the display with a set of representative frames of different programs in the left hand column. Also a set of shots are displayed on the lower portion of the display representative of different shots (segments of a program, typically sequential in nature) during the particular selected program. Referring to FIG. 9, a key frame view of particular programs may be displayed, as desired. A representative frame is displayed in the center of the display with a set of representative frames of different programs in the left hand column. Also a set of key frame views are displayed on the lower portion of the display representative of different key frame portions during the particular selected program. The number of key frames in each key frame view can be adjusted by selecting the level. Referring to FIG. 10, a highlight view may likewise be displayed, as desired. Referring to FIG. 11, an event view may likewise be displayed, as desired. Referring to FIG. 12, a character/object view may likewise be displayed, as desired.

Figure 13:
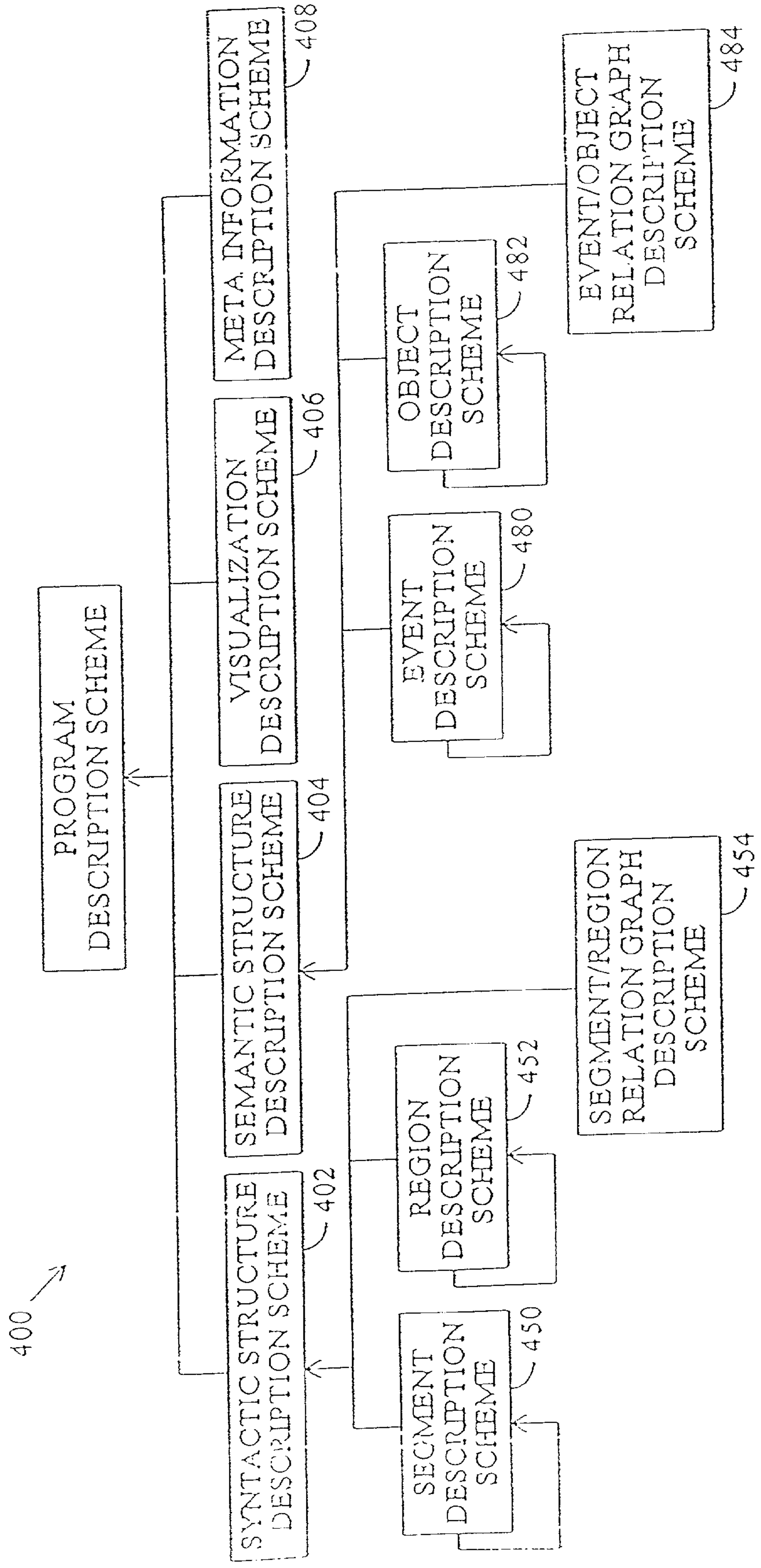
FIG. 13 is an alternative embodiment of a program description scheme including a syntactic structure description scheme, a semantic structure description scheme, a visualization description scheme, and a meta information description scheme.

The present inventors came to the realization that the program description scheme may be further modified to provide additional capabilities. Referring to FIG. 13, the modified program description scheme 400 includes four separate types of information, namely, a syntactic structure description scheme 402, a semantic structure description scheme 404, a visualization description scheme 406, and a meta information description scheme 408. It is to be understood that in any particular system one or more of the description schemes may be included, as desired.

Figure 14:
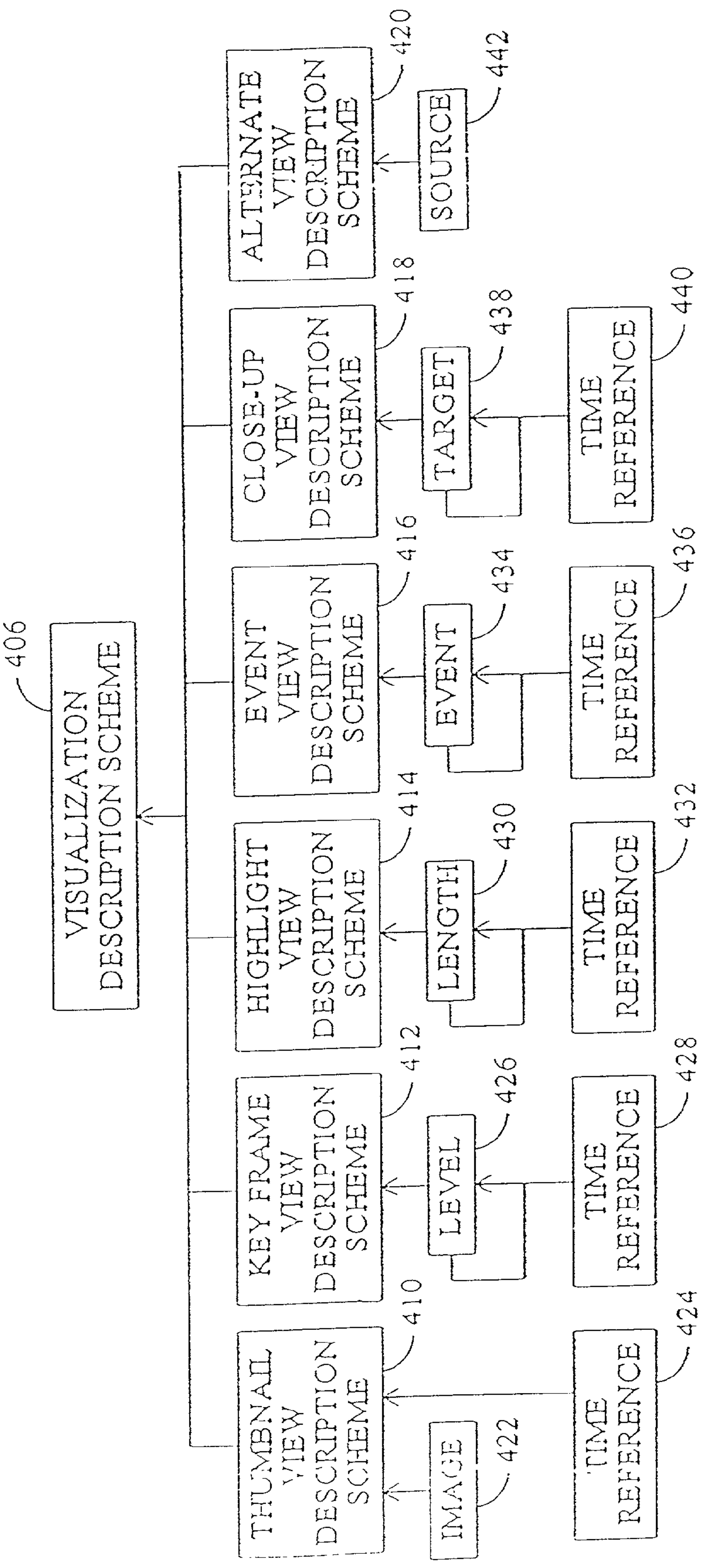
FIG. 14 is an exemplary embodiment of the visualization description scheme of FIG. 13.

Referring to FIG. 14, the visualization description scheme 406 enables fast and effective browsing of video program (and audio programs) by allowing access to the necessary data, preferably in a one-step process. The visualization description scheme 406 provides for several different presentations of the video content (or audio), such as for example, a thumbnail view description scheme 410, a key frame view description scheme 412, a highlight view description scheme 414, an event view description scheme 416, a close-up view description scheme 418, and an alternative view description scheme 420. Other presentation techniques and description schemes may be added, as desired. The thumbnail view description scheme 410 preferably includes an image 422 or reference to an image representative of the video content and a time reference 424 to the video. The key frame view description scheme 412 preferably includes a level indicator 426 and a time reference 428. The level indicator 426 accommodates the presentation of a different number of key frames for the same video portion depending on the user's preference. The highlight view description scheme 414 includes a length indicator 430 and a time reference 432. The length indicator 430 accommodates the presentation of a different highlight duration of a video depending on the user's preference. The event view description scheme 416 preferably includes an event indicator 434 for the selection of the desired event and a time reference 436. The close-up view description scheme 418 preferably includes a target indicator 438 and a time reference 440. The alternate view description scheme preferably includes a source indicator 442. To increase performance of the system it is preferred to specify the data which is needed to render such views in a centralized and straightforward manner. By doing so, it is then feasible to access the data in a simple one-step process without complex parsing of the video.

Figure 15:
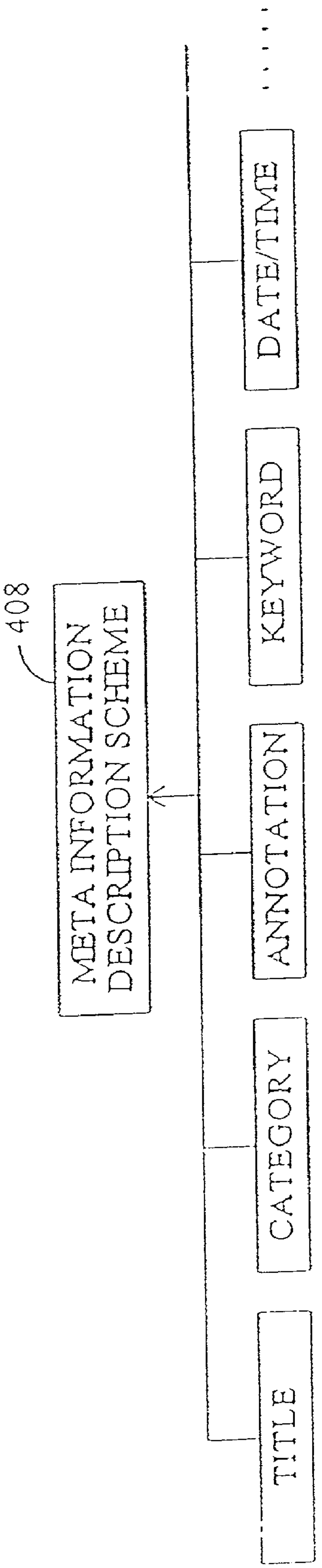
FIG. 15 is an exemplary embodiment of the meta information description scheme of FIG. 13.

Referring to FIG. 15, the meta information description scheme 408 generally includes various descriptors which carry general information about a video (or audio) program such as the title, category, keywords, etc. Additional descriptors, such as those previously described, may be included, as desired.

Figure 16:
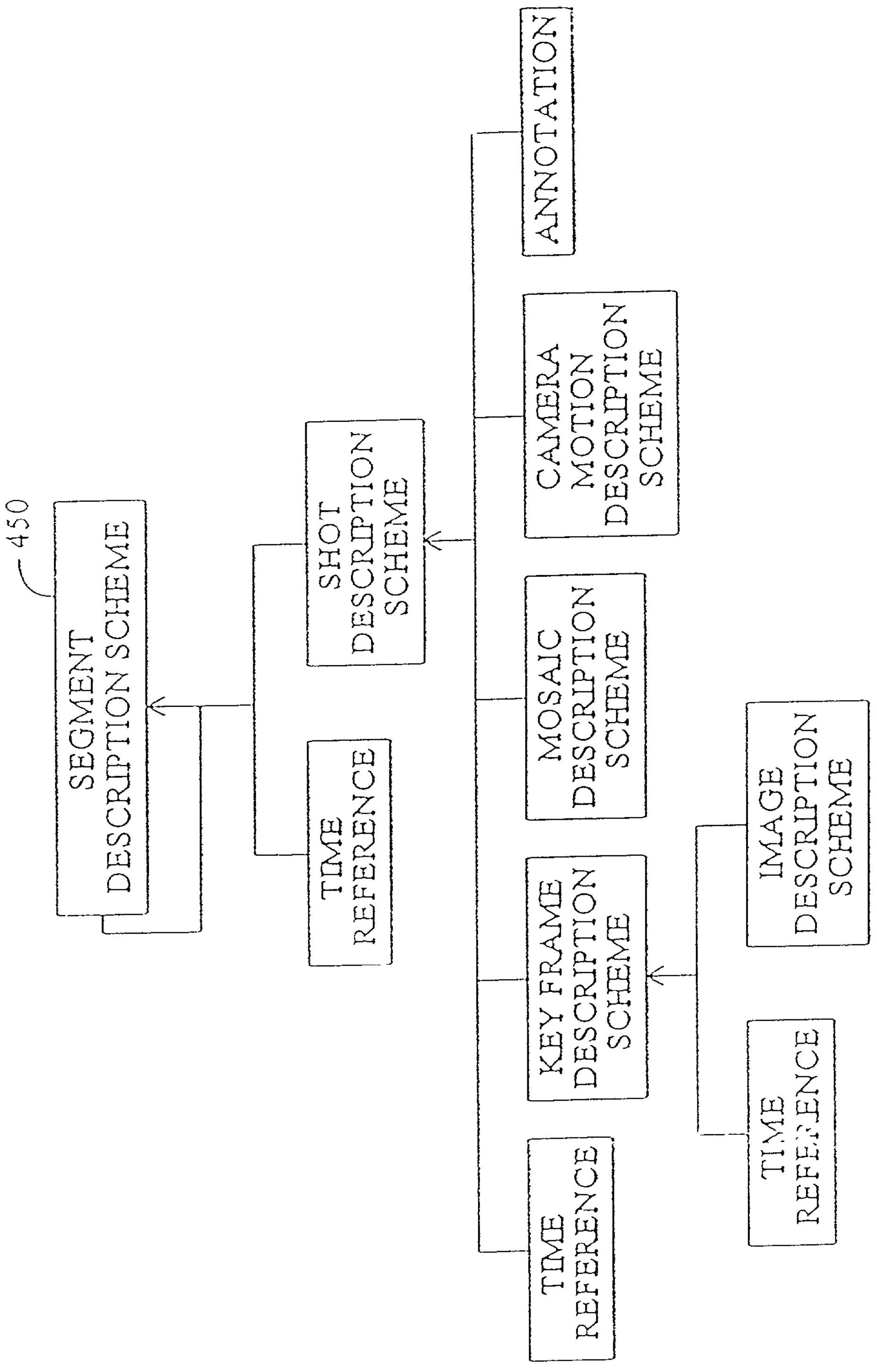
FIG. 16 is an exemplary embodiment of a segment description scheme for the syntactic structure description scheme of FIG. 13.

Referring again to FIG. 13, the syntactic structure description scheme 402 specifies the physical structure of a video program (or audio), e.g., a table of contents. The physical features, may include for example, color, texture, motion, etc. The syntactic structure description scheme 402 preferably includes three modules, namely a segment description scheme 450, a region description scheme 452, and a segment/region relation graph description scheme 454. The segment description scheme 450 may be used to define relationships between different portions of the video consisting of multiple frames of the video. A segment description scheme 450 may contain another segment description scheme 450 and/or shot description scheme to form a segment tree. Such a segment tree may be used to defined a temporal structure of a video program. Multiple segment trees may be created and thereby create multiple table of contents. For example, a video program may be segmented into story units, scenes, and shots, from which the segment description scheme 450 may contain such information as a table of contents. The shot description scheme may contain a number of key frame description schemes, a mosaic description scheme(s), a camera motion description scheme(s), etc. The key frame description scheme may contain a still image description scheme which may in turn contains color and texture descriptors. It is noted that various low level descriptors may be included in the still image description scheme under the segment description scheme. Also, the visual descriptors may be included in the region description scheme which is not necessarily under a still image description scheme. On example of a segment description scheme 450 is shown in FIG. 16.

Figure 17:
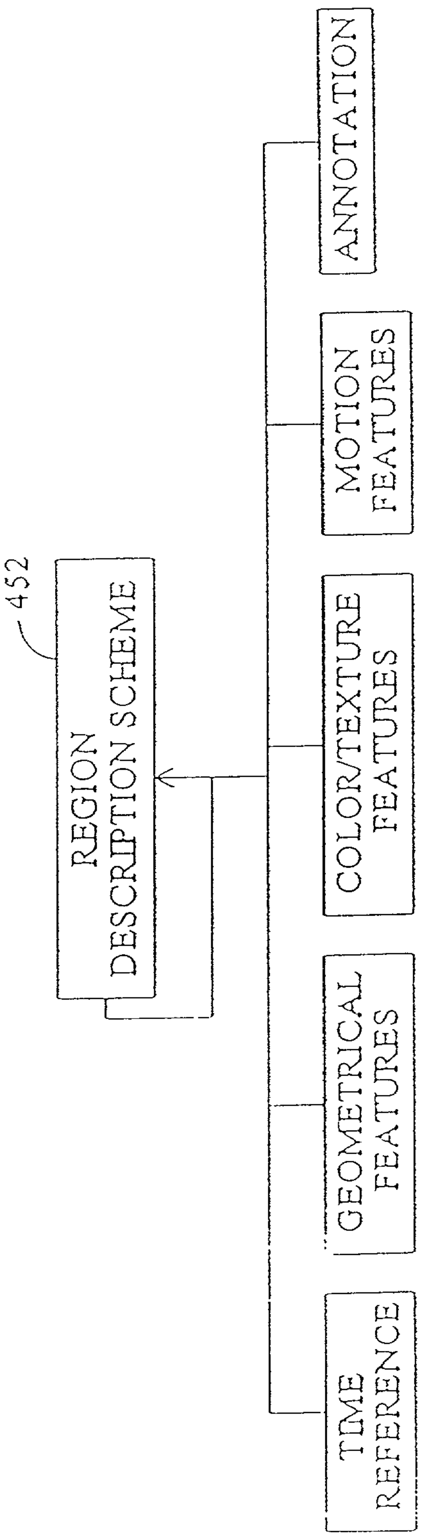
FIG. 17 is an exemplary embodiment of a region description scheme for the syntactic structure description scheme of FIG. 13.

Referring to FIG. 17, the region description scheme 452 defines the interrelationships between groups of pixels of the same and/or different frames of the video. The region description scheme 452 may also contain geometrical features, color, texture features, motion features, etc.

Figure 18:
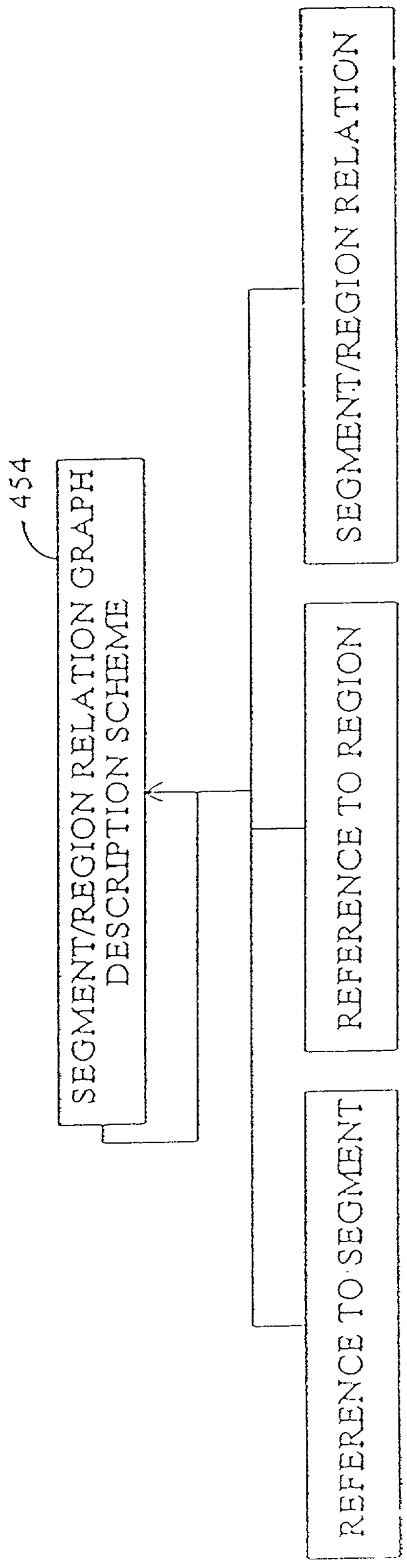
FIG. 18 is an exemplary embodiment of a segment/region relation description scheme for the syntactic structure description scheme of FIG. 13.

Referring to FIG. 18, the segment/region relation graph description scheme 454 defines the interrelationships between a plurality of regions (or region description schemes), a plurality of segments (or segment description schemes), and/or a plurality of regions (or description schemes) and segments (or description schemes).

Figure 19:
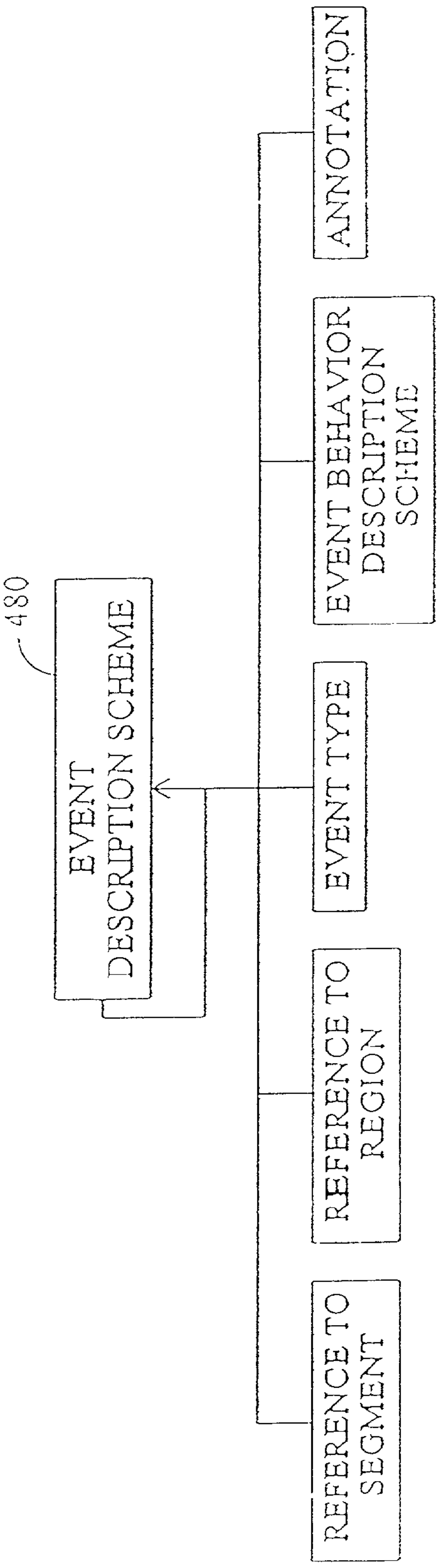
FIG. 19 is an exemplary embodiment of an event description scheme for the semantic structure description scheme of FIG. 13.

Referring again to FIG. 13, the semantic structure description scheme 404 is used to specify semantic features of a video program (or audio), e.g. semantic events. In a similar manner to the syntactic structure description scheme, the semantic structure description scheme 404 preferably includes three modules, namely an event description scheme 480, an object description scheme 482, and an event/objection relation graph description scheme 484. The event description scheme 480 may be used to form relationships between different events of the video normally consisting of multiple frames of the video. An event description scheme 480 may contain another event description scheme 480 to form a segment tree. Such an event segment tree may be used to define a semantic index table for a video program. Multiple event trees may be created and thereby creating multiple index tables. For example, a video program may include multiple events, such as a basketball dunk, a fast break, and a free throw, and the event description scheme may contain such information as an index table. The event description scheme may also contain references which link the event to the corresponding segments and/or regions specified in the syntactic structure description scheme. On example of an event description scheme is shown in FIG. 19.

Figure 20:
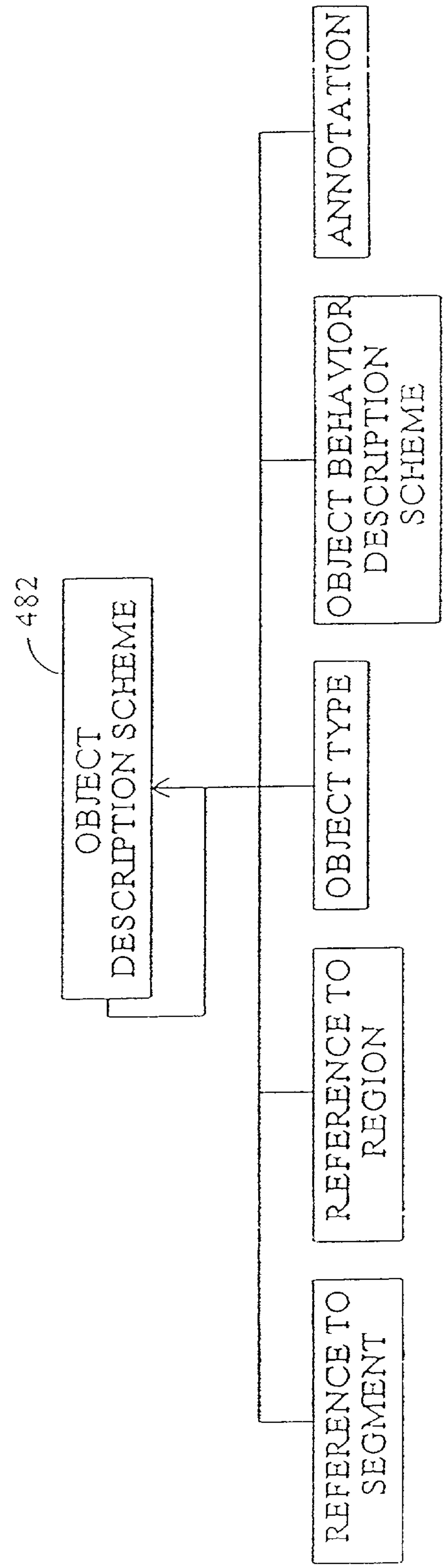
FIG. 20 is an exemplary embodiment of an object description scheme for the semantic structure description scheme of FIG. 13.

Referring to FIG. 20, the object description scheme 482 defines the interrelationships between groups of pixels of the same and/or different frames of the video representative of objects. The object description scheme 482 may contain another object description scheme and thereby form an object tree. Such an object tree may be used to define an object index table for a video program. The object description scheme may also contain references which link the object to the corresponding segments and/or regions specified in the syntactic structure description scheme.

Figure 21:
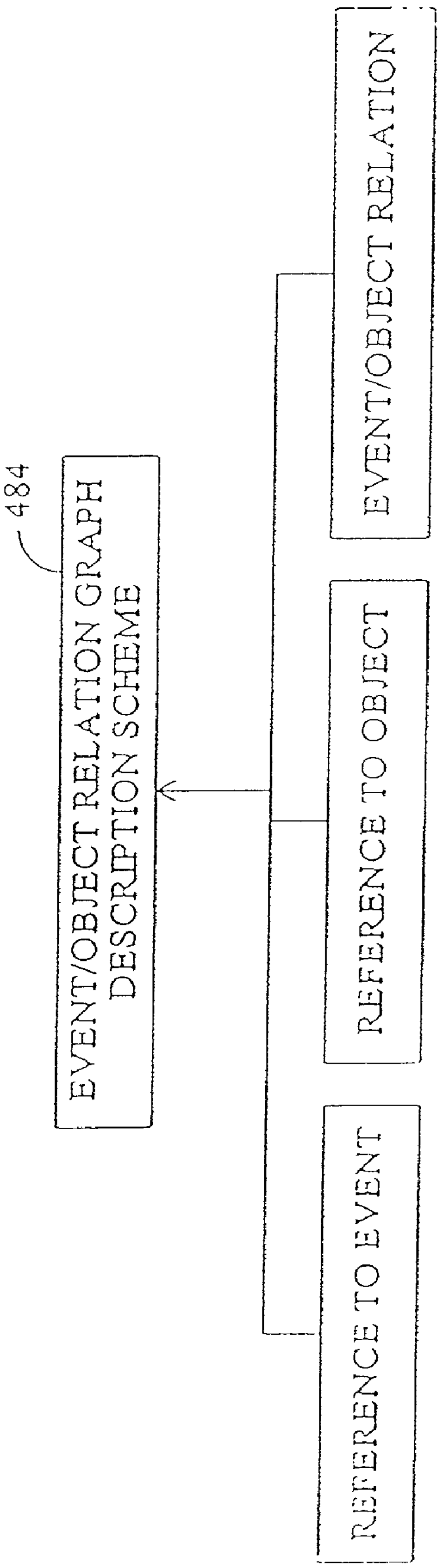
FIG. 21 is an exemplary embodiment of an event/object relation graph description scheme for the syntactic structure description scheme of FIG. 13.

Referring to FIG. 21, the event/object relation graph description scheme 484 defines the interrelationships between a plurality of events (or event description schemes), a plurality of objects (or object description schemes), and/or a plurality of events (or description schemes) and objects (or description schemes).

After further consideration, the present inventors came the realization that the particular design of the user preference description scheme is important to implement portability, while permitting adaptive updating, of the user preference description scheme. Moreover, the user preference description scheme should be readily usable by the system while likewise being suitable for modification based on the user's historical usage patterns. It is possible to collectively track all users of a particular device to build a database for the historical viewing preferences of the users of the device, and thereafter process the data dynamically to determine which content the users would likely desire. However, this implementation would require the storage of a large amount of data and the associated dynamic processing requirements to determine the user preferences. It is to be understood that the user preference description scheme may be used alone or in combination with other description scheme.

Figure 22:
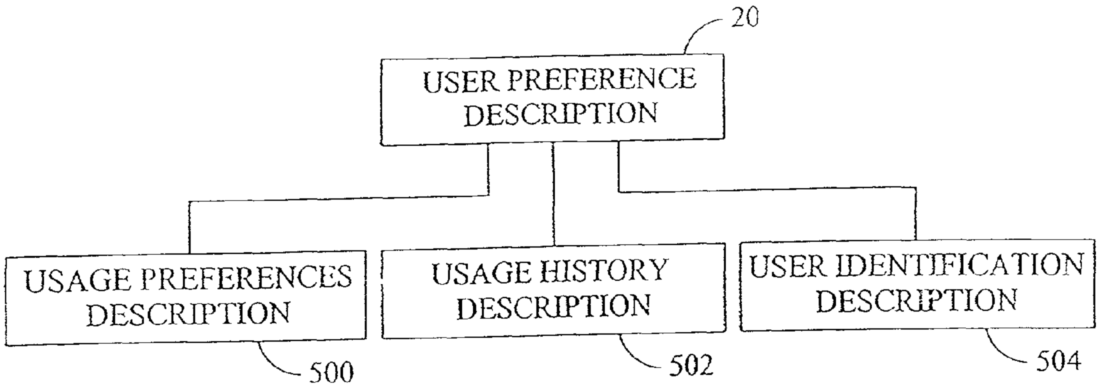
FIG. 22 is an exemplary embodiment of a user preference description scheme.

Referring to FIG. 22, to achieve portability and potentially decreased processing requirements the user preference description scheme 20 should be divided into at least two separate description schemes, namely, a usage preference description scheme 500 and a usage history description scheme 502. The usage preference description scheme 500, described in detail later, includes a description scheme of the user's audio and/or video consumption preferences. The usage preference description scheme 500 describes one or more of the following, depending on the particular implementation, (a) browsing preferences, (b) filtering preferences, (c) searching preferences, and (d) device preferences of the user. The type of preferences shown in the usage preference description scheme 500 are generally immediately usable by the system for selecting and otherwise using the available audio and/or video content. In other words, the usage preference description scheme 500 includes data describing audio and/or video consumption of the user. The usage history description scheme 502, described in detail later, includes a description scheme of the user's historical audio and/or video activity, such as browsing, device settings, viewing, and selection. The usage history description scheme 502 describes one or more of the following, depending on the particular implementation, (a) browsing history,(b) filtering history,(c) searching history, and (d) device usage history. The type of preferences shown in the usage history description scheme 502 are not generally immediately usable by the system for selecting and otherwise using the available audio and/or video content. The data contained in the usage history description scheme 502 may be considered generally "unprocessed", at least in comparison to the data contained in the usage preferences description scheme 500 because it generally contains the historical usage data of the audio and/or video content of the viewer.

In general, capturing the user's usage history facilitates "automatic" composition of user preferences by a machine, as desired. When updating the user preference description scheme 500 it is desirable that the usage history description scheme 502 be relatively symmetric to the usage preference description scheme 500. The symmetry permits more effective updating because less interpretation between the two description schemes is necessary in order to determine what data should be included in the preferences. Numerous algorithms can then be applied in utilization of the history information in deriving user preferences. For instance, statistics can be computed from the history and utilized for this purpose.

After consideration of the usage preference description 500 and the usage history description 502, the present inventors came to the realization that in the home environment many different users with different viewing and usage preferences may use the same device. For example, with a male adult preferring sports, a female adult preferring afternoon talk shows, and a three year old child preferring children's programming, the total information contained in the usage preference description 500 and the usage history description 502 will not be individually suitable for any particular user. The resulting composite data and its usage by the device is frustrating to the users because the device will not properly select and present audio and/or video content that is tailored to any particular user. To alleviate this limitation, the user preference description 20 may also include a user identification (user identifier) description 504. The user identification description 504 includes an identification of the particular user that is using the device. By incorporating a user identification description 504 more than one user may use the device while maintaining a different or a unique set of data within the usage preference description 500 and the usage history description 502. Accordingly, the user identification description 504 associates the appropriate usage preference description(s) 500 and usage history description(s) 502 for the particular user identified by the user identification description 504. With multiple user identification descriptions 504, multiple entries within a single user identification description 504 identifying different users, and/or including the user identification description within the usage preference description 500 and/or usage history description 502 to provide the association therebetween, multiple users can readily use the same device while maintaining their individuality. Also, without the user identification description in the preferences and/or history, the user may more readily customize content anonymously. In addition, the user's user identification description 504 may be used to identify multiple different sets of usage preference descriptions 500—usage history descriptions 502, from which the user may select for present interaction with the device depending on usage conditions. The use of multiple user identification descriptions for the same user is useful when the user uses dultiple different types of devices, such as a television, a home stereo, a business television, a hotel television, and a vehicle audio player, and maintains multiple different sets of preference descriptions. Further, the identification may likewise be used to identify groups of individuals, such as for example, a family. In addition, devices that are used on a temporary basis, such as those in hotel rooms or rental cars, the user identification requirements may be overridden by employing a temporary session user identification assigned by such devices. In applications where privacy concerns may be resolved or are otherwise not a concern, the user identification description 504 may also contain demographic information of the user. In this manner, as the usage history description 502 increases during use over time, this demographic data and/or data regarding usage patterns may be made available to other sources. The data may be used for any purpose, such as for example, providing targeted advertising or programming on the device based on such data.

Figure 23:
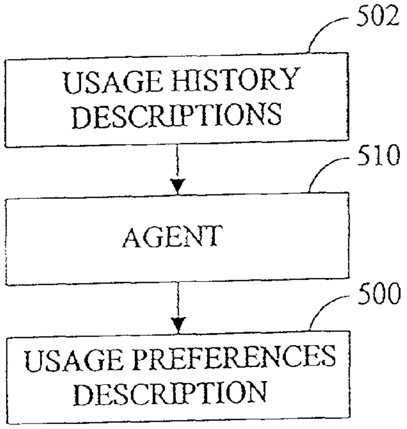
FIG. 23 is an exemplary embodiment of the interrelationship between a usage history description scheme, an agent, and the usage preference description scheme of FIG. 22.

Referring to FIG. 23, periodically an agent 510 processes the usage history description(s) 502 for a particular user to "automatically" determine the particular user's preferences. In this manner, the user's usage preference description 500 is updated to reflect data stored in the usage history description 502. This processing by the agent 510 is preferably performed on a periodic basis so that during normal operation the usage history description 502 does not need to be processed, or otherwise queried, to determine the user's current browsing, filtering, searching, and device preferences. The usage preference description 500 is relatively compact and suitable for storage on a portable storage device, such as a smart card, for use by other devices as previously described.

Frequently, the user may be traveling away from home with his smart card containing his usage preference description 500. During such traveling the user will likely be browsing, filtering, searching, and setting device preferences of audio and/or video content on devices into which he provided his usage preference description 500. However, in some circumstances the audio and/or video content browsed, filtered, searched, and device preferences of the user may not be typically what he is normally interested in. In addition, for a single device the user may desire more than one profile depending on the season, such as football season, basketball season, baseball season, fall, winter, summer, and spring. Accordingly, it may not be appropriate for the device to create a usage history description 502 and thereafter have the agent 510 "automatically" update the user's usage preference description 500. This will in effect corrupt the user's usage preference description 500. Accordingly, the device should include an option that disables the agent 510 from updating the usage preference description 500. Alternatively, the usage preference description 500 may include one or more fields or data structures that indicate whether or not the user desires the usage preference description 500 (or portions thereof) to be updated.

Figure 24:
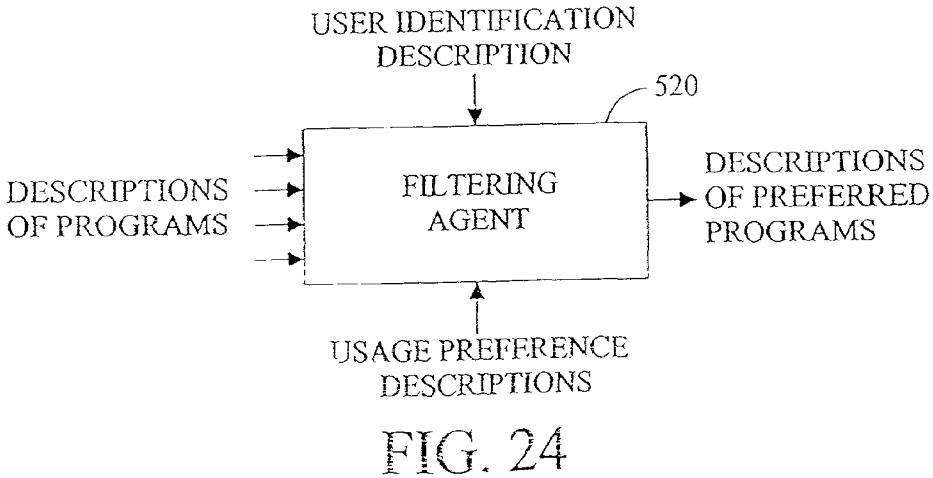
FIG. 24 is an exemplary embodiment of the interrelationship between audio and/or video programs together with their descriptors, user identification, and the usage preference description scheme of FIG. 22.

Referring to FIG. 24, the device may use the program descriptions provided by any suitable source describing the current and/or future audio and/or video content available from which a filtering agent 520 selects the appropriate content for the particular user(s). The content is selected based upon the usage preference description for a particular user identification(s) to determine a list of preferred audio and/or video programs.

As it may be observed, with a relatively compact user preference description 500 the user's preferences are readily movable to different devices, such as a personal video recorder, a TiVO player, a RePlay Networks player, a car audio player, or other audio and/or video appliance. Yet, the user preference description 500 may be updated in accordance with the user's browsing, filtering, searching, and device preferences.

Figure 25:
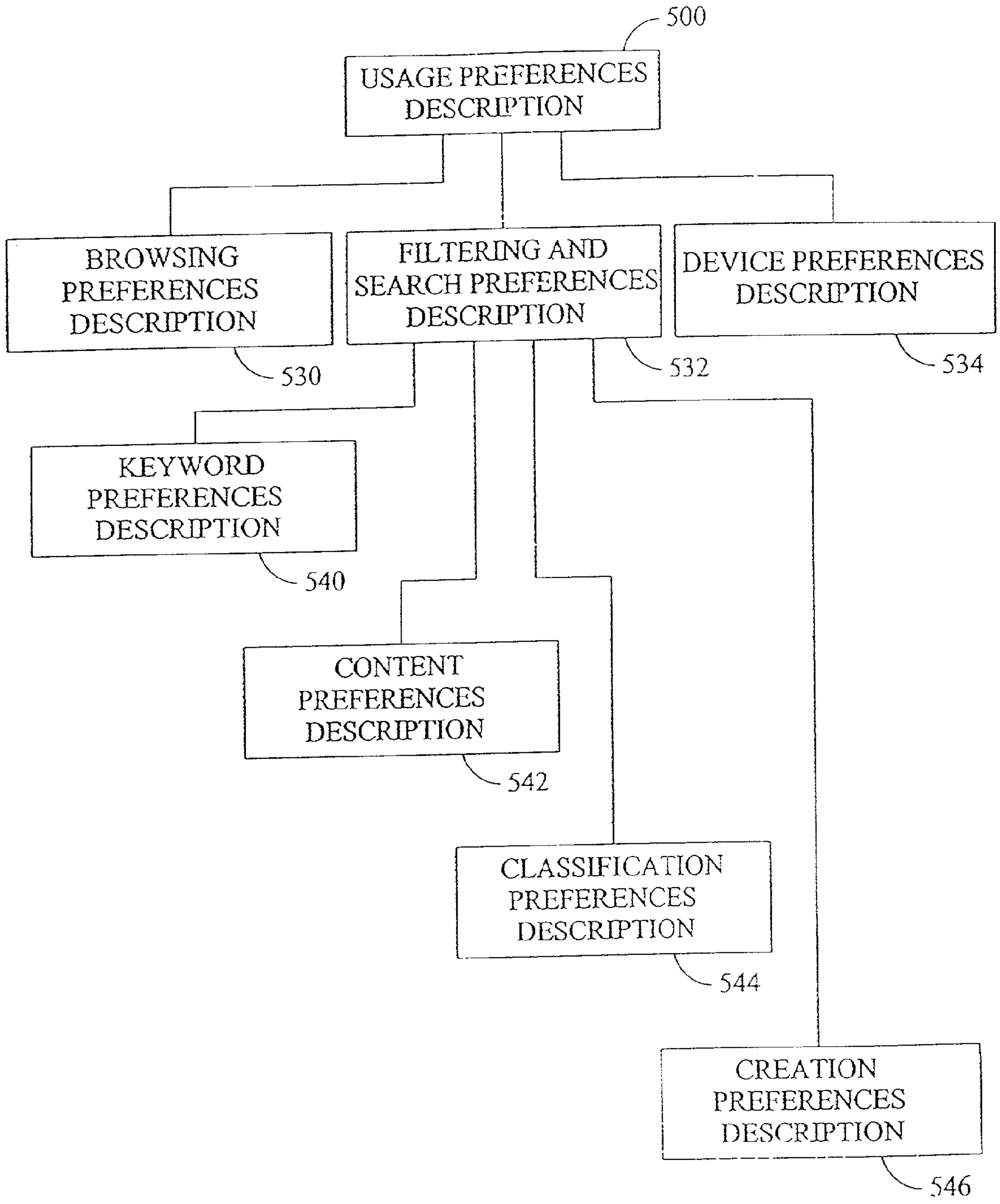
FIG. 25 is an exemplary embodiment of a usage preference description scheme of FIG. 22.

Referring to FIG. 25, the usage preference description 500 preferably includes three different categories of descriptions, depending on the particular implementation. The preferred descriptions include (a) browsing preferences description 530, (b) filtering and search preferences description, 532 and (c) device preferences description 534. The browsing preferences description 530 relates to the viewing preferences of audio and/or video programs. The filtering and search preferences description 532 relates to audio and/or video program level preferences. The program level preferences are not necessarily used at the same time as the (browsing) viewing preferences. For example, preferred programs can be determined as a result of filtering program descriptions according to user's filtering preferences. A particular preferred program may subsequently be viewed in accordance with user's browsing preferences. Accordingly, efficient implementation may be achieved if the browsing preferences description 530 is separate, at least logically, from the filtering and search preferences description 532. The device preferences description 534 relates to the preferences for setting up the device in relation to the type of content being presented, e.g. romance, drama, action, violence, evening, morning, day, weekend, weekday, and/or the available presentation devices. For example, presentation devices may include stereo sound, mono sound, surround sound, multiple potential displays, multiple different sets of audio speakers, AC-3, and Dolby Digital. It may likewise be observed that the device preferences description 534 is likewise separate, at least logically, from the browsing description 530 and filtering/search preferences description 532.

The browsing preferences description 530 contains descriptors that describe preferences of the user for browsing multimedia (audio and/or video) information. In the case of video, for example, the browsing preferences may include user's preference for continuous playback of the entire program versus visualizing a short summary of the program. Various summary types may be described in the program descriptions describing multiple different views of programs where these descriptions are utilized by the device to facilitate rapid non-linear browsing, viewing, and navigation. Parameters of the various summary types should also be specified, i.e., number of hierarchy levels when the keyframe summary is preferred, or the time duration of the video highlight when highlight summary is preferred. In addition, browsing preferences may also include descriptors describing parental control settings. A switch descriptor (set by the user) should also be included to specify whether or not the preferences can be modified without consulting the user first. This prevents inadvertent changing or updating of the preferences by the device. In addition, it is desirable that the browsing preferences are media content dependent. For example, a user may prefer 15 minute video highlight of a basketball game or may prefer to see only the 3-point shots. The same user may prefer a key-frame summary with two levels of hierarchy for home videos.

The filtering and search preferences description 532 preferably has four descriptions defined therein, depending on the particular embodiment. The keyword preferences description 540 is used to specify favorite topics that may not be captured in the title, category, etc., information. This permits the acceptance of a query for matching entries in any of the available data fields. The content preferences description 542 is used to facilitate capturing, for instance, favorite actors, directors. The creation preferences description 544 is used to specify capturing, for instance, titles of favorite shows. The classification preferences description 546 is used to specify descriptions, for instance, a favorite program category. A switch descriptor, activated by the user, may be included to specify whether or not the preferences may be modified without consulting the user, as previously described.

The device preferences description 534 contains descriptors describing preferred audio and/or video rendering settings, such as volume, balance, bass, treble, brightness, contrast, closed captioning, AC-3, Dolby digital, which display device of several, type of display device, etc. The settings of the device relate to how the user browses and consumes the audio and/or video content. It is desirable to be able to specify the device setting preferences in a media type and content-dependent manner. For example the preferred volume settings for an action movie may be higher than a drama, or the preferred settings of bass for classical music and rock music may be different. A switch descriptor, activated by the user, may be included to specify whether or not the preferences may be modified without consulting the user, as previously described.

Figure 26:
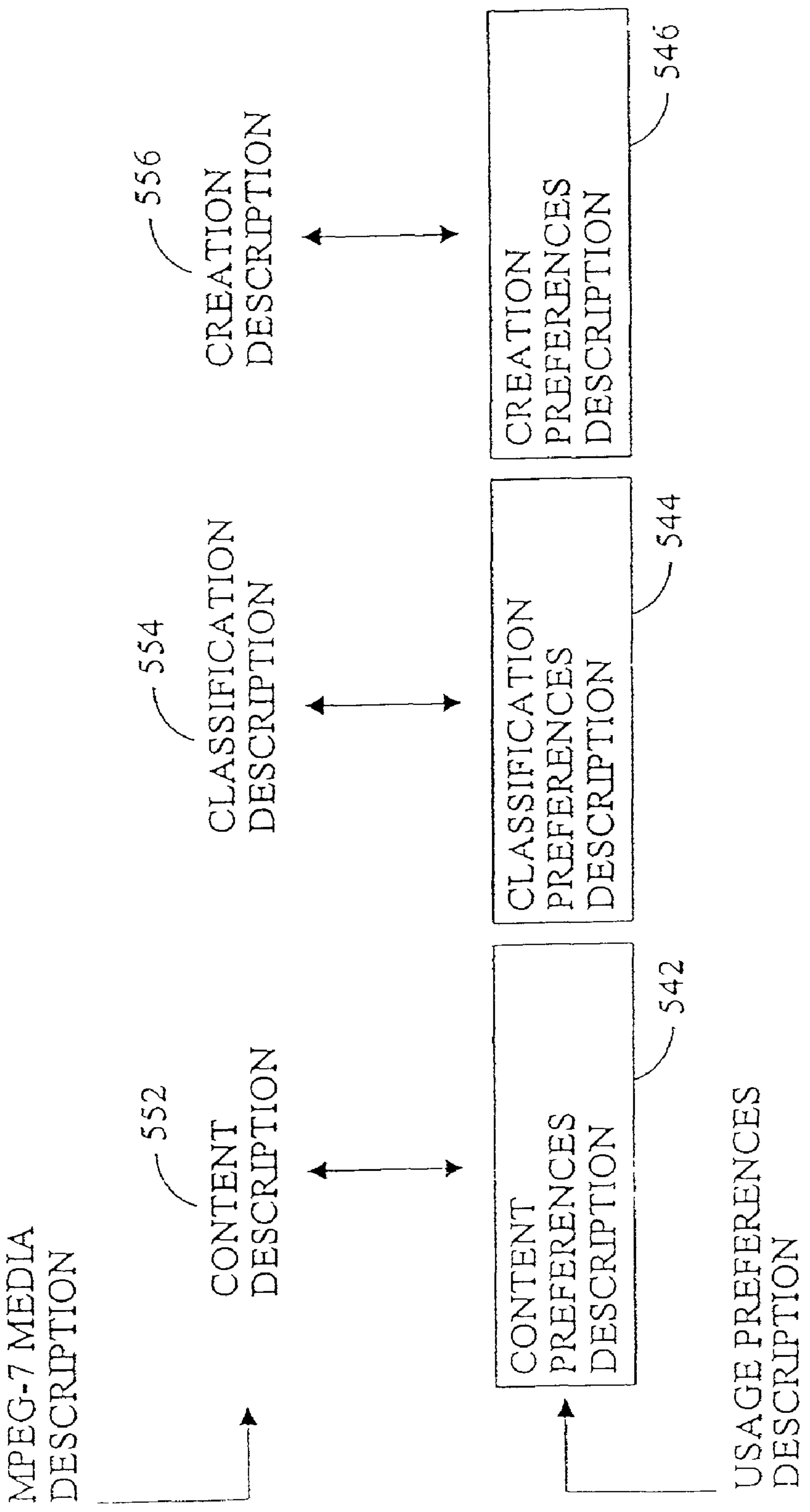
FIG. 26 is an exemplary embodiment of the interrelationship between the usage description schemes and an MPEG-7 description schemes.

Referring to FIG. 26, the usage preferences description may be used in cooperation with an MPEG-7 compliant data stream and/or device. MPEG-7 descriptions are described in ISO/IEC JTC1/SC29/WG11 "MPEG-7 Media/Meta DSs (V0.2), August 1999, incorporated by reference herein. It is preferable that media content descriptions are consistent with descriptions of preferences of users consuming the media. Consistency can be achieved by using common descriptors in media and user preference descriptions or by specifying a correspondence between user preferences and media descriptors. Browsing preferences descriptions are preferably consistent with media descriptions describing different views and summaries of the media. The content preferences description 542 is preferably consistent with, e.g., a subset of the content description of the media 553 specified in MPEG-7 by content description scheme. The classification preferences description 544 is preferably consistent with, e.g., a subset of the classification description 554 defined in MPEG-7 as classification description scheme. The creation preferences description 546 is preferably consistent with, e.g., a subset of the creation description 556 specified in MPEG-7 by creation description scheme. The keyword preferences description 540 is preferably a string supporting multiple languages and consistent with corresponding media content description schemes. Consistency between media and user preference descriptions is depicted or shown in FIG. 26 by couble arrows in the case of content, creation, and classification preferences.

Figure 27:
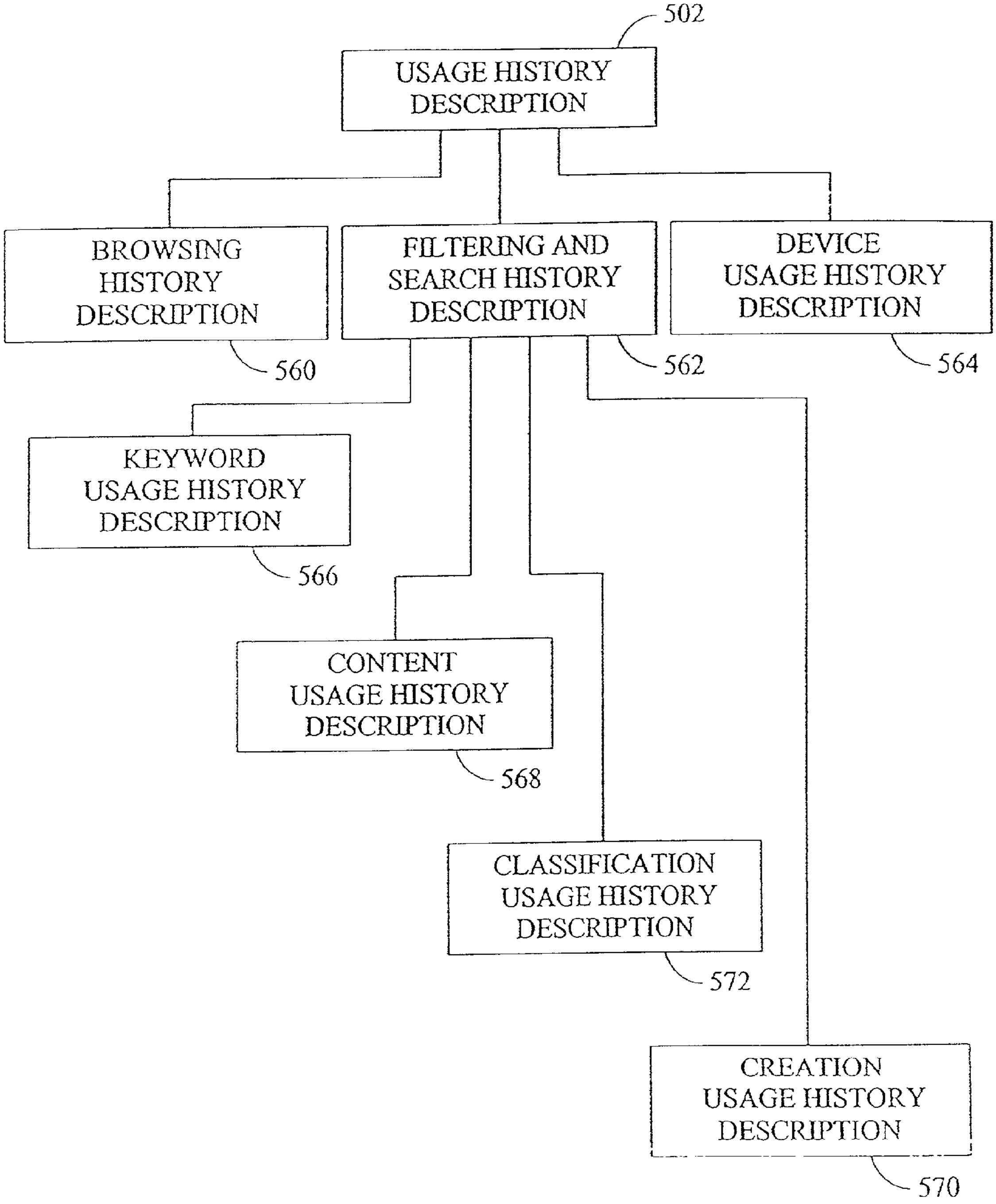
FIG. 27 is an exemplary embodiment of a usage history description scheme of FIG. 22.

Referring to FIG. 27, the usage history description 502 preferably includes three different categories of descriptions, depending on the particular implementation. The preferred descriptions include (a) browsing history description 560, (b) filtering and search history description 562, and (c) device usage history description 564, as previously described in relation to the usage preference description 500. The filtering and search history description 562 preferably has four descriptions defined therein, depending on the particular embodiment, namely, a keyword usage history description 566, a content usage history description 568, a creation preferences description 570, and a classification usage history description 572, as previously described with respect to the preferences. The usage history description 502 may contain additional descriptors therein (or description if desired) that describe the time and/or time duration of information contained therein. The time refers to the duration of consuming a particular audio and/or video program. The duration of time that a particular program has been viewed provides information that may be used to determine user preferences. For example, if a user only watches a show for 5 minutes then it may not be a suitable preference for inclusion the usage preference description 500. In addition, the present inventors came to the realization that an even more accurate measure of the user's preference of a particular audio and/or video program is the time viewed in light of the total duration of the program. This accounts for the relative viewing duration of a program. For example watching 30 minutes of a 4 hour show may be of less relevance than watching 30 minutes of a 30 minute show to determine preference data for inclusion in the usage preference description 500.

Figure 28:
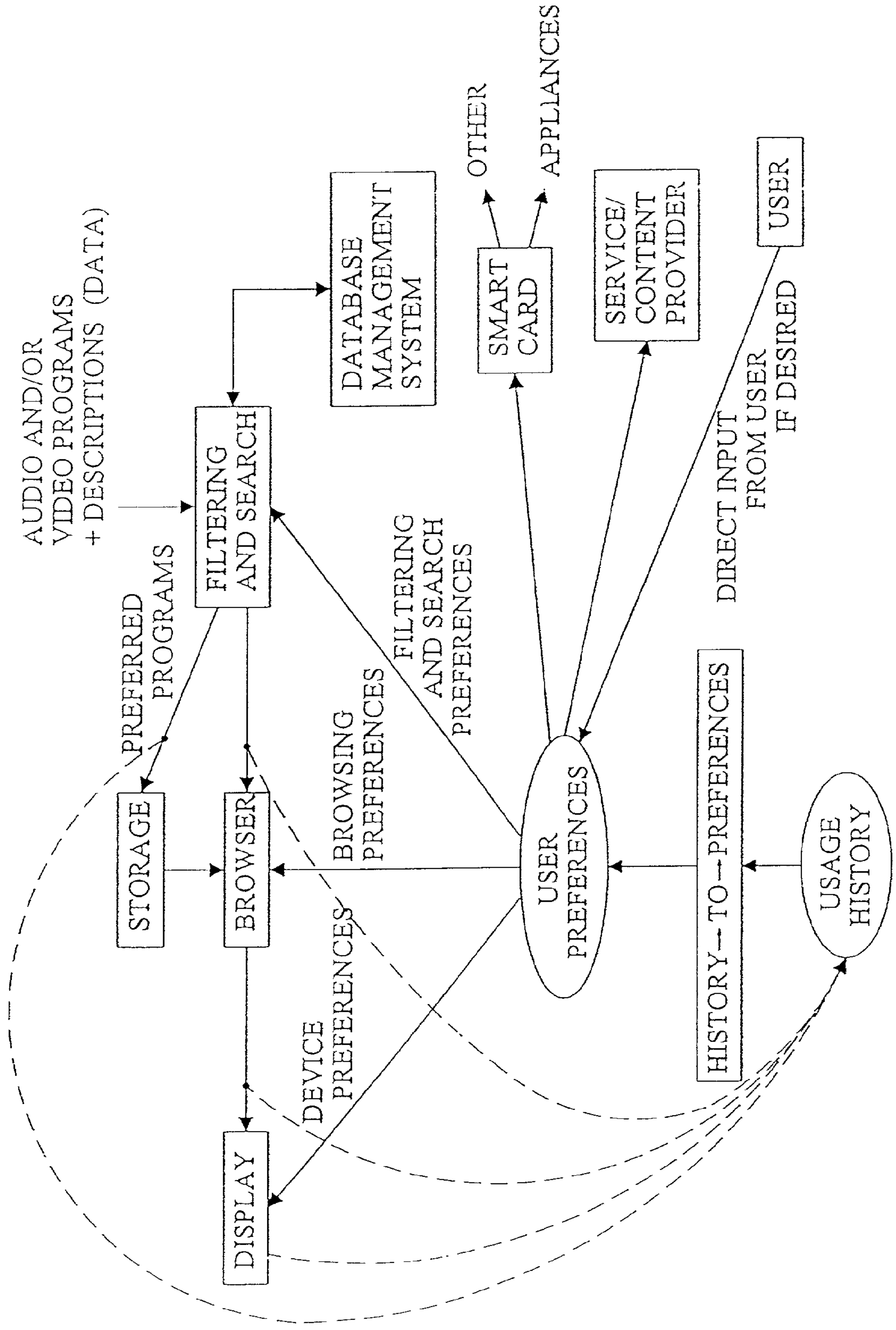
FIG. 28 is an exemplary system incorporating the user history description scheme.

Referring to FIG. 28, an exemplary example of an audio and/or video program receiver with persistent storage is illustrated. As shown, audio/video program descriptions are available from the broadcast or other source, such as a telephone line. The user preference description facilitate personalization of the browsing, filtering and search, and device settings. In this embodiment, the user preferences are stored at the user's terminal with provision for transporting it to other systems, for example via a smart card. Alternatively, the user preferences may be stored in a server and the content adaptation can be performed according to user descriptions at the server and then the preferred content is transmitted to the user. The user may directly provide the user preferences, if desired. The user preferences and/or user history may likewise be provided to a service provider. The system may employ an application that records user's usage history in the form of usage history description, as previously defined. The usage history description is then utilized by another application, e.g., a smart agent, to automatically map usage history to user preferences.

Additional Attributes and Descriptors In The Description and The Description Scheme The present inventors came to the realization that additional functionality for the system may be achieved by the incorporation of particular types of information in the descriptions and description schemes. A description scheme is a data model of descriptions. It specifies the descriptors and their syntax as they are used in the description. In what follows, use the terms description and description scheme may be used interchangeably since they both correspond to describing media and user preferences. An explanation of the additional attributes and descriptors in the descriptions will be provided, followed by an example of portions of example descriptions.

After further consideration, there is a need for many users to maintain multiple separate user preference descriptions. Multiple user preference descriptions may correspond to, for example, different locations (e.g., at home, at the office, away from home, stationary versus traveling in a vehicle), different situations, different times (e.g., different days, different seasons), different emotional states of the user (e.g., happy mood versus tired or sad), and/or persistence (e.g., temporary usage versus permanent usage). Further, the user preference descriptions may include differentiation for different terminals with different primary functionalities (e.g., a personal video recorder versus a cell phone). In addition, available communication channel bandwidth at different locations or situations may use different preferences. Also, the preference of a user for the length of an audiovisual summary of a video program for downloading may be different. The user in different usage conditions may use the user identification description scheme as a basis to distinguish between different devices and/or services. An example of different conditions may include a television broadcast receiver and a cellular telephone.

In addition to maintaining multiple user preferences for a particular user based on the aforementioned conditions, the present inventors also came to the realization that the different locations, different situations, different emotional states, different seasons, and/or different terminals (etc.), may likewise be used as the basis for distinguishing between the user preference descriptions.

One technique to permit a particular user to have multiple preference descriptions and distinguishing them from one another is by using different usernames or by using a versioning mechanism, such as a version descriptor in the identification description scheme, as described later.

As previously described, the system may include multiple user preference descriptions for a particular user. With multiple descriptions, the system may express the different user preferences with different granularity, e.g., a greater or lesser amount of detail. The increased granularity (sparseness) may be merely the result of applying a filter to the user preference description that further reduces the amount of data. In other words, the structure of the usage preference description may be identical with the difference being the result of the filter further reducing the data. In another embodiment, the variable granularity results in a different size of the data contained in the user preferences, which may be based upon, if desired, the location and/or application of the user. User preferences with increased granularity may be especially suitable for storage on portable memory devices with limited memory capability. Likewise, the granularity may be applied to the usage history.

Another aspect of the present invention permits the user preferences (and history) to be based upon the media type, media source, or content (e.g., music versus video, radio versus television broadcast, and/or sports video versus home video). These preferences relate to the audio and/or video itself, as opposed to a third party characterization of the desirability of the multimedia. The inclusion of this information permits a reduction in the computational processing requirements depending on the media type, media source, and/or content of the media.

Another feature that may be included in the system is a protection attribute for each, or a selected set of, component of the user descriptions. The protection attributes specifies the access right of a system or service provider, typically a party other than the user himself, to the user's descriptions or any component thereof. In one embodiment, the protection attributes may be specified by a binary value that indicates the user's desire to permit others access to such data. One technique to implement the protection attribute is to include a protection attribute as a primitive attribute that is contained by all relevant parts of the user description scheme.

Descriptors and description schemes for browsing preferences may be aligned with particular types of multimedia summary description schemes that are contained in ISO/IEC JTC1/SC29/WG11 N3246, "MPEG-7 Generic AV Description Schemes, Working Draft v2.0", Noordwijkerhout, March 2000. This allows the user to specify the type of a particular visual summary of an audiovisual program, and the duration of a summary that is in the form of a visual highlight. However, after further consideration the present inventors have determined that specification of the preferred minimum and maximum amount of data permitted in an audiovisual summary significantly enhances the system capability. Such a provision provides, for example, the capability of the user effectively browsing audiovisual summaries of content over channels with limited bandwidth and using terminals with different limitations. With a terminal connected to a bandwidth limited channel, the user may specify preference for a relatively short highlight of the program, while with a terminal that is connected to a higher bandwidth channel, the user may specify preference for a longer highlight of the program. Such a set of channels may be mobile channels and cable channels. In addition, for terminals that are not capable of displaying frames at a video rate, the user may prefer keyframe summaries consisting of a maximum number of keyframes appropriate for the communication channel bandwidth. To achieve these enhancements, the present inventors propose using descriptors in the browsing preferences description (and description scheme, or other preferences description) specifying the minimum, maximum, and exact number of keyframes, and minimum, maximum, and exact duration of audio and/or visual highlights.

As described, the description scheme is adaptable to express the preferred minimum and maximum amount of visual material to adapt to different viewing preferences as well as terminal and communication channel bandwidth limitations. This implementation may be achieved by the following descriptors included in the browsing preferences description scheme: MaxNumOfKeyframes, MinNumOfKeyframes, NumOfKeyframes, MaxSummaryDuration, MinSummaryDuration, and SummaryDuration. The MaxNumOfKeyframes and MinNumofKeyframes preference descriptors specify, respectively, the maximum and minimum number of keyframes in the keyframe-summary of a video program. Depending on the known bandwidth conditions of a known connection that the user uses regularly, he or she may specify these descriptors. The MaxSummaryDuration and MinSummaryDuration descriptors specify, respectively, the maximum and minimum temporal duration of an audiovisual highlight summary. Again, depending on user's taste, terminal, and channel limitations, the user may specify these descriptors. The MaxSummaryDuration and MinSummaryDuration descriptors apply to preferences for audio signals as well as where audio highlights may have been generated by audio skimming methods. User's browsing preference descriptions may be correlated with media descriptions by a filtering agent 520 in FIG. 24 in order to determine media descriptions that contain summary descriptions that match user's preference descriptions and provide the user the associated summarized media in the preferred type of summary.

An additional descriptor that may be introduced is an abstraction fidelity descriptor for universal multimedia access application, where fidelity of a summary abstraction of a program is described. This can correspond to the variation fidelity descriptor defined in ISO/IEC JTC1/SC29 WG11 N3246, "MPEG-7 Multimedia Description Schemes, Working Draft v2.0", Noordwijkerhout, March 2000. This provides an alternative to the explicit specification of the duration and bounds on the number of keyframes. A Segment Theme descriptor(s) may describe the preferred theme, or point of view, of a segment, e.g., a video or audio clip, annotated with its theme or emphasis point. For example, the theme may specify characteristics of the content of the theme. Such characterization may include a goal from your favorite team, 3-point shots from your favorite player, etc. Specifying these descriptor(s) and also ranking them enables a client application or a server to provide to the user segments according to preferred themes (and/or their ranking) matching to the their labels or descriptors at the segment level, or provide users with pre-assembled highlights composed of segments with labels matching the SegmentTheme preference.

Existing filtering and search user preference descriptions are directed to techniques of using the audiovisual content in an effective manner by finding, selecting and consuming the desired audiovisual material, while focusing on the content of the audiovisual materials. While such descriptions are beneficial, the present inventors came to the further realization that the identification of the source of the material, in contrast to merely its content, provides beneficial information for the processing and presentation of the audiovisual materials. For example, the source of the content may be from terrestrial sources, digital video disc, cable television, analog broadcast television, digital broadcast television, analog radio broadcasts, and digital radio broadcasts. The inclusion of this information permits the user to select among these different sources and increase effectiveness by narrowing down the choices to those sources that are available to the user, such as terrestrial broadcast which is more widely available than satellite broadcast. For example, user may describe user's preference for "Star Trek" episodes that are available from terrestrial broadcast channels only.

This source distinction and identification may be performed by including a source preferences description scheme under the filtering and search preferences description scheme (or other description scheme). Accordingly, the search and preferences description scheme may include from zero or one (or more if desired) source preferences description scheme. The source preferences description scheme may be derived from the Media Format description scheme or Publication Description Scheme specified in ISO/IEC JTC1/SC29/WG11 N3247, MPEG-7 Multimedia Description Schemes, Experimentation Model (v2.0) Noordwijkerhout, March 2000.

Another feature that may be included in the system, in addition to the user's preferences, is the user's negative preferences. The negative preferences may include the user's dislikes and their relative rankings. By specifying the negative preferences, the system is less likely to select such matching preferences. This may be implemented, for example, by permitting positive and negative values to the preferencevalue descriptor.

Another feature that may be included in the system is the specification of the user's preferences as a relative preference measure of a particular set of user preferences with respect to another set of preferences, such as for example, by using BetterThan and WorseThan descriptors. This permits an implicit relative ranking of preferences even in the absence of a preference value descriptor for each preference set. This may be implemented, for example, by including Betterthan and WorseThan descriptors in the filtering and search preferences descriptions.

Expression of the Additional Attributes

The following descriptions are expressed in XML (Extensible Markup Language), incorporated by reference herein. It is to be understood that any other description language may likewise be used.

The definition of the user preference description may be as follows.

```
<UserPreference>
        <UserIdentifier protection="true" userName="paul"/>
        <UsagePreferences allowAutomaticUpdate="false">
        <BrowsingPreferences>
        . . .
        </BrowsingPreferences>
        <FilteringAndSearchPreferences>
        . . .
        </FilteringAndSearchPreferences>
        <DevicePreferences>
        . . .
        </DevicePreferences>
        </UsageHistory>
        . . .
        </UsageHistory>
</UserPreference>
```

The primitive attributes "protection" and "allowAutomatic Update" may be instantiated in the UserIdentifier, Usage Preferences, and Usage History descriptions and all its relevant parts, namely, in Browsing Preferences description, Filtering and Search Preferences description, Device Preferences description, and sub-description schemes of the Usage History description Scheme.

The "allowAutomaticUpdate" attribute (set by the user) should be included in a description scheme specifying whether or not the preferences can be automatically modified (e.g., by an agent utilizing the usage history description) without consulting with the user.

The protection attribute should be included in a description specifying whether the user allows the system to make preference/history public or not. When the user agrees to make some parts of his preference/history public, for example, to service providers, the service providers can collect this information and then serve to the user contents that are tailored to the user's history/preferences. In the above example description, the user prefers to keep his usename private. He also does not wish the system to automatically update his preferences.

The user identification description serves the purpose of an identifier that distinguishes a particular instantiation of the user description scheme from other instantiations for other users or other instantiations for the same user for different usage conditions and situations.

The usename descriptor may identify a specific user from other users. In a home setting, each member of the household may be identified using a username that is unique in the household for all devices that the members of that household use on a regular basis. A username can also be used to distinguish the user description scheme of not only an individual but also a group of people, e.g., the family. Those devices that are used on a temporary basis, potentially by many different people, (such as those in hotel rooms or rental cars) may assign temporary session identifications to ensure uniqueness of identifications.

Alternatively, a version descriptor may also be included in the user identifier description to define different versions of the user descriptions (preferences and usage history) associated with a particular username. Through the mechanism of the version, a person can specify different preferences and usage history, corresponding to different locations (at home, at the office, away from home, stationary versus traveling in a vehicle), different situations, different emotional states (happy versus sad), different seasons, etc. Different user descriptions are distinguished by distinct version descriptors.

The type of the version descriptor, may be for example, an integer, a string, or expressed as an attribute of the user identification description scheme.

The usage preference description may include a Preference Type description, distinguishing a particular set of preferences or history according to time, or place, or a place and time combination. The definition of the usage preference description may be as shown in the following example, where place is “office” and time period is “8 hours starting from 8 AM”

```
        <PreferenceType>
        <Place>
        <PlaceName xml:lang="en">Office</PlaceName>
        </Place>
        <Time>
        <TimePoint>
        <h>8</h>
        </TimePoint>
        <Duration>
        <No_h>8</No_h>
        </Duration>
        </Time>
</PreferenceType>
        . . .
```

The preferencetype descriptor may be used to identify the preference type of one or more set of preferences. As previously described, a user may have different preferences depending on the user’s situation, location, time, season, and so on.

The browsing preferences description may describe preferences of the user for browsing multimedia information. In essence, this description expresses the user’s preferences for consuming (viewing, listening) a multimedia information. This browsing preferences description may include for example, a Summary Preferences description. The browsing preferences description may include in the case of video, for example, the user’s preferences for continuous playback of the entire program versus visualizing a short summary of the program. Various summary types are specified in the Summary Description Scheme in ISO/IEC JTC1/SC29 WG11 N3246, “MPEG-7 Multimedia Description Schemes, Working Draft v2.0”, Noordwijkerhout, March 2000, including a keyframe summary, a highlight summary, etc., where parameters of the various summary types may also be specified by summary descriptions, e.g., the time duration of the video highlight summary.

The browsing preferences description scheme may include one or more of the following non-exhaustive list of descriptors and descriptions in its description scheme.

(A) The minimum number of keyframes (MinNumOfKeyframes) and the maximum number of keyframes (MaxNumOfKeyframes) descriptors may be included. These descriptors specify the user’s preference for minimum and maximum number of frames in a keyframe summary of an audiovisual program. A user can specify these descriptors according to personal taste, situation, etc., and according to channel bandwidth and terminal resource limitation.

(B) The minimum duration (MinSummaryDuration) and the maximum duration (MaxSummaryDuration) descriptors may be included. These descriptors specify the user’s preference for the length of a highlight summary composed of key clips in the video. These descriptors may also, for example, be applied to an audio-only material. A user can specify these descriptors according to personal taste, situation, etc., and according to channel bandwidth and terminal resource limitations.

An example for Summary Preferences description that can be included in usage preferences description is provided below.

```
</UsagePreferences>
 </BrowsingPreferences>
 <SummaryPreferences>
  <SummaryTypePreference>keyVideoClips</SummaryTypePreference>
  <MinSummaryDuration><m>3</m><s>20</s></MinSummaryDuration>
  <MaxSummaryDuration><m>6</m><s>40</s></MaxSummaryDuration>
 </SummaryPreferences>
 <BrowsingPreferences>
</UsagePreferences>
```

(C) The abstraction fidelity descriptor for universal multimedia access application relates to fidelity of a summary abstraction of a program. This preference descriptor may correspond to the variation fidelity descriptor contained in the media’s variation description specified by Variation Description Scheme in ISO/IEC JTC1/SC29 WG11 N3246, “MPEG-7 Multimedia Description Schemes, Working Draft v2.0”, Noordwijkerhout, March 2000. Alternatively, the duration and number of keyframes may be defined as the fidelity descriptor.

(D) The SegmentTheme descriptor(s) may be included, which describes the theme or point of view of a segment, e.g., a video or audio clip annotated with its theme or emphasis point. An example summary preference description expressing preference for video segments (clips) labeled as “Goal from Spain” and “Replay of Goal from Spain” is as follows:

```
</UsagePreferences>
 </BrowsingPreferences>
 <SummaryPreferences>
  <SummaryTypePreference>KeyVideoClips</SummaryTypePreference>
  <SegmentTheme>Goal from Spain</SegmentTheme>
  <SegmentTheme>Replay of goal from Spain</SegmentTheme>
 </SummaryPreferences>
 </BrowsingPreferences>
</UsagePreferences>
. . .
```

(E) The frame frequency value descriptor may be included to specify the temporal sampling frequency of video frames that can be visualized in the browser. The frames provide a visual summary. Depending on the browser, they may also provide clickable entry points to the video. The user may click and start playing back the video starting from that frame. The frame frequency value descriptor provides similar functionality in terms of shots of the video.

The source preference description describes the preferred source of multimedia information, such as the broadcast or storage medium type (e.g., terrestrial, satellite, DVD), broadcast channel identifier, etc. An example user preference description expressing preference for Star Trek episodes available from terrestrial broadcast is as follows.

```
<UserIdentifier protection="true" userName="paul"/>
<UsagePreferences allowAutomaticUpdate="false">
<FilteringAndSearchPreferences protection="true">
```

-continued

```
  <PreferenceValue>5</PreferenceValue>
  <CreationPreferences>
  <Title xml:lang="en" type="original">Star Trek</Title>
  <CreationPreferences>
    <SourcePreferences>
    <PublicationType>Terrestrial Broadcast</PublicationType>
    </SourcePreferences>
</FilteringAndSearchPreferences>
</UsagePreferences>
</UserIdentifier>
```

The filtering and search preferences description includes at least one of the descriptors of preferred program title, genre, language, actor, creator of the program. An example description where user's preference is for news programs in English is given below. Such description may be included in user's smart card when he travels to Japan, for example. Note that this particular preference description is identified as being specific to Japan and differentiated by choosing an appropriate user name.

```
  <UserIdentifier protection="true" userName="paul_in_Japan"/>
  <UsagePreferences allowAutomaticUpdate="false">
  <FilteringAndSearchPreferences protection="true">
  <PreferenceValue>100</PreferenceValue>
    <ClassificationPreferences>
    <Language>
    <LanguageCode>en</LanguageCode>
    </Language>
    <Genre>News</Genre>
    </ClassificationPreferences>
</FilteringAndSearchPreferences>
</UsagePreferences>
</UserIdentifier>
```

The PreferenceValue descriptor provides a technique for prioritizing filtering and search preferences, such as the value indicating the degree of user's preference or non-preference. Non-preferences may be expressed by assigning a negative (opposite) value to the preference value descriptor.

The betterthan and worsethan descriptors may describe which instantiation of preferences the user likes or dislikes relatively more compared to another instantiation, where different instantiations are identified using the filtering and search preference type descriptor. This provides robustness against changes in the preference value descriptor automatically, for example, by an agent.

Figure 29:
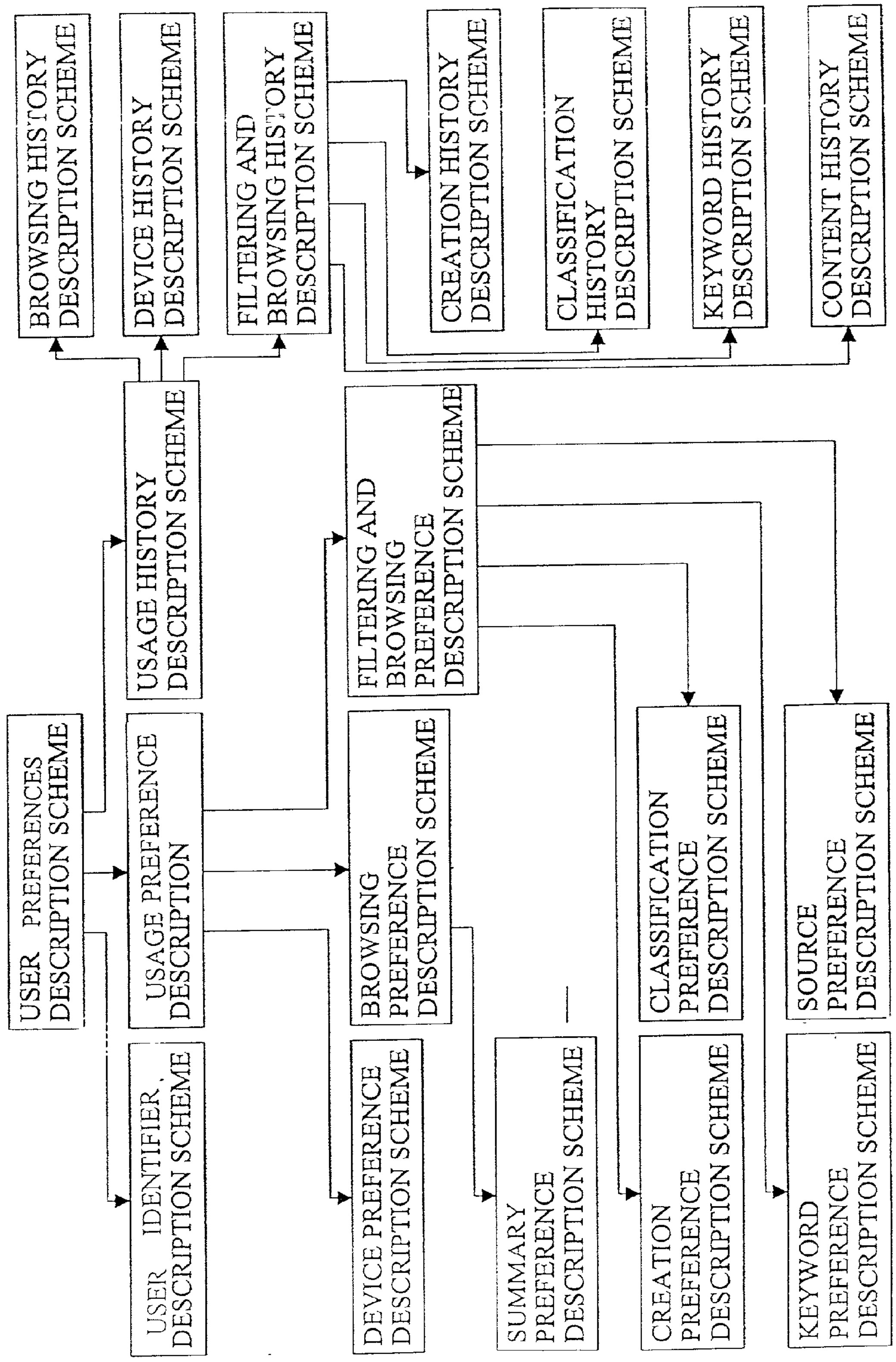
FIG. 29 is an exemplary user preferences description scheme.

The filtering and search preferences description may also contain a description of a preferred review to express user's desire for searching for programs that are favorably reviewed by specific individuals. For example, preference for movies reviewed by movie critics Siskel and Ebert and found to be "two-thumbs-up" may be described and included in the filtering and search preferences description. An overview of the entire description scheme is shown in FIG. 29. With the ever increasing amount of available media, such as audio, image, and videos, it becomes increasingly more difficult for a user to select desirable media for subsequent consumption. The user may manually peruse program listings to select the desired material. However, the manual selection of media from an exhaustive program listing is time consuming and inefficient.

As previously discussed, a description scheme, such as those for the user, programs, and system, provides a structure within which is captured information regarding (1) the user's preferences, (2) the system, and (3) the programs themselves. By processing the information contained within the user's usage description scheme and the program description scheme of available programs, the system may determine those programs that are most likely desirable to the particular user. The processing by the system for such information may be referred to as an agent.

Existing agents are focused on correlating a limited number of user preference descriptors with a limited number of program descriptors. The designer of such agents manually determines, and hard codes into the agent, predetermined interrelationships which are likely to result in identifying desired programs. As such, the mapping between the user preference descriptors and the program descriptors includes a static model because such designers are under the belief that the domain of data fields is a fixed predetermined set, and therefore the relationships between the potential combinations of relevant data is likewise a fixed predetermined set. For example, the "actor" in the user preference and the "actor" in the program descriptor may be a relevant potential combination. The traditional focus for designing such static agents avoids the problematical dilemma of how to interpret and process an arbitrarily complex set of preferences.

Maintaining the traditional focus of avoiding an arbitrarily complex set of user preferences, commercial products such as TiVO and Replay TV, permit the specification of a first preference, such as a particular actor. The user may further attempt a more specific search by searching for a first preference, a second preference, and additional preferences. While this results in identifying the desired programs, it is a time consuming and frustrating process for the user. Like the static agents, the TiVO and Replay TV devices have a limited set of permitted search queries.

While such static models of the interrelationships is readily easy to implement, it results in a system that is unable to process interrelationships that are not foreseen by the agent designer. The present inventors came to the realization that all of the potentially desirable interrelationships, especially for an arbitrarily complex set of preference criteria, can not be effectively programmed using the traditional static model.

Figure 30:
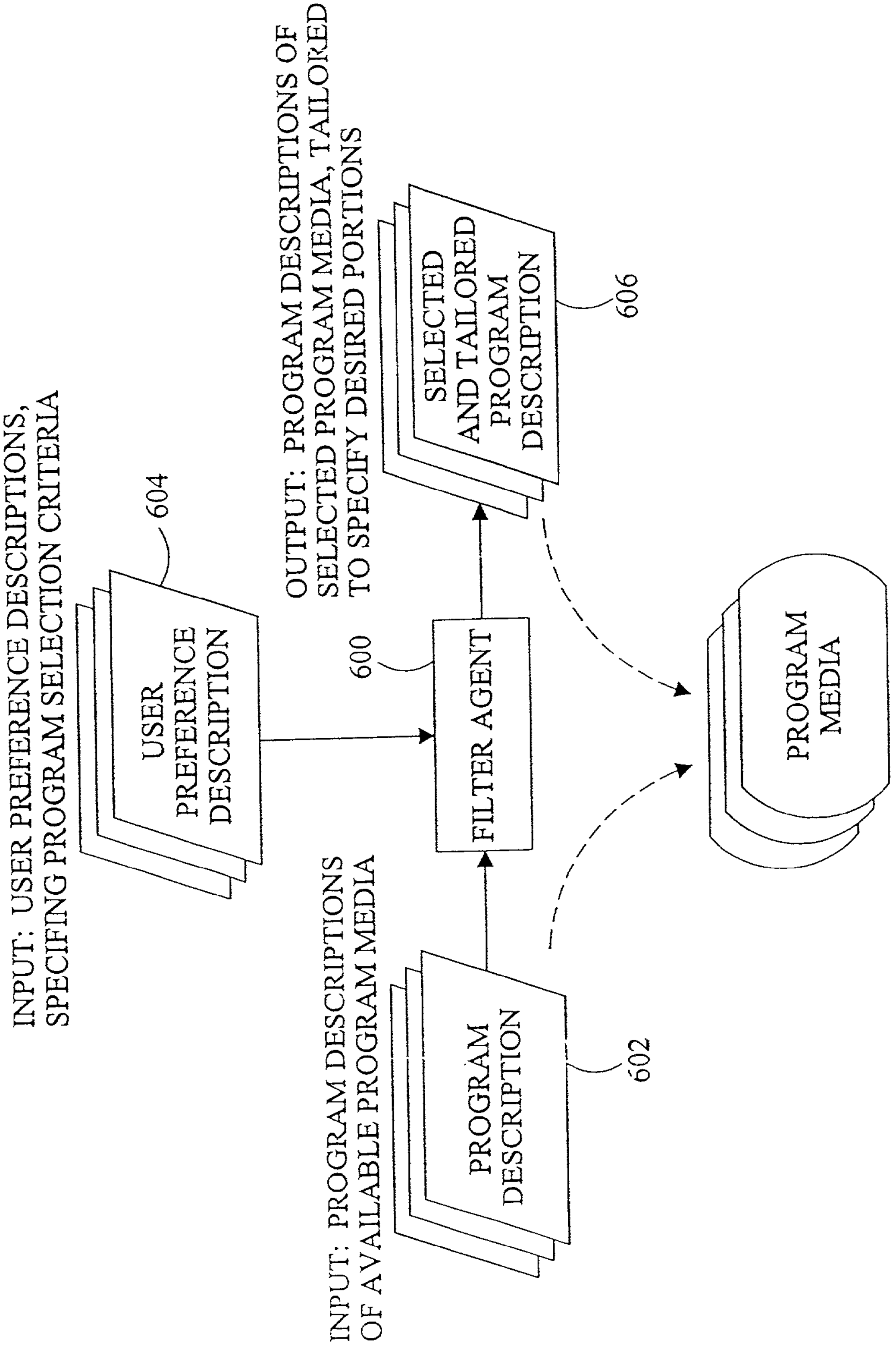
FIG. 30 is an exemplary embodiment of a context diagram.

Referring to FIG. 30, a filter agent 600 receives or otherwise has access to at least one program description 602 and at least one user preference description 604. Each program description 602 may also, if desired, include meta-data associated with the actual consumable program media. Also, the user preference description 604 contains selection criteria for the information contained within the meta-data. The output of the filter agent 600 is a subset of the received program descriptions 606 that have been selected, and tailored if needed, in accordance with the user preference description 604.

Figure 31:
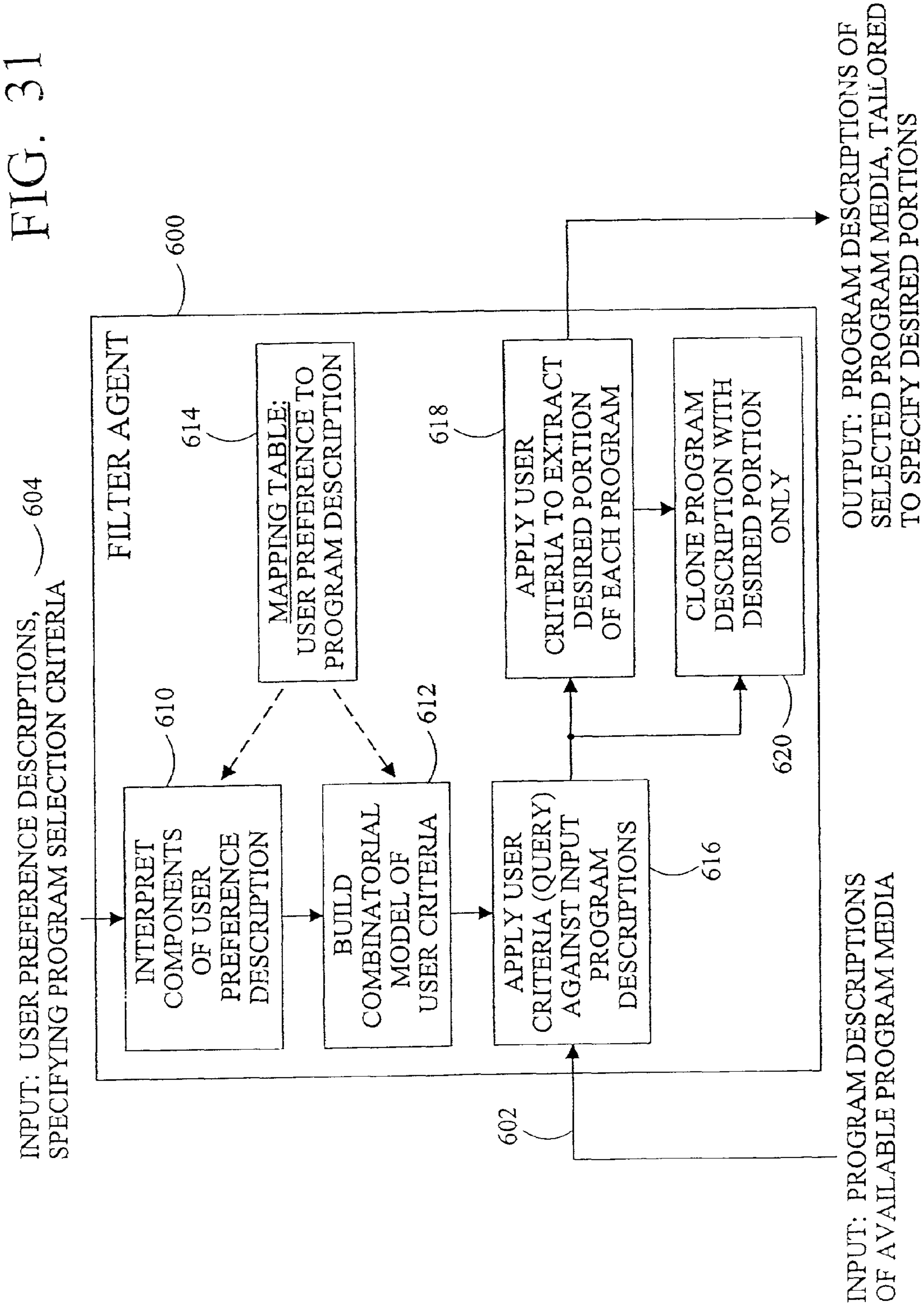
FIG. 31 is an exemplary embodiment of a filter agent.

Referring to FIG. 31, the filter agent 600 receives the user preference description 604 and interprets the information contained within the user preference description 604 at block 610 using information from a mapping table 614. The filter agent 600 also builds a model, such as a combinatorial model, of the user criteria indicating the desired user criteria at block 612 using information from the mapping table 614. The resulting model or otherwise set of criteria, is then applied against the available program descriptions 602 at block 616 to select the desired programs. Each of the selected programs include a rich set of associated data which may then be applied against user criteria at block 618 to further refine the data by extracting desirable sub-portions of each program. Each of the selected programs may further be cloned at block 620 together with the desired sub-portion of each program, and the resulting tailored instances are output from the filter agent 600.

Figure 32:
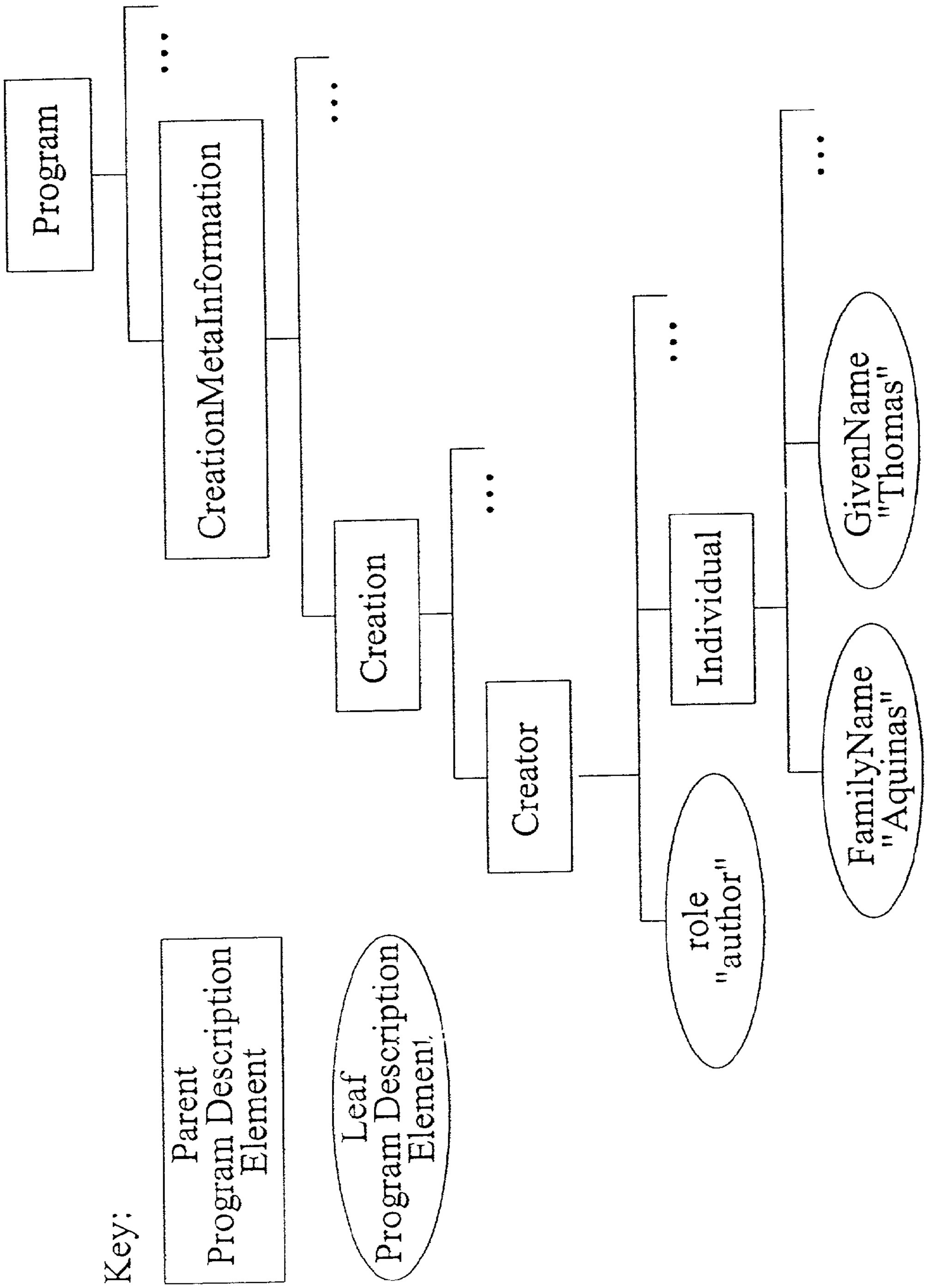
FIG. 32 is an exemplary embodiment of a program description.

Referring to FIG. 32, a Program Description may be composed of a hierarchy of individual descriptions. The hierarchy implies relationships amongst the individual description elements including composition, type-of, and other relationships. The particular structure of the input Program Descriptions vary, and are typically generated and provided by a commercial provider. The output Program Descriptions may be, for example, copies of the selected input instances, portions of the selected input instances, or are modified clones of the input instances. In the case of modified clones, the clones should describe a subset of the program media that meets the user's preferences, and exclude the portion that the user does not desire, or is not feasible to process for other reasons, such as bandwidth. It is to be understood that the output may omit cloning, if desired.

Figure 33:
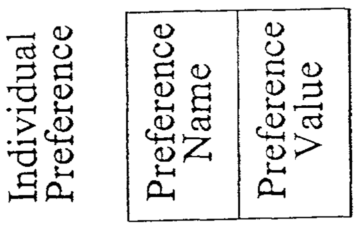
FIG. 33 is an exemplary embodiment of an individual preference.

Referring FIG. 33, the User Preference Description may include primitive elements that describe individual or multiple preferences. The individual preferences may be generally defined in terms of "name:value" pairs. The name component is one of a set of Preference Names. The domain of the value depends on the name, such as codes and free form text.

The individual preference may be a single preference test (or multiple preference). It is to be understood that the individual preferences are not limited to tests. For example, the User Preferences may describe the desired configuration for presentation, such as volume or any other functionality. Each preference test describes some aspect or attribute of the Program Description that is to be evaluated. If desired, the preference test may be limited to the smallest granularity of a test that may be executed on the Program Description. A common preference test is a comparison of a Program Description element's value to the preference value. It is also to be understood that the preference tests need not be directly associated with the value of a corresponding element, if any, of the Program Description. For example, a single User Preference element, indicating a desired number of key-frames to be shown, may be tested against the count of elements in the Program Description representing (or describing) a key-frame. In general, the pair (title: title_value) will compare the title element value of the Program Description to title_value.

Figure 34:
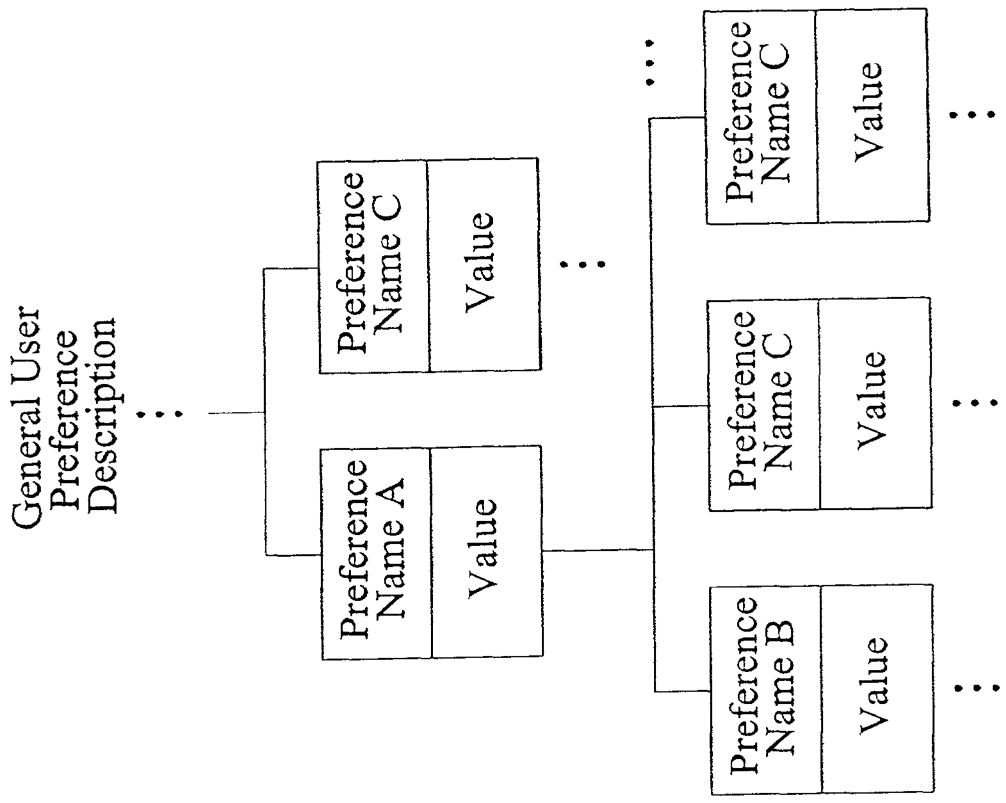
FIG. 34 is an exemplary embodiment of a general user preference description.

After further consideration, the present inventors came to the realization that the individual preferences may include composite relationships. Moreover, the relationships may include duplicate fields, such as several instances of "name" in either the user preferences and/or the Program Descriptions. With the inclusion of composite relationships it becomes difficult to determine an appropriate technique for queries, where duplicate individual preferences are at the same or different hierarchy levels. In addition, it is difficult to determine how to interpret queries that provide multiple matching results (such as several instances of "John Doe") or inconsistent matching entries (such as several instances of "John Doe" and a lack of an instance of "Comedy"). For example, referring to FIG. 34, if the user uses a query involving multiple preference names, and the query results in several potential matches, it is difficult to determine if an appropriate program has been located or which portion of an appropriate program is suitable. As shown in FIG. 34, the preference with name A is composed of one instance of name B and two instances of name C, each of which may include the same or different names.

Figure 35:
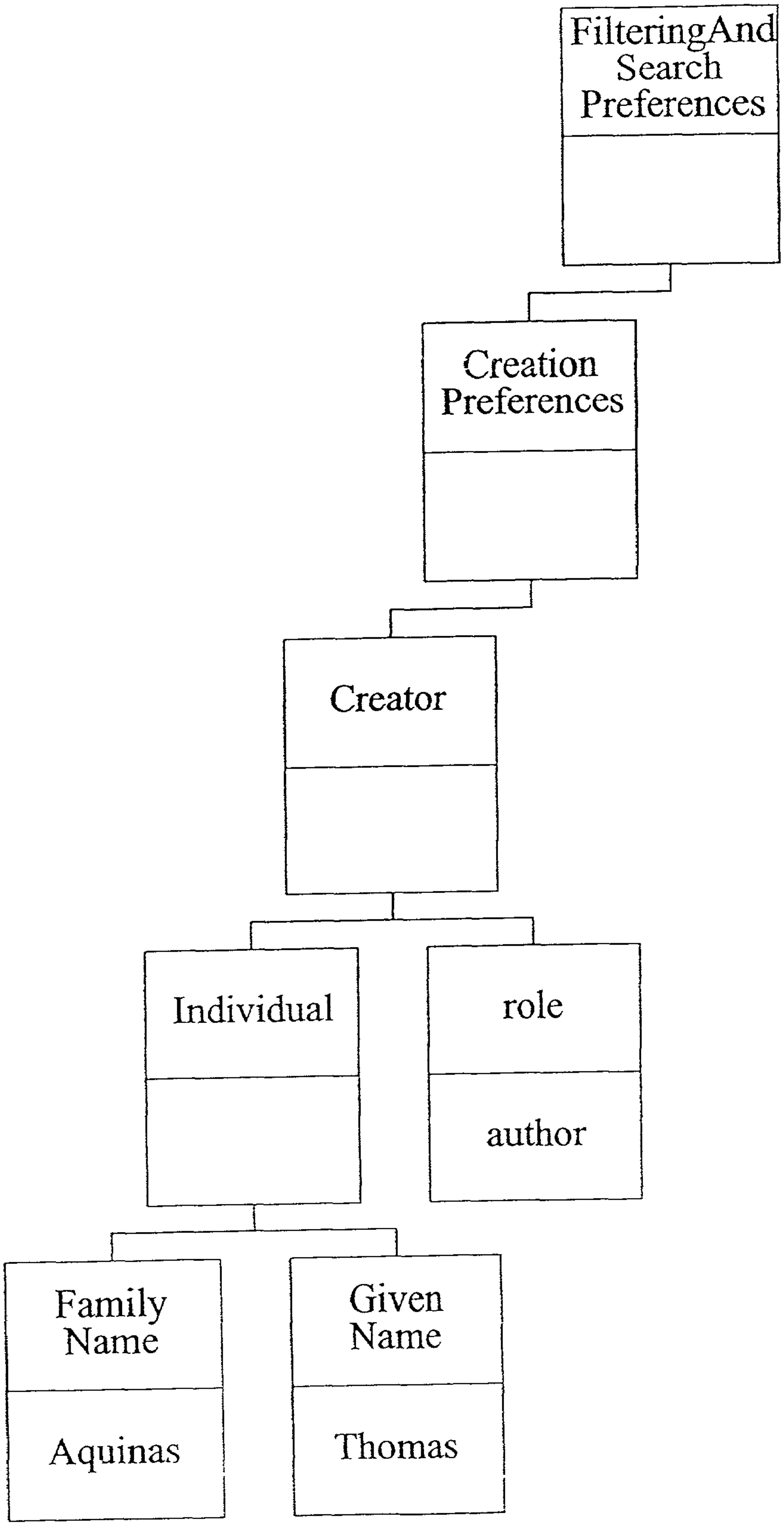
FIG. 35 is an exemplary embodiment of a user preference description.

Referring to FIG. 35 an example of a portion of a User Preference Description is illustrated. This portion of a user preference description illustrates a hierarchy of a "creator" that has the "role" of "author" with the name of "Thomas" "Aquinas". In addition, the hierarchy may be used as the path to define the interrelationships.

The normal behavior of a location path is to retrieve the single data from this node in the program. One potential enhancement is to allow this data to be manipulated and combined with other related nodes to form a composite value.

One example is when evaluating a media review rating, three numerical values may be provided, namely, RatingValue, WorstRating, and BestRating. A composite value for media review rating may be calculated as ((RatingValue)−(WorstRating))/((BestRating)−(WorstRating)).

Another example may include the test of Keyword preferences against the Title or Description fields by concatenating these two fields. A composite value might be calculated as (CreationDescription/TextAnnotation) & (Title/TitleText). It is noted that these two fields use relative paths from the parent "Creation" element.

Yet another example may include a single preference data manipulated to adjust its value numerically, or its text may be translated into a target language.

The composite values provide defaults for any of the calculated elements. This is useful for defining the default range of a media review rating. It is also useful for inserting identity values (e.g. 1, 0, " ") when the absence of an element should not make the test fail.

The Preference Description may make user of built-in composite values. An example of built-in composite value may be based on the environment of the viewer. For instance, a portion of a Preference Description may define time of day ranges when the user wants the associated preferences to be evaluated. The target location could be defined as a composite value of built-in type "TimeOfDay".

Referring to FIG. 36, the present inventors have determined that a mapping table of the User Preferences and the input Program Descriptions provides a robust comparison of the user preferences and the input Program Descriptions. It is to be understood that the mapping table may be any type of data structure, as desired. The first column ("name") of the mapping table includes the name of one or more of the user preferences. FIG. 36 illustrates the inclusion of the user preferences of FIG. 35. Each node, generally referred to by name, of an individual preference to be tested has an ancestry path associated with it. The second column ("location") of the mapping table includes the name of one or more of the input Program Descriptions. Alternatively, portions of the path or even single elements of the path may be specified in the table, if desired. For example,the Creator/Individual/FamilyName preference in FIG. 35 has a path of /FilteringAndSearchPreferences/CreationPreferences/Creator/Individual/FamilyName. This path is decomposed and resolved, piece by piece, using the "Location" column (e.g., field) in the Mapping Table. The result of decomposing and resolving the user preference path results in a corresponding path within the Program Description resolved from entries in column two. For example, the resulting location path for this test may be "/Program/CreationMetaInformation/Creation/Creator/Individual/FamilyName".

Common names, such as "Country" used at multiple locations, may be distinguished by including all or part of the ancestry path. For example, the following two preference tests have the same "leaf" name, but it may be desirable to have different tests for each. This may be done by specifying more of the ancestry in the Name field (column 1) of the mapping table: "/FilteringAndSearchPreferences/CreationPreferences/CreationLocation/Country", and "/FilteringAndSearchPreferences/ClassificationPreferences/Country". To distinguish between the two, the following names may be used: "/CreationLocation/Country" and "/ClassificationPreferences/Country". In addition the preference tests may be associated with multiple entries in the Mapping Table. This permits a single test to be performed on more than one location in the Program Description.

The Location field may include various wildcards to expand or restrict the target paths to be evaluated in the Program Description. For example, a "*" wildcard implies that there may be multiple instances of the given location under one parent, e.g., /Creation/*Creator implies that there may be multiple Creators under the Creation parent. A "#xxx" wildcard restricts the target path to the xxx instance of the given location under its parent, e.g., /Creation/#002Creator restricts the target path to the second instance of Creator under Creation. A double forward slash "//" indicates a node of the target path which may be used as a base path for groups of tests which must be constrained to evaluate from the same common location. In particular, this is useful for Constrained-AND operations, described later. The preference paths may be used to build target locations in the program. These preference paths may also allow preference paths to be interpreted as locations. Composite values may be defined for these preference path locations.

Syntax for a default preference and a default location may be provided. This allows updates in the preference or program definition to be handled by the filter agent without requiring changes to the mapping table.

The default mapping elements may be specified for a limited set of preference branches to bound the default mapping to a safe portion of the user preferences.

For instance, the default element "FilteringAndSearchPreferences/CreationPreferences/UserDefinedPreference/.*" may place a default mapping that can only map to elements in the program beneath the "Program/CreationMetaInformation/Creation" branch.

The third column "TestOp" of the Mapping Table includes what comparison to perform between the corresponding user preference path (column 1) and (resolved) input Program Description location (column 2). In this manner, the Mapping Table provides a convenient manner of identifying the interrelationships between the corresponding data from the user preferences and input Program Descriptions. For instance, the "FamilyName" preference in FIG. 35 has a test operator of substring-case-insensitive when compared with "/*FamilyName". Test operators may yield a discrete result, such as true or false, they may yield a range of values, or any other desired data. In particular results that span a range of values provide the advantage that filtered programs may be sorted according to the resultant "similarity" value. This provides the user with a ranked output that they may select from. Also, user preferences may be "softened" to pass programs that are near matches to the specific preference criteria. This fuzzy approach may allow the user preference description to more clearly model the user's intended criteria. In cases where the entry is always a parent (composed of children preference tests) the test operator may be NA (not applicable). An exemplary set of test operators are illustrated in FIG. 37.

After the individual preferences are interpreted into individual preference tests, these tests may be combined into a single test that models the user's preferences. The preferred technique includes combining the individual preference tests according to their hierarchy. Each parent test becomes the combination of its children tests, and this continues up to the root preference, yielding in effect one composite test. The combination of "children" tests within a single "parent" may be broken down into the combination of similar tests and the combination of dissimilar tests. Similar tests may have the same name or otherwise be associated in the Mapping Table such as by being on the same row. Also, dissimilar tests may have different entries in the Mapping Table.

It is to be understood that the concept of inter group and intra group interrelations relates to any comparison between different sets of data, whether or not they include a hierarchical scheme. As an example, intragroup may be used to define a group of similar tests. Also, any scheme may be implemented to form comparisons or groupings for the testing of data.

If desired, the mapping table, which may be any type of data structure or otherwise to simply express the desired operations to be performed, may be expanded to include additional functionality. For example, specific groupings of user preference may be denoted, to specify additional operations to be performed on the elements of the group that are separate from the inter group and intra group operations. These specific groupings may provide additional flexibility for combining individual preference tests. The combinatorial operations applied to these groups may be performed before, after or instead of the general inter group and intra group combinatorial operations.

For instance, entries in the mapping table may be explicitly linked together with a shared index, and a specific combinatorial operator may be mapped to each indexed group. The UserPreferences elements may likewise be explicitly linked together with a shared index. The latter two groups and operators present an alternative method to generate the arbitrarily complex combinations, without using one of the four methods for generating all typical permutations, shown in FIG. 13. A preferred sequence for performing the various combinatorial operations might be intra group operation, followed by indexed group operation, followed by inter group operation.

In addition to explicitly defined indexed groups, other groupings may be built-in. For instance, a program description may have attributes associated with it. The user preferences that are mapped to this program description and its associated attributes may be grouped together in a so-called attribute group, and a specific combinatorial operator may be mapped to this attribute group. For example, the program description element, TitleText, may have a language attribute associated with it. A user preference, KeywordPreferences, may be mapped to TitleText and a separate user preference may be mapped to the language attribute of TitleText. These two user preferences may be grouped together into the following attribute group, and the results to these two tests may be combined in an attribute group combinatorial operation:

| Name | Location | AttrGroupOperation |
|---|---|---|
| KeywordPreferences@xml.lang | Title/TitleText@xml.lang | AND |
| KeywordPreferences | Title/TitleText | AND |

The functionality may also include multi-mapped preference group and associated operator. Elements in this group may have the same user preference element, but have multiple different program description mappings. For example, PersonName may have the following mappings, forming one multi-mapped group:

| Name | Location | MultiMapGroupOperation |
|---|---|---|
| PersonName | Creator/GivenName | OR |
| PersonName | Creator/FamilyName | OR |
| PersonName | Creator/ProfessionalName | OR |

Preferably, the various groupings are combined in sequence starting with attribute groups, followed by intra groups, multi-mapped groups, indexed groups, and inter groups.

Referring to FIG. 38, exemplary examples of combinatorial operators are listed. Several of the combinatorial operators (notably SAND, SUM, FREQ, and RATIO) provide "soft" combinations that can be used to yield non-zero results, even when some of the individual preference tests in the combination are zero. These soft combinations are useful when a group of program descriptions are to be evaluated, but one or more nodes in the group does not exist. In this manner, the result will be a diminished, but non-zero value.

For example, the SAND operator provides a soft AND combination of its constituent elements by applying a transformation to the input values before they are combined. This may transform a zero input to a non-zero value. Additionally, the combination operation may be a non-linear function that will increase or decrease the result, related to a strict AND combination.

Another set of combinatorial operators are soft maximum and soft minimum operators. In the typical maximum or minimum operation, only one of the combined individual preference tests determines the combined result value. In contrast, the soft minimum operator and soft maximum operator allows other non-contributing individual preference test results to adjust the final combined result. Typically, the adjustment is a minor amount, e.g., +−10 percent. The purpose of the soft maximum/minimum operators is shown in the example where a user prefers program which contain A or B. IF a program with A and a program with A and B were available, the typical maximum operator would rank both programs equally, whereas the soft maximum operator would rank the program containing A and B above the program containing only A. A similar result occurs from the soft minimum.

Another combinatorial operator is an average, which averages a set of scores resulting from a plurality of tests.

One combination for dissimilar preference tests is under a single parent. Each entry in the Mapping table has a field that defines how this type of preference test should be combined with different type preference tests under the same parent. This type of test may be referred to as inter group combinatorial operator (InterOperator).

Figure 39:
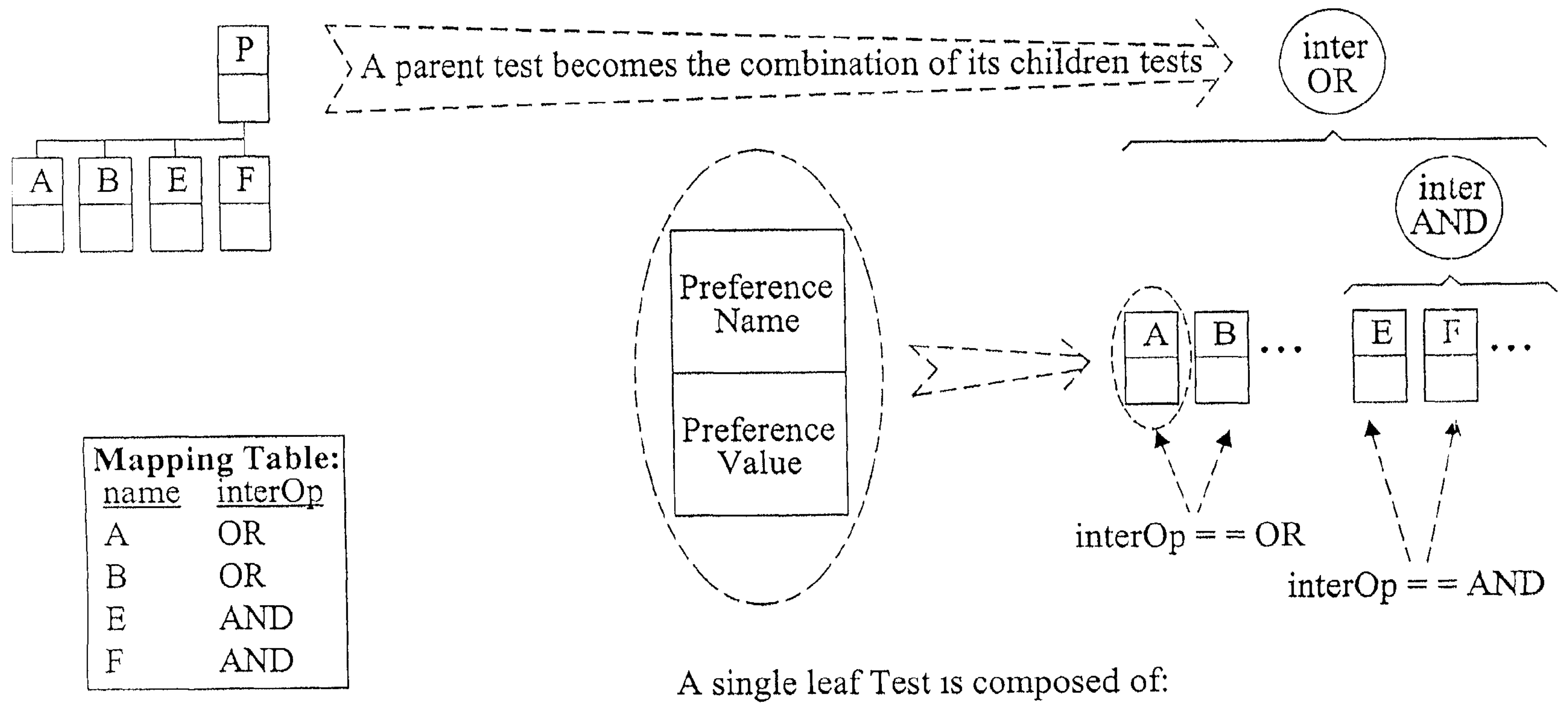
FIG. 39 is an exemplary embodiment of inter group combinatorial operator.

Referring to FIG. 39, this example illustrates a parent test with four dissimilar "leaf" test children. Two of the leaf tests have InterOperator AND. These two tests are evaluated independently, then their results are AND'd together. The other two leaf tests have InterOperator OR. These two tests are evaluated independently, then their results and the AND'd sub-result are all OR'd together to form the parent test result.

The rules for combining dissimilar tests (with the operator mappings of OR and AND) may be:

(1) evaluate all the tests;

(2) AND the test results which have InterOp=AND, forming the InterAND result;

(3) OR the test results which have InterOp=OR, with the InterAND result, forming the InterOR result; and (4) the InterOR result is the final result for the parent test.

Figure 40:
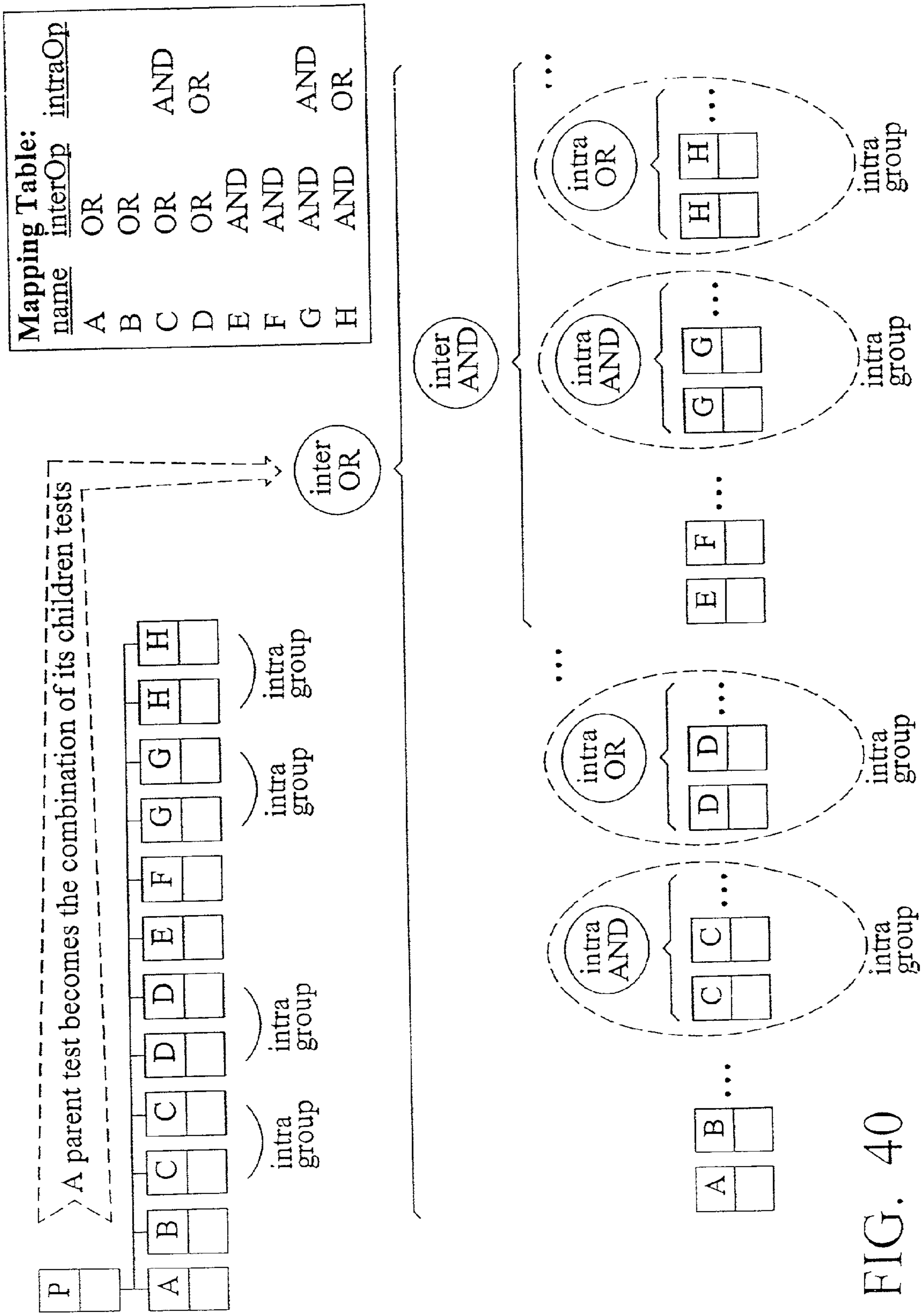
FIG. 40 is an exemplary embodiment of inter and intra group combinatorial operator.

In many cases, preference tests of the same type under a single parent will have a specific desired combination for those preferences before they are combined with the other different children of that parent. Each entry in the Mapping Table has a field that defines how this type of preference test should be combined with similar type preference tests under the same parent. This may be referred to as the intra group combinatorial operator (IntraOperator). Referring to FIG. 40, the parent test has four dissimilar children and four pairs of similar children. The similar children are first combined into intra groups using either respective IntraOperator. Then the intra group results are combined with the other groups and tests using their respective InterOperator.

The rules for combining similar and dissimilar tests (with the operator mappings of OR and AND) may be, for example:

(1) evaluate all the tests;

(2) group together test results that have the same name, forming Intragroups;

(3) AND the test results within Intragroups which have IntraOp=AND, forming IntraAND results;

(4) OR the test results within Intragroups which have IntraOp=OR, forming IntraOR results;

(5) AND all the solitary test results (not part of an Intragroup) and Intragroup results which have InterOp=AND, forming the InterAND result;

(6) OR all the solitary test results and Intragroup results which have InterOp=OR, with the InterAND result, forming the InterOR result; and (7) the InterOR result is the final result for the parent test.

Figure 41:
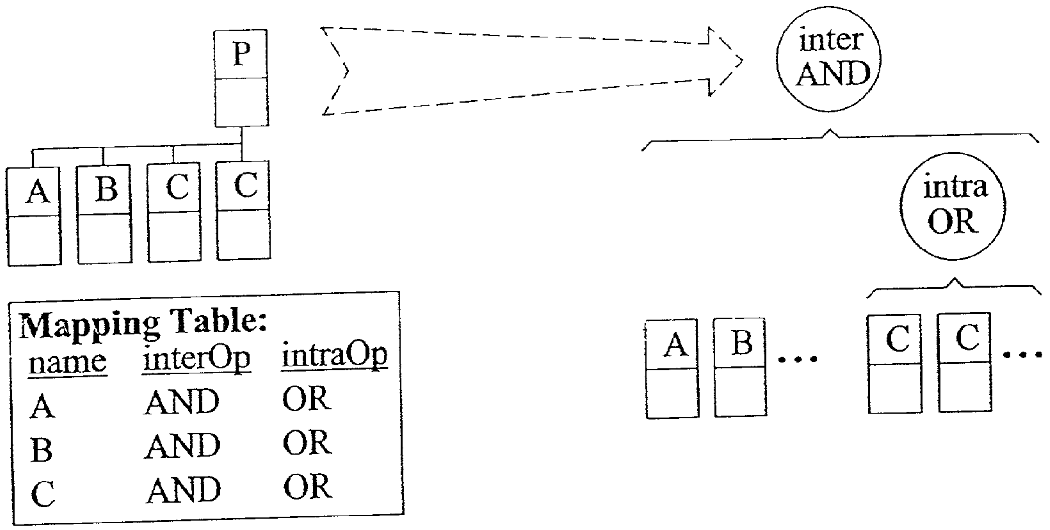
FIG. 41 is an exemplary embodiment of inter/intra combinations.

The general case of intra group combinations shown in FIG. 40 has the special default case shown in FIG. 41. This simplified approach supports the most common intra group operation, OR'ing and the most common inter group operation, AND'ing. One of the advantages of the approach of FIG. 40 is that the most common operations are supported with reduced constructs, and other combinations are supported by duplicating the hierarchy as necessary. The default mapping allows field updates to the User Preferences Description schema without requiring a change to the application or Mapping Table.

An example of a default mapping may include defining a parent (e.g., node) in the user preference that maps to a parent (e.g., node) in the Program Description and setting a "default" comparison between the two. In the event that an additional child user preference is added to the parent in the hierarchal tree then this child is automatically mapped to a corresponding child of the parent in the hierarchal tree of the Program Description. Preferably the two children have the same name to simplify identification.

Figure 42:
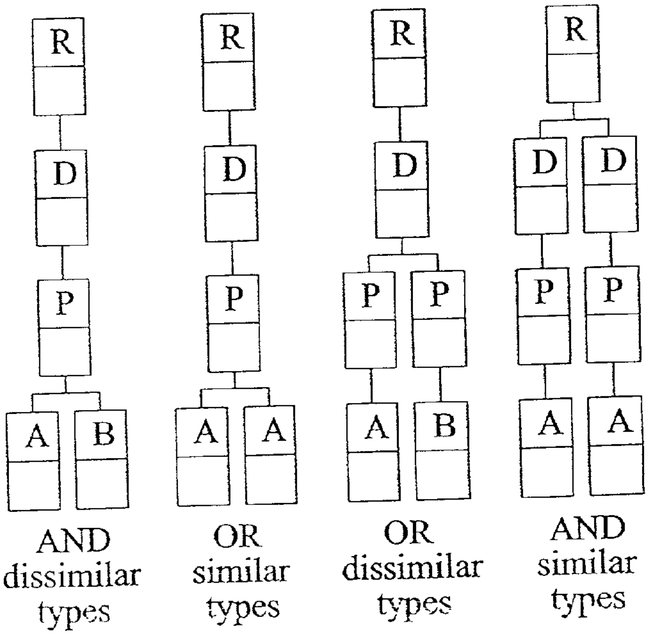
FIG. 42 is an exemplary embodiment of inter/intra combinations supporting permutations.

The example illustrated in FIG. 42 show the four permutations for combining two leaf tests that may be of type A or B, namely, AND dissimilar types, OR similar types, OR dissimilar types, and AND similar types. In addition, these leaf tests could also be parent tests themselves, composed of their own sub-hierarchy. The simplified approach relies on there being a layer (below the topmost layer) that has IntraOperator AND, while the rest of the hierarchy further down uses IntraOperator OR. This supports combining similar or dissimilar tests by merely going up in the hierarchy a sufficient number of levels.

The location mappings described in the Mapping Table yield global paths that start from the root node in the Program Description ("/Program"). Some preference tests may require support for a relative path. A special form of the InterOperator AND is defined which constrains a group of tests to be performed on the same element or parent element in the Program Description. This is defined as a Constrained-AND (CAND) combinatorial operator.

Figure 43:
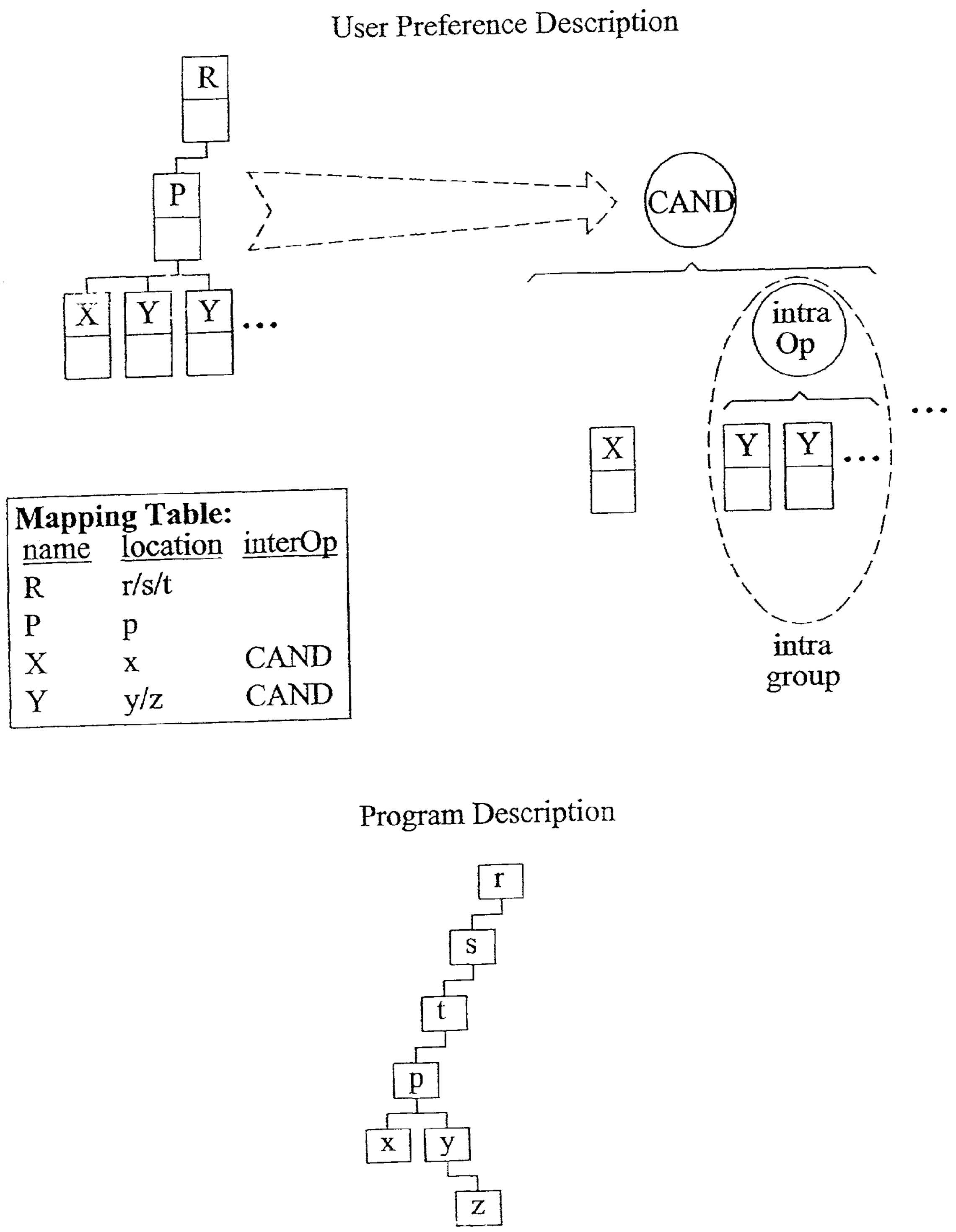
FIG. 43 is an exemplary embodiment of constrained-AND combinatorial operator

The constrained operation has a base path and multiple tests. The base path defines the starting node for all the predicate tests to be performed from. In the general example illustrated in FIG. 43, the parent of the three Constrained-AND tests is "P". The mapped location for "P" in the Program Description is the base path, which resolves to "r/s/t/p".

Therefore, for each instance of "r/s/t/p" in the Program Description, the children elements "x" and "y/z" are tested by "X", and the two "Y" tests.

A user trying to find programs on stuffed pasta might create the following profile fragment:

<KeywordPreferences xml:lang=en> calzone </KeywordPreferences>

<KeywordPreferences xml:lang=en> tortelini </KeywordPreferences>

<KeywordPreferences xml:lang=en> ravioli </KeywordPreferences>

The word calzone is a type of stuffed pasta in English, but it is underwear in Spanish. Without the use of Constrained-AND, the agent may erroneously retrieve programs such as

```
<Creation>
  <CreationDescription xml:lang=en>Victoria Secrets models women's underwear</CreationDescrition>
  <CreationDescription xml:lang=es>El Secreto de Victoria se demuestra los calzones de mujer</CreationDescrition>
</Creation>
```

The example shown in FIG. 44 depicts the Constrained-AND operator used for the Creator preference. A special syntax in the Mapping Table indicates that the base path is "/Program/CreationMetaInformation/Creation//Creator". Therefore, the predicate tests are performed against the node instances of "Creator". The first Program Description examples passes this Constrained-AND test, while the second fails. Notice that the second Program Description would have passed a test that was composed of regular AND operators and their global paths.

As shown in FIG. 44, if all the CAND's were all regular AND's, then the User Preference would be asking:

(1) Are there any nodes of path "/Program/CreationMetaInformation/Creation/Creator/role" that have value matching "Author" AND;

(2) are there any nodes of path "/Program/CreationMetaInformation/Creation/Creator/Individual/FamilyName" that have value matching "martin" AND;

(3) are there any nodes of path "/Program/CreationMetaInformation/Creation/Creator/Individual/FamilyName" that have value matching "Martin".

This test would pass both Program Descriptions shown in the example.

As shown in FIG. 44, with the defined CAND's, the User Preference is asking:

(1) are there any nodes of path "/Program/CreationMetaInformation/Creation/Creator", then, at each instance of these nodes;

(2) are there any child nodes of path "role" that have value matching "Author" AND;

(3) are there any child nodes of path "Individual/FamilyName" that have value matching "Martin" AND;

(4) are there any child nodes of path "individual/GivenName" that have value matching "Steve".

This test would only pass the first Program Description. This illustrates that the user of AND and CAND operators on the same program description may result in different results.

Figure 45A:
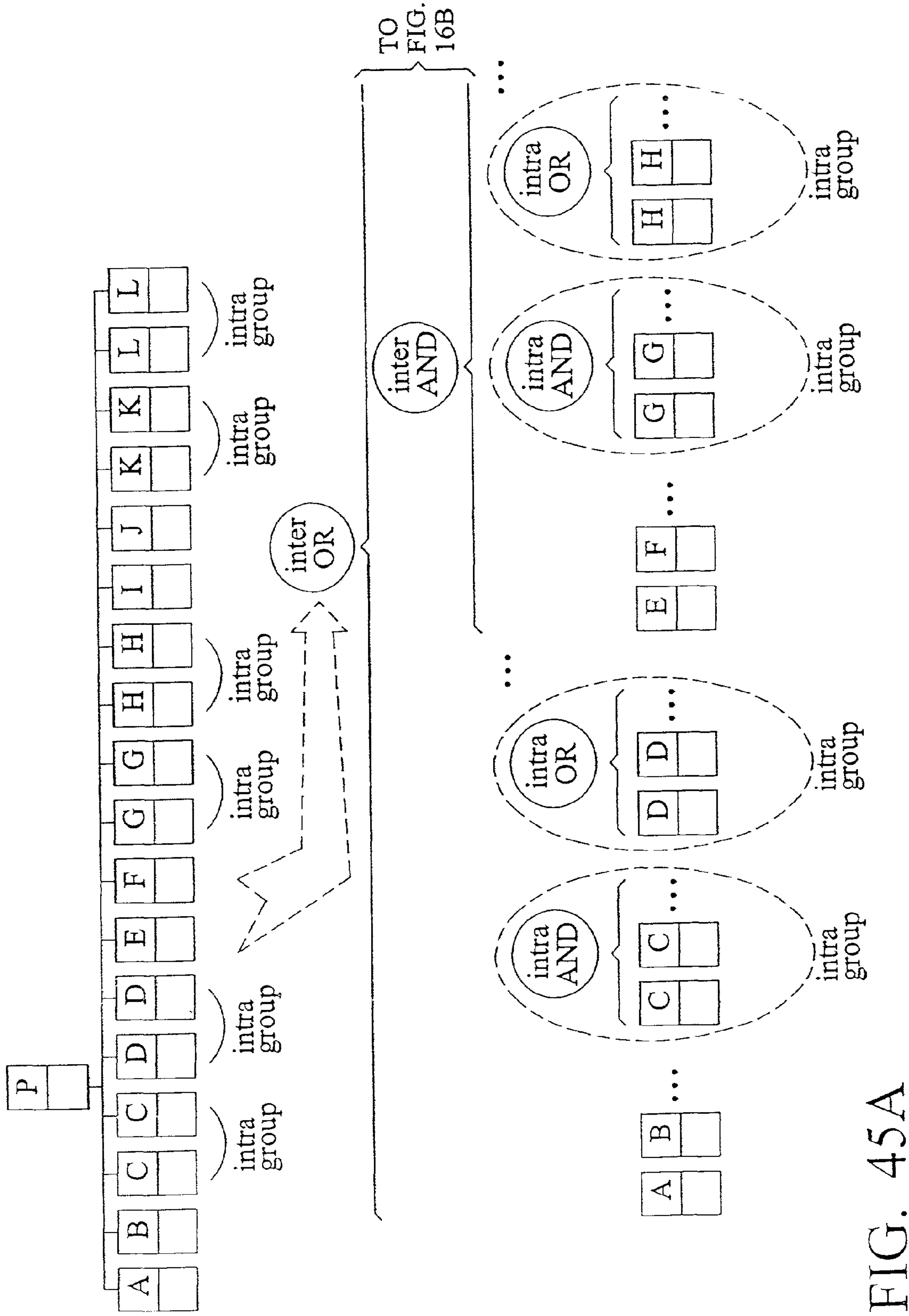
FIGS. 45A and 45B are an exemplary embodiment of the operators.
Figure 45B:
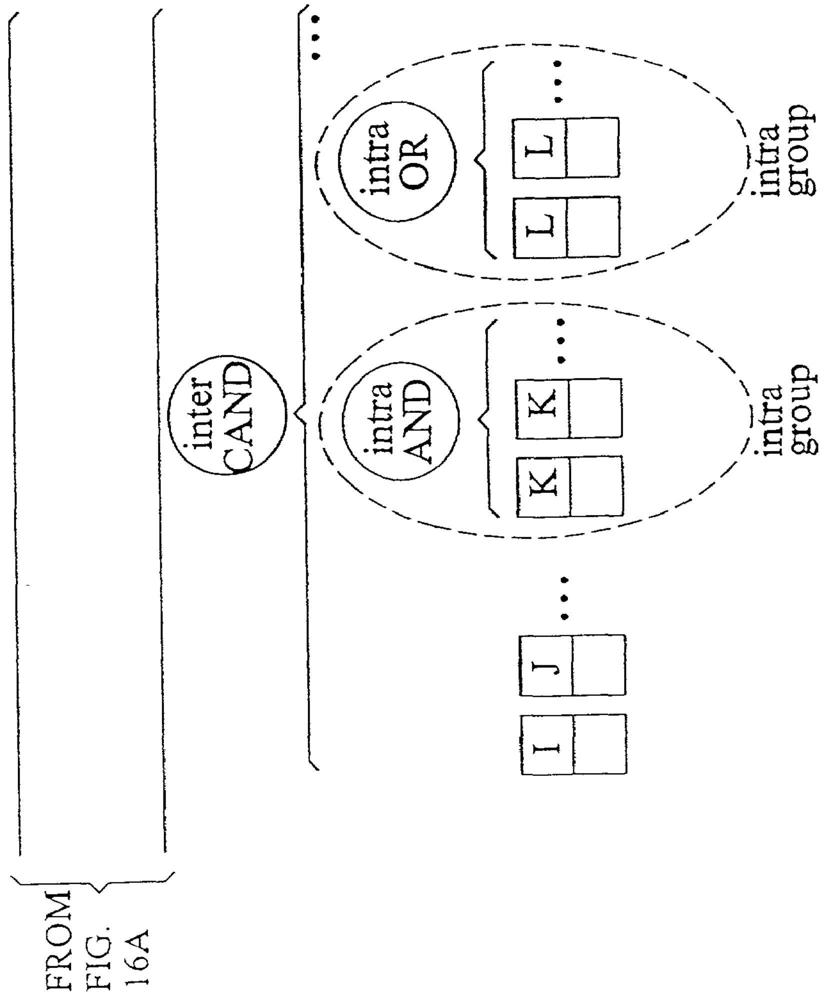

Referring to FIG. 45, a general example demonstrates Inter Operators, Intra Operators, and Constrained Operators. The rules for combining the tests may be, for example:

(1) group together tests which have InterOp=CAND, forming the CAND group;

(2) determine the base path for the CAND group from the lowest common Program Description path indicated in the Mapping Table;

(3) for each path instance in the Program Description that is equivalent to this base path, evaluate all the tests within the CAND group, from this path instance;

(4) evaluate all the tests not within the CAND, from the root path;

(5) group together test results within Intragroups which have IntraOp=AND, forming IntraAND results;

(6) AND the test results within Intragroups which have IntraOp=AND, forming IntraAND results;

(7) OR the test results within Intragroups which have IntraOp=OR, forming IntraOR results;

(8) AND the solitary test results (not part of an Intragroup) and Intragroup results which have InterOp=CAND, forming the InterCAND result;

(9) AND the solitary test results and Intragroup results which have InterOp=AND, with the InterCAND result, forming the InterAND result;

(10) OR the solitary test results and Intragroup results which have InterOp=OR, with the InterAND result, forming the InterOR result; and

(11) The InterOR result is the result for the parent test.

Figure 46A:
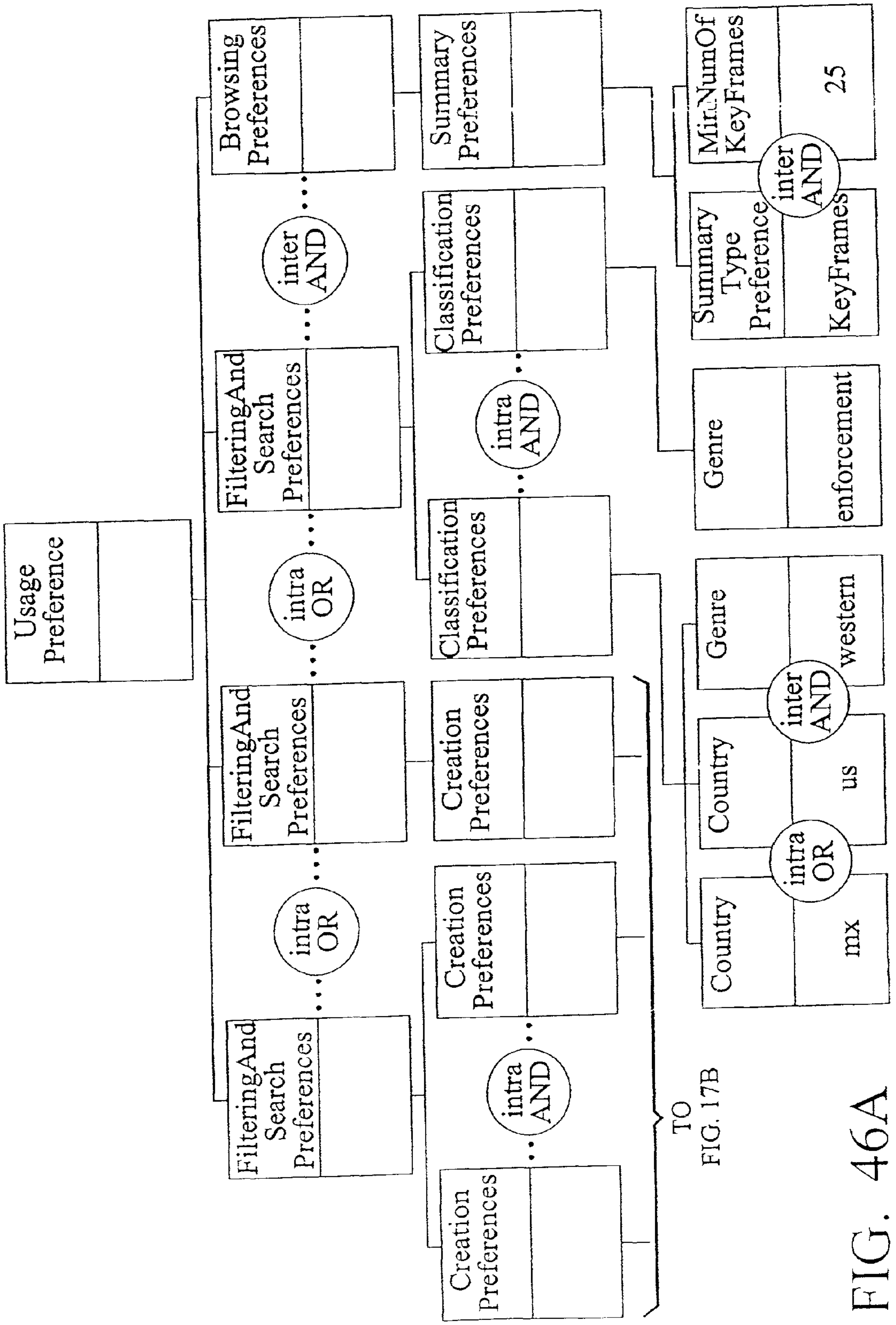
FIGS. 46A and 46B are an exemplary embodiment of the operators.
Figure 46B:
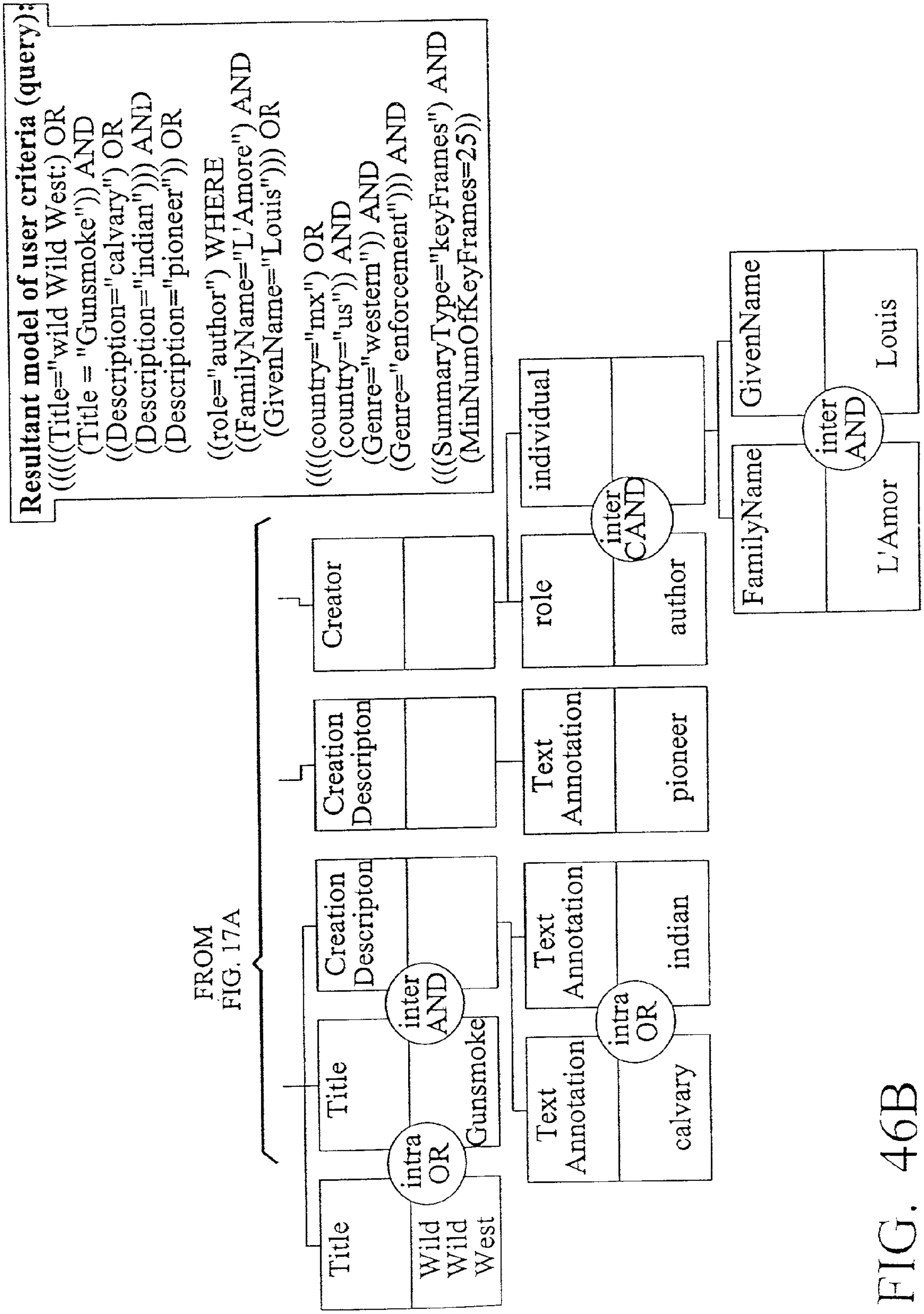

An illustrative example of one embodiment of the technique described herein includes the example illustrated in FIG. 46 together with the resulting Mapping Table illustrated in FIGS. 47A-47D. It is noted that the default for InterOp/IntraOp operations are AND/OR. It is also noted that the preferences just below the highest level (CreationPreferences, ClassificationPreferences, SummaryPreferences) are AND/AND. Also some of the composite preferences such as Creator have child preferences that are CAND/OR. Further, the multiple Filtering And Search Preferences may be distinguished by Preference Type attributes. The IntraOp for multiple Filtering And Search Preferences and multiple Browsing Preferences is specified.

The multiple User Preference elements may contain a ranking attribute. Such ranking attributes may be applied at each comparison test and each combinatorial operation, to yield a composite ranking score, this may be utilized to provide a sorted test result for the user.

Figure 48:
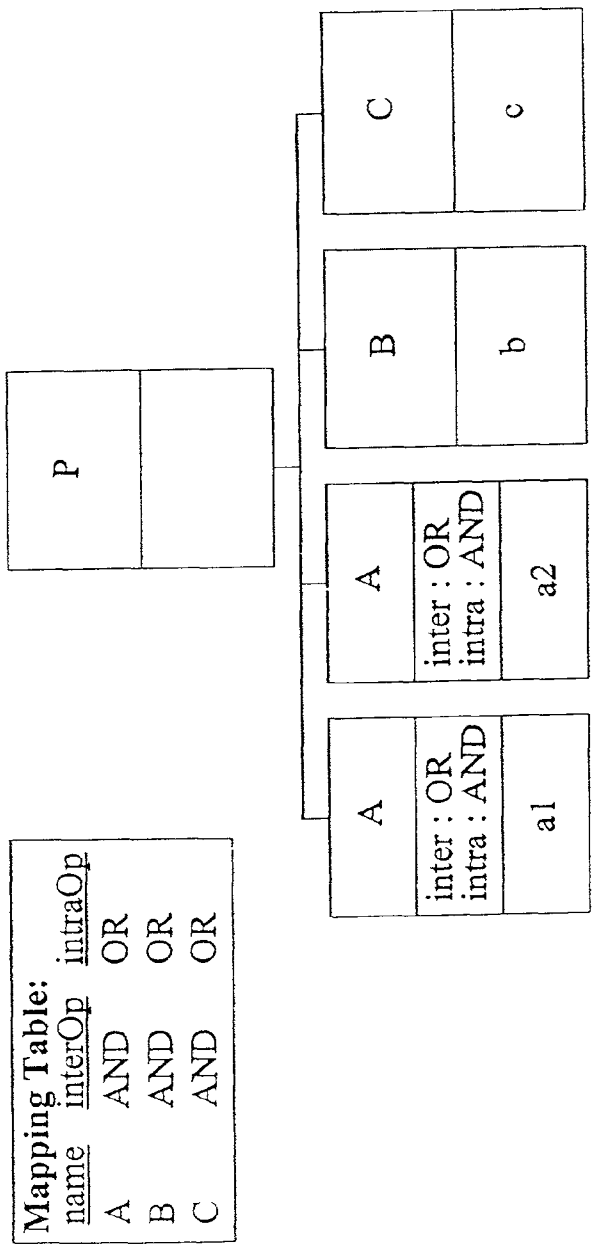
FIG. 48 is an exemplary embodiment of selected combinatorial operators.

Referring to FIG. 48, the user preference hierarchy of (name:value) pairs may be supplemented with attributes regarding the intended combination of individual preference tests. As shown in FIG. 19, the supplementation may indicate that the two tests of type A should be AND'd together and this result OR'd with the other tests under this parent. The primary advantage of this supplemental enhancement is that the user preference description may override the default behavior for specific tests. This makes interpretation of the user preference description more flexible so that it may be tailored to the user's specific preference criteria.

The discrete implementation of the filter agent will yield as output a group of program descriptions that are merely members of the input set. The output group may actually just be a list of the input Program Descriptions that passed the selections. However, there can be components of the User Preference Descriptions that are well suited to extract a subset of the whole Program Description that yields an output more tailored to the user's preference criteria. For instance, the user may request a maximum number of key frames in order to prevent overloading the bandwidth capabilities of their system.

The process of cloning the selected input Program Descriptions and modifying them to include a particular desired subset by the user may achieve enhanced benefits. The modified Program Description is a clone of the input because it refers to the same base set of Program Media. However, it is modified to refer to the subset of the Program Media that is desired by the particular user. In some cases this may result in smaller quantity of the program being available. In other cases, this may result in different summaries of the program, though it refers to the full program.

The cloned Program Description provides a more succinct representation of what the user prefers. In this manner, it may not be necessary to annotate or provide additional identifiers to describe what the user actually desires.

In a modular implementation, the filter agent may not be closely coupled with the media manager and the presentation processes. In this case, the cloned Program Description offers a standardized format for describing the desired program, without having to create a new syntax or an application programming interface (API).

The cloned Program Description may also be used to create a "pull" for Program Media that will yield only the desired portions of the media. This provides a convenient technique for a media provider to provide to the user only that specific media that is desired.

A service provider may likewise provide service to the user according to the user's preference where service includes a modified cloned program description. The cloned description may be a subset of the complete "rich" program description that is usually maintained by the service provider. The clone may contain varying levels of "richness". This permits the provider to offer various service levels to its clients.

The cloned Program Description also allows the customer and/or service provider to tailor the amount of material that will be transmitted to the customer. This enables the quantity of material to be matched to the available memory in the client device and the available bandwidth of the delivery channel.

The cloned program descriptions may provide a memory efficient way of storing descriptions of selected programs in the client's local storage.

Figure 49:
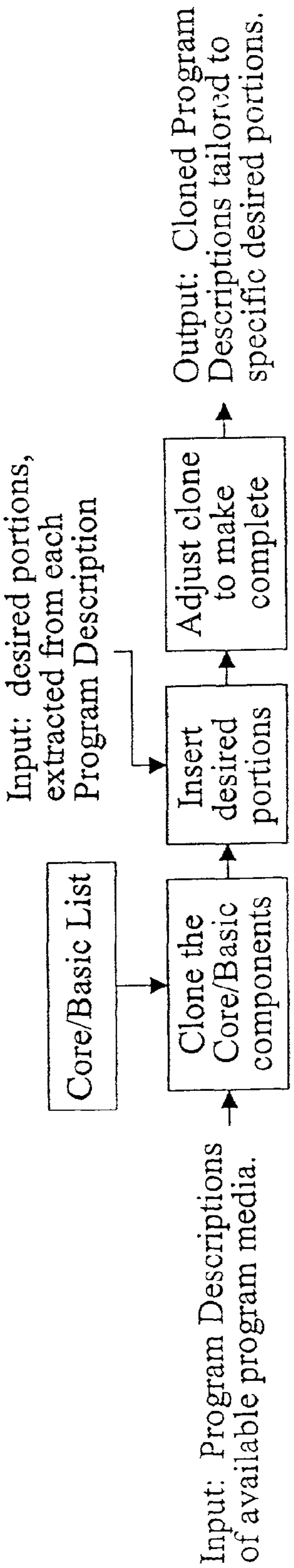
FIG. 49 is an exemplary embodiment of cloning.

One technique to achieve cloning is cloning by "addition", as illustrated in FIG. 49. The core elements of a Program Description are identified and copied into the clone. These items typically include the root "/Program" element, the "/MediaInformation", etc. To this core set, the extractor adds the desired components for the user. Also, some adjustment may be necessary to resolve interdependencies of the extracted elements. For example, the Program Description may contain elements or groups of elements that are extensions or refinements of other elements in the Program Description. These extension elements may refer to the base elements without actually duplicating the base elements. In this instance, if the extractor should extract the extension elements but not the base elements then all the base elements must be inserted into the closed Program Description to make it accurate.

Figure 50:
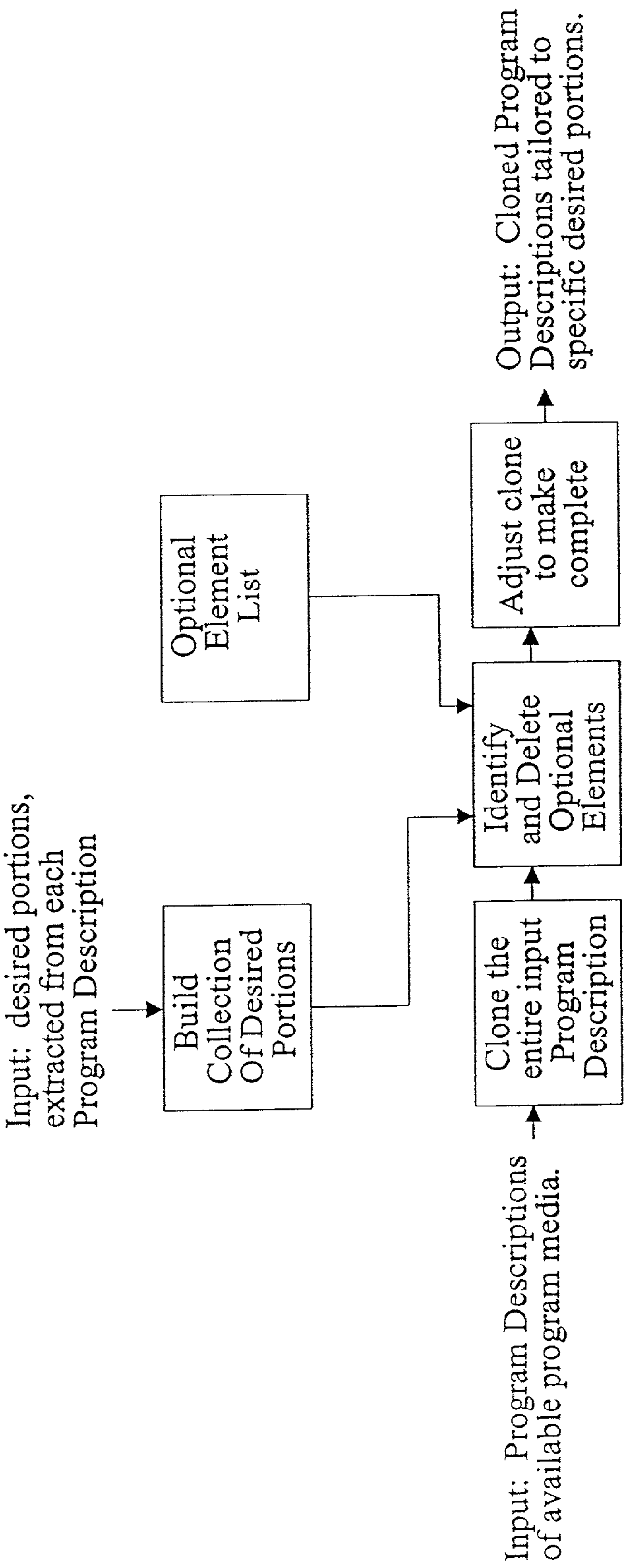
FIG. 50 is another exemplary embodiment of cloning.

Another technique to achieve cloning is cloning by "deletion", as illustrated in FIG. 50. The entire input Program Description is cloned for the output. The extractor then builds a list of the desired components that are to be retained in the output. Then, optional elements are identified in the clone. If these optional elements are not included in the list of elements to be retained, then they are deleted. Thereafter, some adjustments may be necessary to resolve interdependencies of the extracted elements, as previously described. One advantage of cloning by deletion over cloning by addition is that it is less susceptible to changes in the Program Description. Items that are not explicitly listed as being optional will be passed on. In effect, this method errs on the side of passing too much data, while cloning by addition errs on the side of passing too little.

A vast amount of audiovisual material exists from which the user may select appropriate audiovisual materials that may be of interest. However, there needs to be developed effective techniques to determine which audiovisual materials are most likely appropriate for a particular user. Typically these techniques include the use of an agent that compares in some manner the user's preferences to the audiovisual content. Existing agents typically offer rudimentary preference weighting techniques based upon preference items such as title, keyword, author, and cast. The weighting scheme determines to what extent a particular set of user preferences matches the description of the different audiovisual materials, such as a binary yes/no determination. After determining the extent to which the user preferences matches a particular audiovisual material an overall score is calculated. After computing the overall score for each of the audiovisual materials they may be ranked in order from which the user may select desirable material. However, the use of such a technique makes it difficult to distinguish between programs that are strongly desired versus fringe programs that the user may be rarely interested in. An effective agent should include a technique for identifying priority interests and a mechanism for sorting the priority interests. In essence, the audiovisual content should be distinguished in a meaningful manner.

Figure 51:
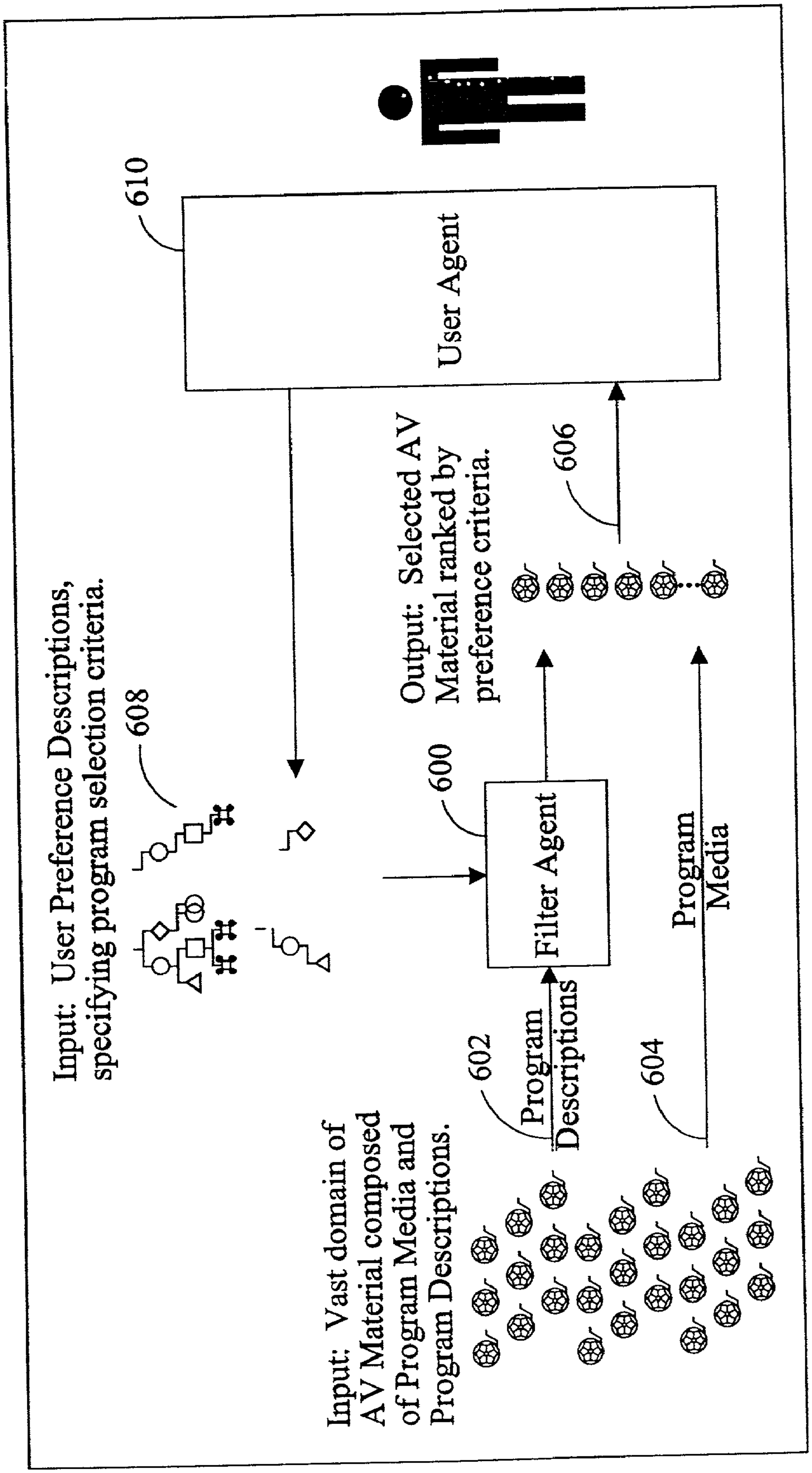
FIG. 51 is a diagram illustrating the use of a filter agent in combination with user preference descriptions, audiovisual content, and a user agent.

Referring to FIG. 51, the input to a filter agent 600 may include program descriptions 602 relating to one or more audio, video, or audiovisual (collectively referred to as audiovisual without limitation) materials 604. The filter agent 600 also receives user preference descriptions 608, typically from a user agent 610, which may be hierarchical if desired. The filter agent 600 based upon the user preference descriptions 608 and the program descriptions 602 provides selected audiovisual materials 606, which may be rated if desired. The selected audiovisual materials may be provided to a user agent 610 and then to the user, if desired. The user agent 610 may create the user preference profile. Alternatively, the user or other party may utilize an authoring tool or automatic profile generator to create the user preference profile.

Figures 52, 53:
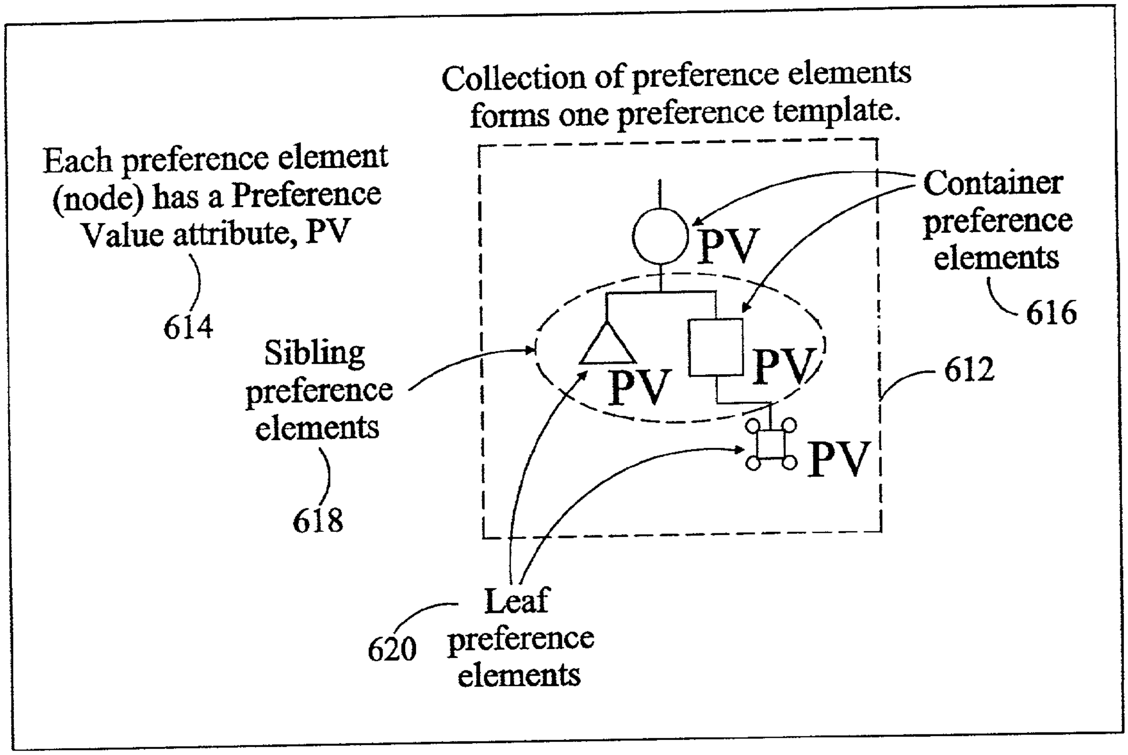
FIG. 52 is a diagram illustrating different elements and their interrelationships.
FIG. 53 is a diagram of preference values.

Referring to FIG. 52, a collection of related preferences may form a single preference template 612 (e.g., comedies with Eddie Murphy). The user agent 610 may create a group of one or more preference templates 612 that are evaluated to present the user with filtered and ranked programs. Each component of a preference template that may carry a preference value (PV) attribute may be referred to as a preference element (or node) 614. A container (or parent) 616 preference element has children preference elements 618. A parent may also have an individual preference test. Leaf preference elements 620 are those that do not have children and may refer to an individual preference test (e.g., genre is comedy).

Referring to FIG. 53, the values defined by the preference value may take one or more values, such as for example, nominal value 620, neutral value 622, maximum value 624, and minimum value 626. It is to be understood that the preference values may take on other values. The neutral value 622 is preferably zero or some other predefined value representative of a neutral preference or indifference to programs with the associated preference. Typically, preference values with a neutral value (or null set) are not included in the resulting classification or scoring of the associated audiovisual content. The nominal value 620 preferably has a value other than zero, or some other predefined value, representative of a desire or disdain for programs with the associated preference. In essence, the nominal value 620 indicates which programs are desirable by the user and which programs are not desired by the user. In this manner, programs which are desirable are more likely provided to the user, while programs that contain disdained content will be more likely not provided to the user. The nominal value 620 may be a constant value or otherwise a range of values to indicate a relative desire or disdain for particular content. Preferably, the user agent 610 or filter agent 600 provides a default value for the nominal values 620, so that the user does not have to explicitly define each of the nominal values. The user may define any of the nominal values 620, as desired. Preferably, there is not a predefined maximum value 624 or minimum value 626. Conceptually, a maximum value may represent that the user agent wants programs with a particular preference to always be selected and ranked highest. Similarly, a minimum value might represent that the user agent wants programs with a particular preference to always be rejected. In both of these cases the user agent may effectively simulate the maximum and minimum concept by selecting the value appropriately (e.g., +/−1, 000,000).

The user preference description may include a hierarchy of preferences, many of which include preference value attributes. When each "individual preference" is evaluated against the corresponding information from the program descriptions a score is calculated for that individual preference. In one embodiment, the hierarchy of preferences for an individual hierarchy may be evaluated by creating a composite score from the aggregation of individual scores within the hierarchy. The resulting composite score is then compared against other composite scores for other program descriptions to determine a relative ranking. The composite score for a particular program description may be determined free from consideration of other program descriptions, if desired.

While a composite score provides a relatively good measure for the desirability for any particular media, especially when compared against other composite scores, the present inventor determined that the resulting relative composite scores may be misleading of the desirability of the content. For example, a particular audiovisual program may have only a limited occurrence of a particular event or item, in which case the composite score will likely consider that limited occurrence as being fully present in the program. However, a different audiovisual program may have frequent occurrences of a particular event or item, in which case the composite score will likely merely consider that frequent occurrence in the same manner as the limited occurrence. Accordingly, it may be preferable to rank programs at an intermediate level, described later. Also, it is not preferable to combine the preference values into a single composite preference value. Instead, each score, which is evaluated using its associated preference value, is combined into a composite score. When examining a user preference, it may be useful to combine one or more of the preference values, but this is actually combining the resultant scores when the preference is found to match a corresponding program description attribute. Also, it is likewise preferable not to compare a score against a preference value. Rather, the score is the result of the actual test considered with the preference value, and this score should be compared against other scores or against implementation-fixed thresholds.

There are preferably at least two distinct processes occurring when the filter agent 600 processes a user preference 608. One process is the filtering of programs (pass or reject). The other process is the scoring and ranking of the selected programs into an ordered list (e.g., from most preferred to least preferred). The ranking values may be any type of indication, as desired. These two processes may be implemented by a variety of functions (e.g. filtering-function ∈ {Boolean-AND, Boolean-OR, etc. }, ranking-function ∈ {MIN, MAX, SUM, AVG, etc.}). These two processes may be distinct, such as, filter then rank, or rank then filter, or they may be integrated, namely, simultaneously filter and rank. In the hierarchical combination of user preferences, each combinatorial operator (AND, OR, etc) preferably implements some form of a filtering function and a ranking function. There may be a family of varieties of the AND and OR operators (or other operators) which implement different filtering and ranking functions.

Programs may be ranked according to their respective scores, which is a relative relationship. The preference values and scores may be scaled without changing the result of the filter agent 600. The definition of a zero neutral value (or other value) sets a point for the filtering of programs based on score results. Depending on the filtering function, programs with a score above zero (or other value) may be passed and programs with zero or a negative score (or other value) may be rejected. The definition of the nominal value does not set an absolute significance for preference values and scores. The nominal value merely sets the default value that may then be compared (relatively) to other preference values and scores.

The preference values may likewise be more than simply a number to provide further refinement of the selection process. The preference values may take the form of relativistic operations that compare different portions of the user preferences and multiple program descriptions at a level less than the entire program description. In this manner, portions of the program descriptions may be compared to one another which provides significantly improved results. A set of scenarios are provided to illustrate exemplary comparisons that may be implemented by the filter agent 600.

Each comparison may vary according to any suitable criteria, such as, for example, the following criteria:

(1) Hierarchy of preferences includes a single branch or multiple branches that are being compared;
(2) Combinatorial operators such as OR, AND, etc.;
(3) Composite score versus independent evaluation determines whether all of the individual tests are compiled into one composite score for an entire program, or whether one or more branch tests of a program are evaluated and compared in a relative manner against one or more branch tests of other programs; and/or
(4) Non-preference indicates a negative preference for a program by appropriate selection of preference values and resulting scores.

Figure 54:
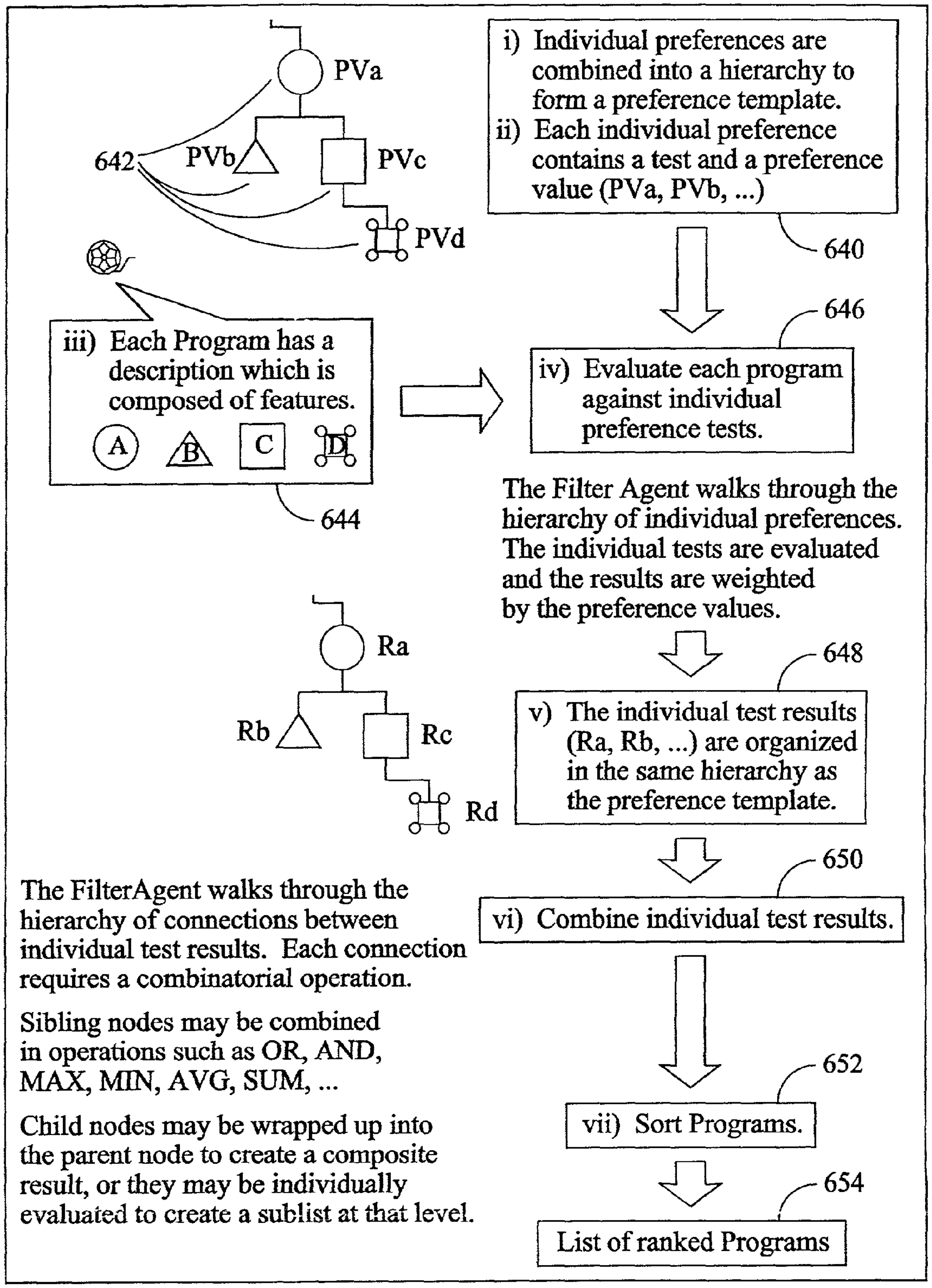
FIG. 54 is a diagram of an exemplary test case evaluation.

Referring to FIG. 54, the test case for each example may be evaluated as follows:

(a) In each example, one or more individual preferences 640 may be provided. These are designated by lower case 'a', 'b', 'c', . . . and preferably arranged in a hierarchy.
(b) The value for each individual preference is the preference value. These are designated as 'PVa', 'PVb', 'PVc'. . .
(c) One or more programs may have some measurable presence of the desired program feature 644. These are designated by upper case 'A', 'B', 'C', . . . and are related to the corresponding individual preference (in lower case).
(d) The outcome of each individual preference test 646 is an individual presence value. The individual presence value is multiplied by the preference value for that program feature to yield the individual test result. Any other type of comparison, or other operation, may be used as desired.

(e) All or part of the resultant individual test results are preferably arranged in the same hierarchy as the preference template at block 648.

(f) The individual test results may be combined at block 650. They may be combined across all levels to create one composite score, or they may be combined and evaluated at one or more levels to create sublists at each parent node. These sublists may be used as the basis for ranking in a manner independent of the ranking for the entire program, if desired. Sibling nodes may be combined in operations such as OR, AND, MAX, MIN, AVG, SUM, . . . . Programs with test results that fall below a threshold may be rejected before or after the results are combined.

(g) The ranking of programs at block 652 may be performed by sorting the score results, such as the highest score ranked number one, etc. at block 654.

Figures 55, 56, 57, 58, 59:
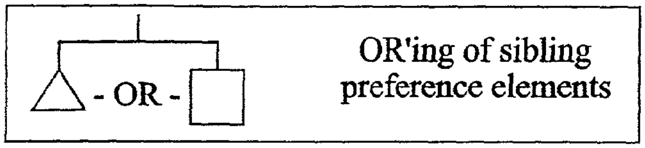
FIG. 55 is a single branch OR'ing combination.
FIG. 56 is a single branch more is better OR'ing combination.
FIG. 57 is a single branch just slightly more is better OR'ing combination.
FIG. 58 is a single branch strong preference is better OR'ing combination.
FIG. 59 is a single branch range of preference and presence yields range of ranking OR'ing combination.

Referring to FIG. 55, a single (or multiple) branch combining sibling leaf elements (or other elements) using an OR'ing combination is illustrated. The result is the same as a traditional OR operation, namely, if either is true then the result is true (or score obtained).

Referring to FIG. 56, a single (or multiple) branch combining sibling leaf elements (or other elements) using a MORE IS BETTER combination, which may be implemented as one or more operations, is illustrated.

Design Rule 1: The OR combinatorial operator means "I want programs with at least one of these listed items." Generally, the more that are found, the better and hence more should be ranked above less.

Design Rule 2: The preferred ranking function for the OR combinatorial is the SUM function.

Design Rule 3: An alternative ranking function for the OR combinatorial is the MAX function. The MAX function selects the greatest value, e.g., the most desirable. Other ranking functions may likewise be used.

Test case description: If the user agent wants to see programs with dogs(A) or cats(B), then programs with dogs and cats should rank above programs with just dogs.

[Test case example illustrated in FIG. 56]

Test=a OR b

PVa=PVb=1

Program J (A=B=1)

Program K (A=1, B=0)

The test is an OR'ing of individual preference 'a' or 'b', where 'a' and 'b' are testing for the presence of 'A' and 'B'. Program 'J' has full presence of 'A' and 'B', and Program 'K' has full presence of 'A' and no presence of 'B'.

Referring to FIG. 57, a single (or multiple) branch combining sibling leaf elements (or other elements) using a JUST SLIGHTLY MORE IS BETTER combination, which may be implemented as one or more operators, is illustrated.

Test case description: If the user agent wants to see programs with dogs(A) or cats(B), then programs with dogs and only a tiny amount of cats, should rank higher than programs with just dogs. Likewise, Program K would rank higher than Program J, if B=0.3 for Program K.

[Test case example shown in FIG. 57]

Test=a OR b

PVa=PVb=1

Program J (A=1, B=0.01)

Program K (A=1, B=0)

Referring to FIG. 58, a single branch (or multiple) combining sibling leaf elements (or other elements) using a STRONG PREFERENCE IS BETTER, which may be implemented as one or more operators, is illustrated.

Design rule 4: If a user agent has a strong preference for something, this should override nominal or weaker preferences.

Test case description: If the user agent strongly wants to see programs with dogs(A) or nominally wants to see cats(B) or mice(C), then programs with dogs should rank above programs with cats and mice.

[Test case example illustrated in FIG. 58]

Test=a OR b OR c

PVa=4, PVb=PVc=1

Program J (A=1, B=C=0)

Program K (A=0, B=C=1)

Referring to FIG. 59, a single (or multiple) branch combining sibling leaf elements (or other elements) using a RANGE OF PREFERENCE AND PRESENCE YIELDING RANGE OF RANKING, which may be implemented as one or more operators, is illustrated.

Design rule 5: The evaluation and combination of individual test results should be linear such that partial preferences and partial presences are ranked in a range from neutral preference/non-presence to full preference/full presence.

Test case description: If the user agent strongly wants to see programs with bears(A) or nominally wants to see lions(B) or tigers(C), then programs with partial bears should rank the same, or higher, or lower than programs with full tigers and lions, depending on the preference values. Programs should be ranked linearly, or in any other manner, according to the PVs and the degree of presence.

[Test case example illustrated in FIG. 59]

Test=a OR b OR c

PVa=4, PVb=PVc=1

Program J (A=0.4, B=C=0)

Program K (A=0.5, B=C=0)

Program L (A=0, B=C=1)

Program M (A=0.1, B=C=1)

Figures 60, 61, 62, 63, 64:
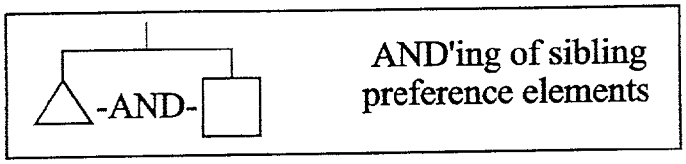
FIG. 60 is a single branch AND'ing combination.
FIG. 61 is single branch more is better AND'ing combination.
FIG. 62 is a single branch range of preference and presence AND'ing combination.
FIG. 63 is a single branch filter-first vs. score-first AND'ing combination.
FIG. 64 is an alternative single branch filter-first vs. score-first AND'ing combination.

Referring to FIG. 60, a single (or multiple) branch combining sibling leaf elements (or other elements) using an AND'ing combination is illustrated. The result is the same as a traditional AND operation, namely, if both are true then the result is true (or some value).

Referring to FIG. 61, a single branch (or multiple) combining sibling leaf elements (or other elements) using a MORE IS BETTER, which may be implemented as one or more operators, is illustrated.

Design rule 6: The preferred ranking function for the AND combinatorial is the average function. This takes the average of the component test results to create a score that is used for ranking.

Design rule 7: An alternative ranking function for the AND combinatorial is the minimum function. This takes the value of the lowest test result as the score for the combination.

Design rule 8: When evaluating the AND combination, as with the OR combination, more preference and presence is typically better.

Test case description: If the user agent wants to see programs with neural(A) and network(B), then programs with full neural and full network should rank above programs with full neural and partial network.

[Test case example illustrated in FIG. 61]

Test=a AND b

PVa=PVb=1

Program J (A=B=1)

Program K (A=1, B=0.5)

Referring to FIG. 62, a single (or multiple) branch combining sibling leaf elements (or other elements) using a RANGE OF PREFERENCE AND PRESENCE, which may be implemented as one or more operators, is illustrated.

Design rule 9: When evaluating the AND combination, as with the OR combination, the individual tests and the combination of individual test results should be linear (or any other type) such that partial preferences and partial presences are ranked in a range from neutral preference/non-presence to fill preference/full presence.

Test case description: If the user agent wants to see neural (A) and network(B), then programs with full neural and tiny network should rank same, or higher, or lower than programs with partial neural and partial network, depending on the presence and preference values.

[Test case example illustrated in FIG. 62]

Test=a AND b

PVa=PVb=1

Program J (A=B=0.6)

Program K (A=1, B=0.1)

Program L (A=B=0.5)

Referring to FIG. 63, a single (or multiple) branch combining sibling leaf elements (or other elements) using a FILTER FIRST VERSUS SCORE FIRST, which may be implemented as one or more operators, is illustrated.

Design rule 10: The preferred order of operation for the AND combinatorial is score then filter. In this order, the score for the AND combination is calculated and then if it is below some threshold, the program is rejected.

Test case description: If the user agent wants to see artificial(A) and vision(B), then programs with full artificial and partial vision should rank above programs with partial artificial and partial vision which rank above programs with full artificial and no vision.

[Test case example illustrated in FIG. 63]

Test=a AND b

PVa=PVb=1

Program J (A=1, B=0.9)

Program K (A=B=0.9)

Program L (A=1, B=0)

Referring to FIG. 64, an alternative single (or multiple) branch combining sibling leaf elements (or other elements) using a FILTER FIRST VERSUS SCORE FIRST, which may be implemented as one or more operators, is illustrated.

Design rule 11: An alternative order of operation for the AND combinatorial may be filter then score. In this order, if a program has zero or less of some AND'd preference, then it is rejected, regardless of the rest of the scoring. If the score is propagated upward in the hierarchy to be used in other combinatorial operations, then the score should indicate neutral or non-preference (e.g. zero or negative value).

Test case description: If the user agent wants to see artificial(A) and vision(B), then programs with full artificial and no vision should fail.

[Test case example illustrated in FIG. 64]

Test=a AND b

PVa=PVb=1

Program L (A=1, B=0)

Container preference elements may be evaluated and combined with other preference elements (either container, leaf, or otherwise) in a variety of combinatorial operations.

Figures 65, 66, 67:
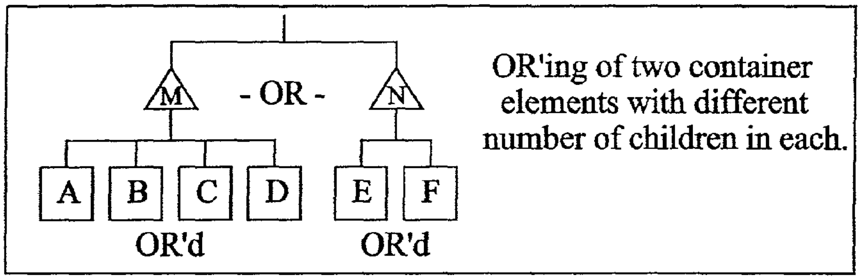
FIG. 65 is a multi-branch OR'ing combination.
FIG. 66 is a multi-branch OR'ing combination implementation.
FIG. 67 is an alternative multi-branch OR'ing combination implementation.

Referring to FIGS. 65 and 66, a multiple branch combining sibling leaf elements (or other elements) using a MULTI-BRANCH OR'ING, which may be implemented as one or more operators, is illustrated.

Design rule 12: The OR combinatorial function implemented by SUM (or other functions) should combine all the sibling elements (or otherwise) the same, without regard to the number of siblings (or otherwise).

User agent rule: If the user agent intends that the ratio of passing preferences should matter, then the agent should adjust the preference values accordingly.

Design rule 13: An alternative ranking function for the OR combination would account for the ratio of passed components.

Test case description: A user agent wants to see movies with as many actors from group-N as possible or as many actors from group-M as possible. If N={A, B, C, D) and M={E, F}, then the user agent may wish to see a movie with A, B, C ranked over a movie with E, F.

[Test case example illustrated in FIG. 66]

Test=x OR y; x=a OR b OR c OR d; y=e OR f

PVx=PVy=PVa=PVb=PVc=PVd=PVe=PVf=1

Program J (A=B=C=1, D=E=F=0)

Program K (A=B=C=D=0, E=F=1)

Test case description: A user agent wants to see movies with the highest percentage of actors from group-N or the highest percentage of actors from group-M. Illustrated in FIG. 67. If N={A, B, C, D} and M={E, F}, then the user agent may wish to see a movie with E, F ranked over a movie with A, B, C.

[Test case example illustrated in FIG. 67]

Test=x OR y; x=a OR b OR c OR d; y=e OR f

PVx=PVy=PVa=PVb=PVc=PVd=1

PVe=PVf=2

Program J (A=B=C=1, D=E=F=0)

Program K (A=B=C=D=0, E=F=1)

Referring to FIGS. 68 and 69, a multiple branch combining sibling leaf elements (or other elements) using a COMPOSITE SCORING, which may be implemented as one or more operators, is illustrated.

Design rule 14: A preferred method for combining the children test results of a parent element (or otherwise) is to combine them into one composite score and pass this up to the containing grandparent element (or otherwise), as illustrated in FIG. 68. At the root composite element, this composite score is used to rank all the programs. This method may be referred to as composite scoring.

Test case description: In a composite scoring combination, if the user agent partially wants to see westerns (X) that star Eastwood(A) or Wayne(B), or fully wants to see dramas (Y) with a sub-preference that is full for Gibson(C) or small for Cruise(D), then a western with Eastwood should rank higher than a drama with Cruise. The user agent is intending to seek for programs with the highest overall score for all their preferences.

[Test case example illustrated in FIG. 69]

Test=x OR y; x=a OR b; y=c OR d

PVx=0.8, PVy=PVa=PVb=PVc=1, PVd=0.5

Program J (A=B=1, C=D =0)

Program K (A=B=0, C=D=1)

Referring to FIGS. 70-73, a multiple branch combining sibling leaf elements (or other elements) using a INDEPENDENT EVALUATION, which may be implemented as one or more operators, is illustrated.

Design rule 15: An alternative method for combining the children test results of a parent element (or otherwise) is to rank all the programs for each of the children tests (or otherwise) separately. These sublists of rankings are then inserted, as a block, into a super list for the parent element, where each block is ranked according to the preference value of the child test. This method may be referred to as independent evaluation.

Design rule 16: When sublists are inserted into super lists, the position of any program should assume the position that the program takes in the highest sublist that contains the program. (Only keep the highest position for each program.)

Test case description: In an independent evaluation combination, if the user agent partially wants to see westerns (X) that star Eastwood(A) or Wayne(B), or fully wants to see dramas(Y) with a sub-preference that is full for Gibson(C) or small for Cruise(D), then a western with Eastwood should rank lower than a drama with Cruise. The user agent is intending to seek for dramas above all westerns.

[Test case example illustrated in FIGS. 71, 72, and 73]

Test=x OR y; x=a OR b; y=c OR d

PVx=0.8, PVy=PVa=PVb=PVc=1, PVd=0.5

Program J (A=B=1, C=D=0)

Program K (A=B=0, C=D=1)

Design rule 17: The OR'ing of sibling container preferences with equal PVs using independent evaluation is equivalent to using composite scoring.

User agent rule: If the user agent intends to intermingle the ranked results across two branches (or otherwise), but also intends to rank one branch's results slightly higher than the other (or otherwise), then the agent can use composite scoring and adjust the PVs of the leaf tests (or otherwise) of the higher preferred branch to give this slight advantage, and the results will still be intermingled.

Referring to FIG. 74, a multiple branch combining sibling leaf elements (or other elements) using a COMPARING VARIOUS PVS ACROSS HIERACHY, which may be implemented as one or more operators, is illustrated.

Design rule 18: In AND operations, creating branch sublists and then merging these lists should yield the same results as creating one composite list. Therefore "independent evaluations" are not relevant. All the components of the AND operation should be scored and these results should be combined into a composite score.

Test case description: If the user agent is strongly interested in horses(A) or ostriches(B), and nominally interested in breeding(C) or grooming(D), then a program with partial horses and fall grooming should rank lower than a program with full horses and partial grooming.

[Test case example illustrated in FIG. 74]

Test=x AND y; x=a OR b; y=c OR d

PVx=2, PVy=PVa=PVb=PVc=PVd=1

Program J (A=0.9, B=C=D=1)

Referring to FIG. 75, a multiple branch combining sibling leaf elements (or other elements) using a UNQUALIFIED OR'ING OF NON-PREFERENCES MAY RETRIEVE LARGE QUANTITY OF RESULTS, which may be implemented as one or more operators, is illustrated.

Design rule 19: The use of OR combination with non-preferences is a special case that should be used in conjunction with other AND'd preferences. If the non-preference is OR'd in the main branch, without being further qualified with another AND'd preference, this will tend to retrieve the majority of the programs available. OR'ing of non-preferences is generally only useful if this branch is qualified with another branch in an AND'ing combination.

Referring to FIG. 76, a multiple branch combining sibling leaf elements (or other elements) using a QUALIFIED OR'ING OF NON-PREFERENCES IS PREFERRED, which may be implemented as one or more operators, is illustrated.

Design rule 20: The nature of OR'ing operations is such that individual members of the combination should not decrease the combined score, rather, they can only increase the score. When combining non-preferences in an OR combination, the individual test result (negative value) should be translated into the positive preference range by adding the individual preference value to the result.

Test case description: If the user agent wants to see programs with "nature" (A) or without "city" (B), then a program with nature and city should be ranked lower than a program with just nature.

[Test case example illustrated in FIG. 77]

Test=a OR b

PVa=1, PVb=−1

Program J (A=B=1)

Program K (A=1, B=0)

Referring to FIG. 78, a multiple branch combining sibling leaf elements (or other elements) using a NON-PREFERENCE SCORE FIRST RESULTS IN ANY PRESENCE YIELDING LOWER RANKING, which may be implemented as one or more operators, is illustrated.

Design rule 21: The preferred order of operation for the AND combinatorial of non-preferences is to score then filter. In this case, the score for the AND combination is calculated and if the composite score is below zero, the program is rejected.

Design rule 22: When the order of operation for positive preferences is filter-first and the order for non-preferences is score-first, then the programs are first filtered according to the presence/absence of positive preferences, then the score is calculated for all component preferences (positive and negative). This score is then used to again filter (reject programs below a threshold) and finally rank the programs. (This design rule is not demonstrated in the test cases below.)

Test case description: If the user agent wants to see programs with "nature" (A) and without "city" (B), then a program with just a glimpse of city should pass lower than a program with just nature.

[Test case example illustrated in FIG. 78]

Test=a AND b

PVa=1, PVb=−1

Program J (A=1, B=0.01)

Program K (A=1, B=0)

Test case description: If the user agent strongly does not want to see city, then a program with just a glimpse of city should fail.

[Test case example illustrated in FIG. 79]

Test a AND b

PVa=1, PVb=−100

Program J (A=1, B=0.01)

Referring to FIG. 80, a multiple branch combining sibling leaf elements (or other elements) using a NON-PREFERENCE FILTER-FIRST MAY RESULT IN ANY PRESENCE YIELDING REJECTION, which may be implemented as one or more operators, is illustrated.

Design rule 23: An alternative order of operation for the AND combinatorial of non-preferences is to filter-first then score. So if a program has the slightest amount of a non-preference, then it is rejected, regardless of the rest of the scoring. If the score must be propagated upward to be used in other OR statements, then the score should be zero or something negative.

Test case description: If the user agent wants to see programs with "nature" (A) and without "city" (B), then a program with just a glimpse of city should fail.

[Test case example illustrated in FIG. 80]

Test=a AND b

PVa=1, PVb=−1

Program J (A=1, B=0.01)

The range and number of multimedia content available to users have increased at a staggering rate, rendering conventional methods of selecting such multimedia content, such as simple browsing, impractical. In order to provide a usable technique to select desirable multimedia, typically the system limits the set of choices available to the user by constructing and maintaining a user profile, which provides a compact description of a user's interests and personal preferences. This user profile is subsequently used to (a) filter input content, so that programs or items that the user has shown interest in are presented to the user, and/or (b) request from a content distribution service the programs of interest. If desired, the user profile may be specified directly by the user, who explicitly states the descriptions of the programs he/she is interested in. Alternatively, user profiles can be automatically generated and updated to match content consumption behavior of users by recording and subsequently analyzing usage history information. Furthermore, content providers (broadcasters and advertisers) can use the usage history information to accurately determine consumer response to, and ratings of, specific programs; to provide personalized content to individuals based on their preferences; and develop various content access, billing, and compensation models for consumers and content creators/owners.

Existing systems for selecting multimedia content focus on collecting a limited amount of information as part of the usage history. The list of available actions and content description items provided by these systems is not suitable for extension as new requirements and applications arise. Furthermore, there is a lack of standardized formats for representation of (multimedia) usage history information; hence the usage history data collected by a certain type of device or service cannot often be utilized directly by others. Additionally, usage history has traditionally been considered only as a tool for generating user preferences and profiles. Further, existing systems provide no technique to record usage history in terms of both individual user actions and detailed categorized lists.

After consideration of the existing limitations with respect to the selection of multimedia content the present inventors developed a system for collecting and describing usage history information of one or more users in a much improved manner. The improved system allows non-intrusive observation of user actions over a period of time, enabling collection of consumption-related data without explicit user input. The period of time may be specified, modified, or otherwise dynamic, as desired. The collected usage history provides a list of the actions carried out by the user over a period of time, if desired, as well as statistical information with respect to the content descriptions, if desired. The content descriptions for the system may be custom for the particular system, standard multimedia descriptions, and may be in any format desired. In particular, descriptions may be in the form of a standard description (such as those defined by the MPEG-7, TV-Anytime Forum, ATSC-PSIP or DVB-SI) that accompanies the input content. The descriptions may also be provided as an auxiliary service, such as electronic program guides provided by cable services and Internet sites like Gist.com and TVGuide.com.

The collected usage history information is preferably expressed in a compact, structured, and consistent format. These properties permit efficient and effective exchange of usage history information between various devices, platforms, applications, service providers, equipment and such, thereby increasing the likelihood of interoperability between these entities.

The preferred implementation uses a description scheme/XML-based approach for describing the content usage history of a user over a period of time. The description schemes define a syntax and semantics for specifying usage history descriptions; i.e. description schemes for usage histories include a sets of rules to which an individual usage history description should comply. Descriptors are generally referred to as attributes of these descriptions. The use of a common set of description schemes and descriptors also enables interoperability; that is, different devices and systems are able to interpret usage histories that comply with the description schemes. At the same time, description schemes do not need to prescribe completely how an application should use the information embedded in the description, for instance, applications are free to process a usage history description in various ways to generate a user profile. In all these aspects, the proposed system is different from existing systems, due mainly to the way of describing program and usage history information, and to the fact that it provides an exchangeable representation for interoperability. Further, the program descriptions may generate usage histories that are rather rich in content and structure. Furthermore, many different types of information can be associated with individual user actions, thereby allowing different implementations to include, configure, and customize the usage history data according to their needs without sacrificing interoperability.

The present inventors determined that the system should include the concept of a "UserAction," which provides a compact yet generic and flexible representation mechanism for collecting usage history information. The list of UserAction types supported by the proposed system may be defined in terms of a thesaurus, and can thus be extended relatively easily. The thesaurus can include a diverse set of items and cover a multitude of different applications. Thus the system may track a diverse set of user activities such as retail purchases, requests for pay-per-view programming, and the like. This approach provides a significance improvement over previously introduced methods which permit a very limited number of actions to be represented, and which cannot be easily extended to address various requirements.

The time information associated with each user action may be defined in terms of the general time, which denotes the time of occurrence in Coordinated Universal Time (UTC); media time, which denotes the time information that is encoded with a piece of multimedia content; or both. This functionality allows the time information that is associated with such actions as "fast forward" or "rewind" to be provided accurately.

The proposed framework facilitates the handling of a variety of multimedia content types, such as audio and video data, web pages, or content that is locally available to the consumer on his/her electronic equipment (e.g. a DVD player or Personal Video Recorder (PVR)). This functionality may be enabled by allowing any type of action and all major content categorization methods to be represented in the history.

The system likewise facilitates the referencing functionality to allow different information sources to be associated with a particular action. This aspect of the proposed system allows the reference to a specific part of relevant content descriptions (such as the description of a segment that the user reviews in slow motion). Furthermore, content material related to an action (such as the content of a hyperlink that the user follows; the web site of a product that the user purchases; the electronic program guide which provides a listing of the programs available for the given time period; etc.) can be explicitly specified by virtue of this property.

The system also allows usage history information to be captured at different levels of detail. For example, a usage history description can contain a detailed list of all the actions the user has performed over a period of time; or basic statistical information according to certain categorizations of content, such as language, country of origin, ratings, actors, etc.;

or both. This flexibility enables even systems with limited resources (e.g. in terms of available storage space) to generate standardized, exchangeable usage histories.

The structure of the usage history description scheme may be such that the captured usage history information can be arranged and presented in multiple different ways, in whatever form is most useful and efficient for the application that makes use of the history. For example, the usage history can be organized according to the type of user action (e.g. all "record" actions), program genre (e.g. usage history for sports programs), or even specific programs (e.g. usage history for the program "Seinfeld.")

The design may respect a user's privacy by allowing a user to hide his/her identity from being revealed to third parties when the usage history is circulated or distributed.

The description scheme-XML based framework enables the usage history descriptions to co-exist with other description schemes (e.g., those that are included in MPEG-7, for example, Usage Preferences Description Schemes) in the very same framework. These description schemes allow functionalities to the user so that the user can consume the content in ways that fits to his/her preferences, e.g., by consuming programs that are requested on the basis of a recurring preferred theme in the usage history.

The collected usage history information may be personalized at multiple levels of granularity; i.e. it may be defined for multiple users (such as an entire family), or for a single user. This feature expedites many applications; for example, more detailed program rating information can be collected; parents can track their children's viewing habits and more easily control their access to objectionable content; the collected information can be used to generate more personalized programming; etc.

The system is preferably free from relying on explicit user input; rather, it preferably functions in the background and collects data without prompting the user to fill out questionnaires or to respond to questions, which are often considered intrusive by users.

While explicit user input about viewing habits are not required (as noted previously), the system may support a configuration layer or tool that the user can manipulate to define the types of activity and/or content information which he/she would not want the system to monitor or track. The configuration utility allows the user to provide the system with a list of activities approved for collection, which implies that the user has the ultimate control over the type and extent of the information collected.

Figure 81:
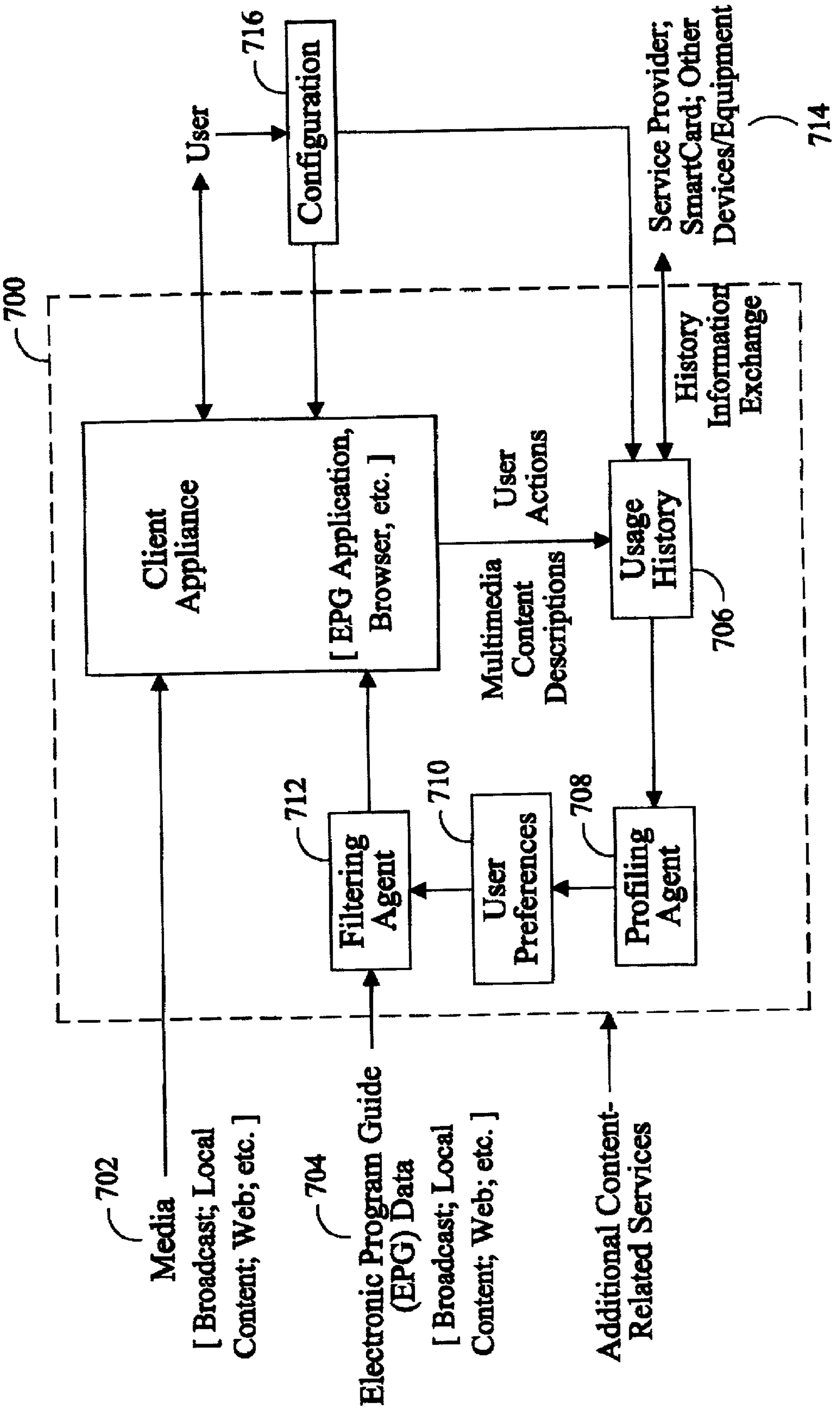
FIG. 81 is a context diagram for usage history.

The preferred context of the system is depicted in FIG. 81. The usage history process 700 has access to rich multimedia content descriptions, which may be available directly from broadcasters 702, electronic program guide providers 704, or other services or providers. These descriptions may contain meta data associated with the consumable media. A user's actions are monitored and linked to the content descriptions by the usage history module 706. The generated usage history information, typically from the usage history module 706, may be utilized by a local profiling agent 708 to generate user preferences 710, which may in turn be used by a filtering agent 712 to assist the viewer in making program selections. Alternatively, the usage history information may be exchanged with a service provider 714, or be transferred to other devices or equipment, where it can be processed in various ways. Since the usage history is preferably expressed in a standardized format, exchange of this information is expedited and carried out without the need for further translation or modification. Using the configuration utility 716 the user can control the types of activities and/or content that are monitored, and modify the settings of the usage history and/or client appliance settings 718. The configuration utility 716 enables the user to have control over the information collected about him/her.

Figure 82:
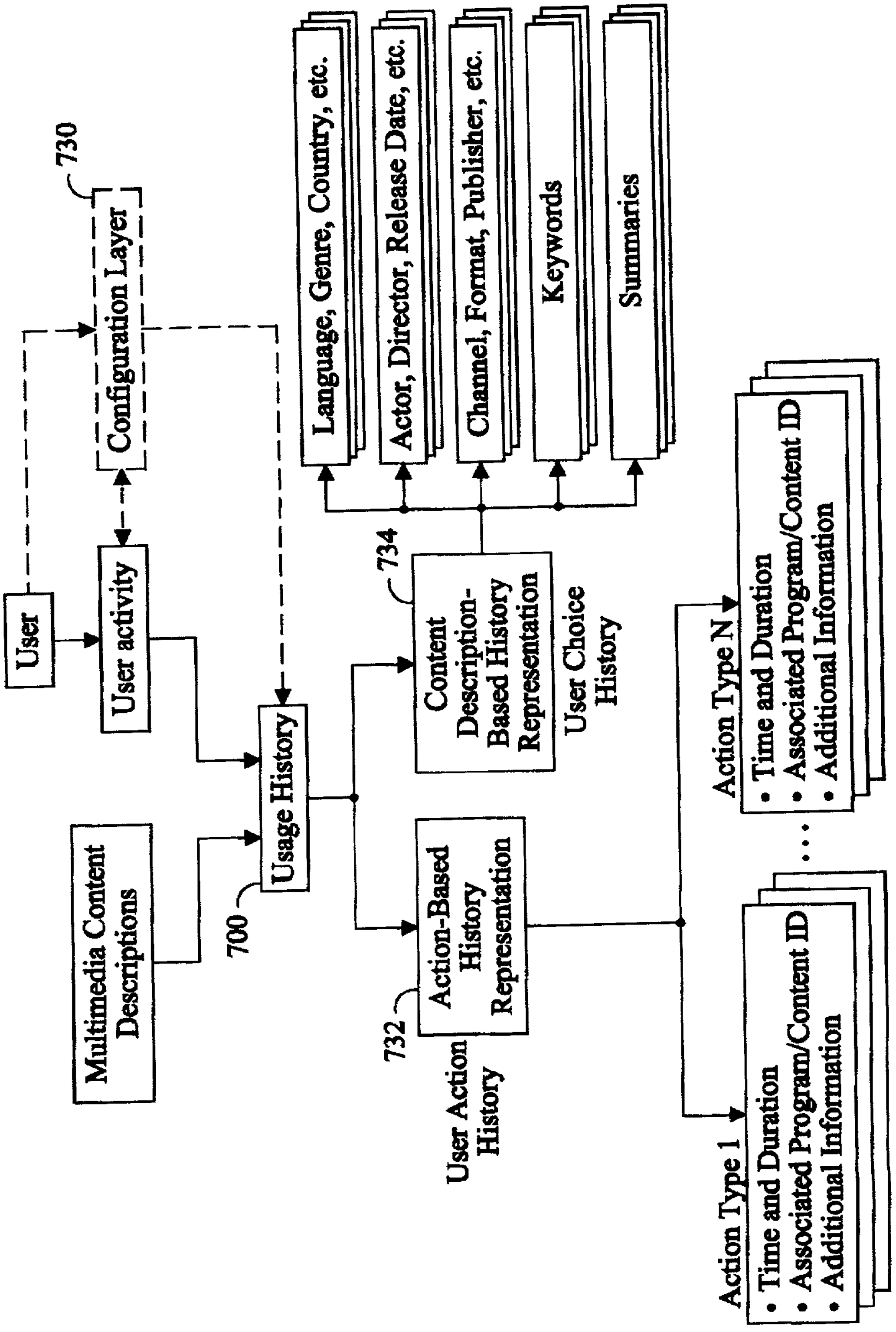
FIG. 82 is a diagram for the collection and representation of usage history information.

Referring to FIG. 82, the preferred structure of the proposed system for collection and representation of usage history information is shown. The usage history process 700 has access to descriptions of the multimedia content that is consumed by the user. These content descriptions are typically generated by one or more commercial providers, and may be transmitted with, or separately from, the media content. The usage history process also may possess the ability to monitor the actions that the user performs on a variety of devices, such as A/V equipment, computer terminals, set-top boxes, personal digital recorders, and the like. The monitored actions can correspond to switching between channels; changing the audio/video settings of a device; recording a program; following a hyperlink; and so on. The set of actions monitored and logged by the usage history module is specified by the user through the configuration layer 730, which restricts the usage history module to collect information about authorized activities only. When approved user activity is detected, usage history process 700 records, for the given action, the time of occurrence; the duration (if applicable); the unique identification of the program or multimedia content that the action is associated with; and/or additional content description information, in the UserActionHistory component 732. Additionally, usage history information can be represented as a categorized table using the UserChoiceHistory component 734. To achieve this, the content descriptions may be analyzed, and a predefined subset of these descriptions are recorded, preferably in tabulated format. The number of times a program or multimedia content of certain type (e.g. movies of "Western" genre; films that star "Kevin Costner," etc.) is consumed by the user is tracked by the UserChoiceHistory 734, which acts as a collection of categorized counters. In general, the usage history 700 and the configuration layer 730 are typically processes, whereas the other items typically only contain data.

Figure 83:
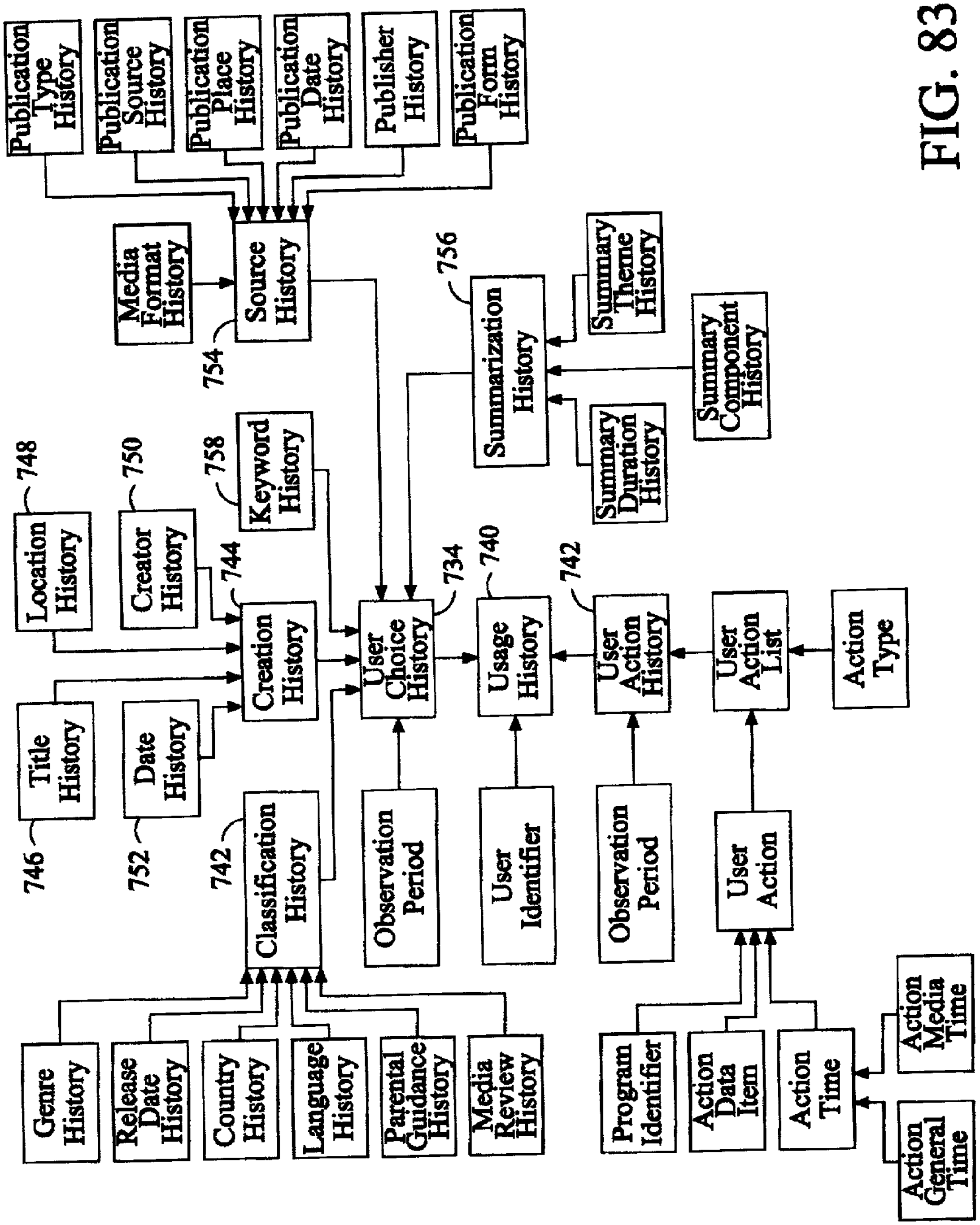
FIG. 83 is a diagram of entity-relationships for usage history description schemes.

Referring to FIG. 83, the description schemes may be arranged as follows:

(a) UsageHistory Description Scheme 740;

(b) UserActionHistory Description Scheme 732; and (c) UserChoiceHistory Description Scheme 734.

The UsageHistory Description Scheme 740 serves as a container description scheme for the UserActionHistory Description Scheme 732 and the UserChoiceHistory Description Scheme 734, and describes the consumption history information for a given period of time. The UserActionHistory Description Scheme 732 contains a list of the different types of actions performed by the user during this period of time. The UserChoiceHistory Description Scheme 734 contains the history of user choices with respect to the descriptions associated with the consumed content. FIG. 83 illustrates an entity-relationship diagram of the structure and interactions of these description schemes The UserActionHistory Description Scheme 732 contains multiple user action lists, each of which may provide a temporally ordered log of a specific type of action (such as "record" or "play"). Associated with every action are a program identifier that uniquely identifies the program or content for which the action is defined, and also one or more action data items, which can refer to any desired piece of the content description.

The UserChoiceHistory Description Scheme 734 provides a counter-like functionality for categorizing each content item based on its description data. The principal purpose of this component of the UsageHistory description scheme 740 is to provide an alternative history representation that specifies general statistical information about the consumed content. The statistical information may be constantly or periodically updated with the descriptions that accompany the content consumed by the user. This representation is especially useful for long observation periods, when the storage requirements for logging of all user actions and (if desired) associated meta data may become inhibiting for some systems. The UserChoiceHistory Description Scheme 734 may include multiple parts, such as for example, five different parts:

The Classification history 742, may provide a history of the user's choices with respect to classification descriptions of content; such as genre, language, and country of origin;

The Creation history 744, may provide a history of the user's choices with respect to creation descriptions of content, such as title 746, location 748, creator 750, date 752, and actor/director.

The Source history 754, may provide a history of the user's choices with respect to source (such as its publisher or distributor) and format (such as coding type) descriptions of the content.

The Summarization history 756, may provide the summarization-associated viewing/consumption history for a user.

The Keyword history 758, may provide a history of the keywords the user has used while viewing/consuming content.

The UserChoiceHistory Description Scheme 734 preferably shares a similar structure with UsagePreferences description scheme in MPEG-7 described in MPEG-7, ISO/IEC CD 15938-5 Information Technology—Multimedia Content Description Interface—Part 5 Multimedia Description Schemes, N3705, La Baule, France, October 2000, incorporated by reference herein. The principal motivation for the similarity is to simplify mapping of the available history information to the standardized user preference description. However, this similarity is not intended to constrain the set of applications for user choice history, since the information in the description is generic and flexible enough to be utilized in any way desirable. Moreover, the UserChoiceHistory may be structured in any suitable manner.

It should be understood that the UsageHistory Description Scheme 740 serves as a structure to link all the pieces of information together. Various scenarios in different application environments exist in which not all the various parts of the UsageHistory Description Scheme 740 are provided together in one description, but in other cases they may be. For example, in some cases only the UserActionHistory Description Scheme may be instantiated, or parts thereof, whereas in other only UserChoiceHistory Description Scheme might be utilized to describe the usage history, or parts thereof. Also, different descriptions may share description parts through the use of identifiers and identifier references. Different parts of the scheme proposed may exist standalone descriptions.

| Name | Definition |
|---|---|
| | UsageHistory DS Semantics |
| UsageHistoryType | Specifies user's multimedia content consumption history. |
| UserIdentifier | Identifies the individual for whom the usage history is provided specifies. This element is of type UserIdentifierType, which is described as part of UserPreferences DS, and contains the protected attribute. Thus the identity of the user is not disclosed unless this attribute is set to false. |
| UserActionHistory | Describes history of the actions the user has carried out during the observation period. See below for the specification of UserActionHistoryType. |

-continued

| Name | Definition |
|---|---|
| UserChoiceHistory | Describes a categorized listing of the set of choices the user has made while consuming content. See below for the specification of UserChoiceHistoryType. |
| AllowCollection | This attribute specifies whether the user allows his/her usage history data to be collected. The default value for allowCollection attribute is true. |
| | UserActionHistory DS Semantics |
| UserActionHistoryType | Specifies a history of the actions carried out by the user. |
| ObservationPeriod | Describes the time period(s) during which the associated history items have been recorded. Multiple instance of ObservationPeriod can be used to represent discontinuous time periods |
| UserActionList | Describes a list of actions of the same type, i.e. all actions in the UserActionList carry the same ActionType value. See below for the specification of UserActionListType. |
| protection | This attribute specifies whether the given UserActionHistory information is to be protected from 3rd parties, or disclosed freely. |
| | UserActionList DS Semantics |
| UserActionListType | Specifies a list of user actions, with associated semantics. |
| ActionType | Denotes the specific action performed by the user, such as "View," "Pause," "Play," etc. Defined as ControlledTermType to provide extensibility for different actions. All actions in an ActionList have the same ActionType. A list (dictionary) of possible values of ActionType is shown below. |
| UserAction | Characterizes a specific user action in the list. Each action is associated with a single program. See the specification of UserActionType shown below for more detail. |
| numInstances | Specifies the number of UserAction elements in a UserActionList. (e.g. 21 "Record" actions; 5 "View" actions; etc.). |
| totalDuration | he total time spent by the user during the observation period performing a specific action (e.g. 32 min for "Record" action). |

A list of actions that define an exemplary set of values for ActionType elements is shown. Each term has a numeric identifier, listed in the first column, and a textual label, listed in the second column. A description of each term is listed in the third column. This is one example of a thesaurus for ActionType of usage history.

| Term | Label | Description |
|---|---|---|
| 1 | Audio-Video | Actions Related to Audio and Video |
| 1.1 | PlayRecording | Play content from a recording |
| 1.2 | PlayStream | Play content from input stream |
| 1.3 | Record | Record input stream to local storage media |
| 1.4 | Preview | View or listen to a summary of the input stream |
| 1.5 | Pause | Pause the input stream |
| 1.6 | FastForward | Fast forward the input stream |
| 1.7 | Rewind | Rewind the input stream |
| 1.8 | SkipForward | Skip forward over a portion of the input stream |
| 1.9 | SkipBackward | Skip backward over a portion of the input stream |
| 1.10 | Mute | Turn sound off |
| 1.11 | VolumeUp | Increase volume |
| 1.12 | VolumeDown | Reduce volume |
| 1.13 | Loop/Repeat | Repeat/loop (part of) the input stream |
| 1.14 | Shuffle | Randomly select next track |
| 1.15 | SkipToEnd | Go to the beginning of the stream |
| 1.16 | SkipToStart | Go to the end of the stream |
| 1.17 | CopyCD | Copy all or part of a CD |

-continued

| Term | Label | Description |
|---|---|---|
| 2 | Video | Actions Related to Video |
| 2.1 | Zoom | Zoom (in) to the on-screen image or sequence |
| 2.2 | SlowMotion | View input stream in slow motion |
| 2.3 | CCOn | Closed caption is on |
| 2.4 | StepForward | Advance to next frame |
| 2.5 | StepBackward | Return to previous frame |
| 3 | Data | Actions Related to Miscellaneous Data |
| 3.1 | ClickThrough | Follow an available link |
| 3.2 | ScrollUp | Scroll up in a web page/composite page |
| 3.3 | ScrollDown | Scroll down in a web page/composite page |
| 3.4 | ViewGuide | View program/resource guide |
| 3.5 | SavePage | Save web page/composite page |
| 3.6 | PrintPage | Print web page/composite page |
| 3.7 | Search | Search the web or local resources |
| 3.8 | SubmitForm | Submit a form with requested information |
| 3.9 | SubmitQuery | Submit a query |
| 3.10 | Archive | Archive content to persistent local storage media |
| 4 | Commerce | Actions Related to Commerce |
| 4.1 | Buy | Purchase a product or item |
| 4.2 | AddToWishList | Designate a product or item as possible future purchasing item |
| 4.3 | AddToCart | Designate a product or item as potential immediate purchase item |

UserAction DS Semantics

UserAction DS Semantics

| Name | Definition |
|---|---|
| UserActionType | Specifies a detailed description of an action, with associated semantic. |
| ActionTime | Specifies the time that the action took place and, if applicable, its duration (e.g. for "Play," "Pause," etc.). The time of occurrence of the action can be described in two ways: by ActionMediaTime and/or by ActionGeneralTime. The duration of a UserAction refers to the duration in terms of the media time, which is identical to the duration in UTC for a large number of action types, but may be different for such action types as "Repeat" or "FastForward." |
| ActionMediaTime | Action time relative to the time reference established for the given media. This time referencing method is useful for such action items as "Repeat" or "FastForward," and for manipulating content on the user's local system (such as personal CDs or DVDs). |
| ActionGeneralTime | Action time relative to Coordinated Universal Time (UTC) in the Gregorian date/time format. |
| ProgramIdentifier | Unique identifier of the program that is associated with the given action. Each Action is associated with a single program and, consequently, a single ProgramIdentifier. |
| ActionDataItem | Refers to a specific part of the description of the AV content, or to other material related to the action (e.g. the URL the user chooses to follow in an enhanced TV application). Shall refer to an id attribute of an AV content description instance. |

UserAction DS Semantics

| Name | Definition |
|---|---|
| UserActionType | Specifies a detailed description of an action, with associated semantics. |
| ActionTime | Specifies the time that the action took place and, if applicable, its duration (e.g. for "Play," "Pause," etc.). The time of occurrence of the action can be described in two ways: by ActionMediaTime and/or by ActionGeneralTime. The duration of a UserAction refers to the duration in terms of the media time, which is identical to the duration in UTC for a large number of action types, but may be different for such action types as "Repeat" or "FastForward." |
| ActionMediaTime | Action time relative to the time reference established for the given media. This time referencing method is useful for such action items as "Repeat" or "FastForward," and for manipulating content on the user's local system (such as personal CDs or DVDs). |
| ActionGeneralTime | Action time relative to Coordinated Universal Time (UTC) in the Gregorian date/time format. |
| ProgramIdentifier | Unique identifier of the program that is associated with the given action. Each Action is associated with a single program and, consequently, a single ProgramIdentifier. |
| ActionDataItem | Refers to a specific part of the description of the AV content, or to other material related to the action (e.g. the URL the user chooses to follow in an enhanced TV application). Shall refer to an id attribute of an AV content description instance. |

UserChoiceHistory DS Semantics

| Name | Definition |
|---|---|
| UserChoiceHistoryType | Specifies a categorized listing of the set of choices the user has made while consuming content. |
| ObservationPeriod | Describes the time period(s) during which the associated history items have been recorded. Multiple instance of ObservationPeriod can be used to represent discontinuous time periods. |
| ClassificationHistory | Describes history of the user's choices with respect to classification descriptions of content. |
| CreationHistory | Describes history of the user's choices with respect to creation descriptions of content. |
| SourceHistory | Describes history of the user's choices with respect to source descriptions of the content, such as its publisher or distributor. |
| KeywordHistory | Describes history of the keywords the user has used while viewing/consuming content. |
| SummarizationHistory | Describes history of the media summaries the user has consumed during the observation period. |
| numTotalInstance | Total number of content items/descriptions considered in UserChoiceHistory |
| protection | This attribute specifies whether the given UserChoiceHistory information is to be protected from 3rd parties, or disclosed freely |

ClassificationHistory DS Semantics

| Name | Definition |
|---|---|
| ClassificationHistory-Type | Specifies history of the user's choices with respect to classification descriptions of content. |
| CountryHistory | Describes usage history with respect to country of origin of the content. The attributes numInstances and totalDuration specify usage statistics for a specific country instance. |

-continued

ClassificationHistory DS Semantics

| Name | Definition |
|---|---|
| ReleaseDateHistory | Describes usage history with respect to date of release of the content. The attributes numInstances and totalDuration specify usage statistics for a specific release date instance. |
| LanguageHistory | Describes usage history with respect to language of the content. The attributes numInstances and totalDuration specify usage statistics for a specific language instance. |
| GenreHistory | Describes usage history with respect to genre of the content. The attributes numInstances and totalDuration specify usage statistics for a specific genre instance. |
| SubjectHistory | Describes usage history with respect to subject of the content. The subject classifies content from a point of view of types of program, without considering genre classification. The attributes numInstances and totalDuration specify usage statistics for a specific subject instance. |
| MediaReviewHistoryType | A data type for description of usage history with respect to reviews of the content, with associated semantics: Reviewer: Reviewers/critics of the content. RatingCriterion: The rating criterion used in the review. RatingCriterion includes CriterionName and the rating scale (form WorstRating to BestRating RatingValue: The rating value assigned to the content. numInstances/totalDuration- Describe the usage statistics associated with the given Rating Value. numInstances/totalDuration: Describe the usage statistics associated with the given MediaReviewHistory. id: ID of the MediaReviewHistory instance. |
| ParentalGuidance-History | Describes user history with respect to parental guidance ratings of the content. The attributes numInstances and totalDuration specify usage statistics for a specific parental guidance instance. |
| numTotalInstances | Total number of content items for which ClassificationHistory information has been generated. |

SourceHistory DS Semantics

| Name | Definition |
|---|---|
| SourceHistoryType | Specifies history of the user's choices with respect to source (such as its publisher or distributor) and format (such as coding type) descriptions of the content. |
| PublicationTypeHistory | Describes usage history with respect to publication medium of content, such as satellite broadcast, CD, etc. The attributes numInstances and totalDuration specify usage statistics for a specific publication type instance. |
| PublicationSource-History | Describes usage history with respect to publication source of the content, such as broadcast channels. The attributes numInstances and totalDuration specify usage statistics for a specific publication channel instance. |
| PublicationPlace-History | Describes usage history with respect to the place content is distributed from. The attributes numInstances and totalDuration specify usage statistics for a specific publication place instance. |

-continued

SourceHistory DS Semantics

| Name | Definition |
|---|---|
| PublicationDateHistory | Describes usage history with respect to time/date of content distribution. The attributes numInstances and totalDuration specify usage statistics for a specific publication date instance. |
| PublisherHistory | Describes usage history with respect to publisher or distributor of content. The attributes numInstances and totalDuration specify usage statistics for a specific publisher instance. |
| PublicationFormHistory | Describes usage history with respect to the form in which content in available. The attributes numInstances and totalDuration specify usage statistics for a specific publication form instance. |
| MediaFormatHistory | Describes usage history with respect to format of the content. The format specifiers considered are file format; content medium; system; video and audio coding format; aspect ratio; color appearance; and audio presentation. The attributes numInstances and totalDuration specify usage statistics for a specific media format instance. |
| numTotalInstances | Total number of content items for which SourceHistory information has been generated. |

SummarizationHistory DS Semantics

| Name | Definition |
|---|---|
| KeywordHistoryType | Specifies history of the keywords the user has used while viewing/consuming content. |
| KeywordItem | Describes a specific keyword instance, and the statistical information associated with it (through numInstances and totalDuration attributes |
| numTotalInstances | Total number of content items for which KeywordHistory information has been generated |

| Name | Definition |
|---|---|
| Summarization-History-Type | Specifies summarization-associated viewing/consumption history for a user. |
| Summary-Component-History | Describes the list of summary components consumed by the user (such as keyFrames, keyVideoClips, etc.) and the statistics associated with each, as defined by. |
| SummaryTheme-History | Describes the list of textual themes associated with the summaries consumed by the user, as well as the statistics for each theme, as defined by the attributes numInstances and totalDuration. |
| Summary-Duration-History | Describes the duration information for the summaries consumed by the user. The associated elements of this complex type are: |
| MinNumSummary-Frames | Size of the shortest/smallest key frame-based summary consumed by the user (stated in number of frames). |
| MinSummary-Duration | Temporal duration of the shortest summary consumed by the user. |
| MaxNumSummary-Frames | Size of the longest/largest key frame-based summary consumed by the user (stated in number of frames) |
| MaxSummary-Duration | Temporal duration of the longest summary consumed by the user. |
| AvgNumSummary-Frames | Average size of the key frame-based summaries consumed by the user (stated in number of frames). |

-continued

| Name | Definition |
|---|---|
| AvgSummary-Duration | Average temporal duration of the summaries consumed by the user. |
| numTotal-Instances | Total number of content items for which SummzarizationHistory information has been generated. |

The following example highlights instantiations of the various UsageHistory description schemes. The example contains UserActionHistory and UserChoiceHistory information collected for 12 hours over two days.

The example illustrates how the functionality provided by the ActionMediaTime and ActionGeneralTime elements are different for some user actions such as “Rewind,” “FastForward” and “SlowMotion.” For example, as shown in the example, a “FastForward” action that lasts only a few seconds in terms of general time may actually correspond to several minutes in terms of the media time base. Relying only on the general time to represent the time of occurrence and duration of an action may lead to inconsistencies and ambiguity. Thus the proposed syntax supports representation of ActionTime in terms of both media time and general time.

```
<UsageHistory id=“usage-history-001” allowCollection=“true”>
 <UserIdentifier protected=“true”
  <UserName xml:lang=“en”>John Doe</UserName>
  </UserIdentifier>
  <UserActionHistory id=“useraction-history-001” protection=“false”>
  <ObservationPeriod>
    <TimePoint>2000-10-09T18:00-08:00</TimePoint>
    <Duration>PT6H</Duration>
  </ObservationPeriod>
  <ObservationPeriod>
    <TimePoint>2000-10-10T18:00-08:00</TimePoint>
    <Duration>PT6H</Duration>
  </ObservationPeriod>
  <UserActionList id=“ua-list-001”
    numInstances=“2” totalDuration=“P2H30M”>
    <ActionType><Label>Record</Label></ActionType>
    <UserAction> ... </UserAction>
    <UserAction> ... </UserAction>
  </UserActionList>
  <UserActionList id=“ua-list-002”
    numInstances=“25” totalDuration=“P7H02M”>
    <ActionType><Label>View</Label></ActionType>
    <UserAction>
      <ProgramIdentifier>
      <IDOrganization>
      <FreeTerm>AnIDOrg</FreeTerm>
      </IDOrganization>
      <IDName>
       <FreeTerm>AnIDName</FreeTerm>
      </IDName>
      <UniqueID>02-mnf-100900</UniqueID>
      </ProgramIdentifier>
    </UserAction>
    <UserAction>
      <ProgramIdentifier>
      <IDOrganization>
       <FreeTerm>AnIDOrg</FreeTerm>
      </IDOrganization>
      <IDName>
       <FreeTerm>AnIDName</FreeTerm>
      </IDName>
      <UniqueID>02-mnf-100900</UniqueID>
      <ProgramIdentifier>
      <ActionDataItem>
      <href>
       www.abc.com/content/mnf/100900/mnf-
  stream.xml#segment_145
      </href>
      </ActionDataItem>
    </UserAction>
    . . .
  </UserActionList>
  <UserActionList id=“ual-003”
    numInstances=“3” totalDuration=“PT4M10S”>
    <ActionType><Label>FastForWard</Label></ActionType>
    <UserAction>
    <ActionTime>
      <ActionMediaTime>
      <MediaTimePoint>2000-10-
        09T19:10:12</MediaTimePoint>
      <MediaDuration>PT1M45S</MediaDuration>
      </ActionMediaTime>
      <ActionGeneralTime>
      <TimePoint>2000-10-09T19:10:12-08:00</TimePoint>
      <Duration>PT8S</Duration>
      </ActionGeneralTime>
    </ActionTime>
    <ProgramIdentifier>
      <IDOrganization>
       <FreeTerm>AnIDOrg</FreeTerm>
      </IDOrganization>
      <IDName>
       <FreeTerm>AnIDName</FreeTerm>
      </IDName>
      <UniqueID>02-mnf-100900<UniqueID>
      <ProgramIdentifier>
      <ActionDataItem>
      <href>
       www.abc.com/content/mnf/100900/mnf-
  stream.xml#comm_break_17
      </href>
      </ActionDataItem>
    </UserAction>
    <UserAction>
      <ActionTime>
      <ActionMediaTime>
      <MediaTimePoint>2000-10-
  10T18:16:08</MediaTimePoint>
      <MediaDuration>PT1M35S</MediaDuration>
      </ActionMediaTime>
      <ActionGeneralTime>
      <TimePoint>2000-10-10T18:16:08-08:00</TimePoint>
      <Duration>PT7S</Duration>
      </ActionGeneralTime>
      </ActionTime>
      <ProgramIdentifier>
      <IDOrganization>
       <FreeTerm>AnIDOrg</FreeTerm>
      </IDOrganization>
      <IDName>
       <FreeTerm>AnIDName</FreeTerm>
      </IDName>
      <UniqueID>01-wnpj-101000</UniqueID>
      </ProgramIdentifier>
      <ActionDataItem>
      <href>
       www.abc.com/content/news/101000/wnpj.xml#news-item-
      </href>
      </ActionDataItem>
    </UserAction>
    <UserAction>
    <ActionTime>
      <ActionMediaTime>
      <MediaTimePoint>2000-10-
        10T20:05:34</MediaTimePoint>
      <MediaDuration>PT1M</MediaDuration>
      </ActionMediaTime>
      <ActionGeneralTime>
      <TimePoint>2000-10-10T20:05:34-08:00</TimePoint>
      <Duration>PT5S</Duration>
      </ActionGeneralTime>
      </ActionTime>
      <ProgramIdentifier>
      <IDOrganization>
       <FreeTerm>AnIDOrg</FreeTerm>
      </IDOrganization>
      <IDName>
       <FreeTerm>AnIDName</FreeTerm>
      </IDName>
```

-continued

```
        <UniqueID>03-tss-000063</UniqueID>
        <ProgramIdentifier>
        <ActionDataItem>
        <href>
         www.fox.com/xml/that70sshow/063/tss-063.xml#break_2
        </href
        </ActionDataItem>
      </UserAction>
    </UserActionList>
    <UserActionList id="ual-004" numInstances="1">
      <ActionType>
<Label>ClickThrough</Label>
      </ActionType>
      <UserAction>
        <ActionTime>
        <ActionGeneralTime>
         <TimePoint>2000-10-09T18:48:01-08:00</TimePoint>
        </ActionGeneralTime>
        </ActionTime>
        <ProgramIdentifier>
        <IDOrganization>
         <FreeTerm>AnIDOrg</FreeTerm>
        </IDOrganization>
        <IDName>
         <FreeTerm>AnIDName</FreeTerm>
        </IDName>
        <UniqueID>02-mnf-100900</UniqueID>
        </ProgramIdentifier>
        <ActionDataItem>
        <href>
         www.abc.com/content/mnf/100900/mnf-
    stream.xml#related_media_ID_12
        </href>
        </ActionDataItem>
        </UserAction>
      </UserActionList>
    </UserActionHistory>
    <UserChoiceHistory id="userchoice-history-001" protection="false">
      <ObservationPeriod>
        <TimePoint>2000-10-09T18:00-08:00</TimePoint>
        <Duration>PT6H<Duration>
      </ObservationPeriod>
      <ObservationPeriod>
        <TimePoint>2000-10-10T18:00-08:00</TimePoint>
        <Duration>PT6H</Duration>
      </ObservationPeriod>
      <ClassificationHistory id="classification-hist-001"
        numTotalInstances="24">
        <CountryHistory id="country-hist-001"
          numInstances="15"
            totalDuration="PT7H22M>us</CountryHistory>
        ...
        <GenreHistory id="genre-hist-001" numInstances="7"
          totalDuration="PT2H23M" term="1.2.3"
                scheme="AScheme">
          <Label xml:lang="en">Football</Label>
        </GenreHistory>
        <GenreHistory id="genre-hist-002" numInstances="4"
          totalDuration="PT1H46M" term="2.4" scheme="AScheme">
          <Label xml:lang="en">Sitcom</Label>
        </GenreHistory>
        ...
      </ClassificationHistory>
      <CreationHistory id="creation-hist-001"
        numTotalInstances="26">
       <TitleHistory xml:lang="en" id="title-hist-001" numInstances="26"
          totalDuration="PT2H23M">Monday Night
              Football</TitleHistory>
        ...
        <CreatorHistory id="creator-hist-001" numInstances="6"
          totalDuration="PT56M">
          <Role term="3.5.2" scheme="AnotherScheme">
          <Label>Actor</Label>
          </Role>
          <Person>
          <Name xml:lang>
           <GivenName>Jason Alexander</GivenName>
          </Name>
          </Person>
          <Character><GivenName>George
```

-continued

```
            Costanza</GivenName></Character>
        </CreatorHistory>
        ...
      </CreationHistory>
      <SourceHistory id="source-hist-001"
        numTotalInstances="22">
        ...
        <PublisherHistory xsi:type="OrganizationType"
          id="publisher-hist-001" numInstances="3"
          totalDuration="PT4H42M">
          <Name xml:lang="en">ABC</Name>
        </PublisherHistory>
        ...
        </SourceHistory>
      ...
    </UserChoiceHistory>
</UsageHistory>
```

The terms and expressions that have been employed in the foregoing specification are sued as terms of description and not of limitation, and there is no intention, in the use of such terms and expressions, of excluding equivalents of the features shown and described or portions thereof, it being recognized that the scope of the invention is defined and limited only by the claims that follow.

The invention claimed is:

1. In combination with an audiovisual information management system resident on an electronic device having a memory, a usage history description scheme for at least one of an audio, an image, and a video comprising a plurality of frames, said usage history description scheme comprising:

(a) said usage history description scheme stored on a mobile storage device selectively insertable into a multimedia system, and containing information about a user with respect to said at least one of said audio, image, and video based upon previous usage of said at least one of said audio, image, and video, said usage history description scheme used by said system to automatically periodically update a usage preference description of said user on said mobile storage device, while said mobile storage device is inserted in said multimedia system;

(b) content descriptions referenced by said usage history description scheme; and (c) said system including referencing functionality permitting said usage history description scheme to reference selected portions of selected said content descriptions.

2. The combination of claim 1 wherein said selected portion is to a segment of a video that the user reviews in slow motion.

3. The combination of claim 1 wherein said selected portion is to a hyperlink.

4. The combination of claim 1 wherein said selected portion is to a web site.

5. The combination of claim 1 wherein said selected portion is to an electronic program guide.

6. The method of claim 1 wherein said information is processed to determine preferences of said user.

7. In combination with an audiovisual information management system resident on an electronic device having a memory, a usage history description scheme for at least one of an audio, an image, and a video comprising a plurality of frames, said usage history description scheme comprising:

(a) said usage history description scheme stored on a mobile storage device selectively insertable into a multimedia system, and containing information about a user with respect to said at least one of said audio, image, and video based upon previous usage of said at least one of said audio, image, and video where said usage history description scheme is used by said audiovisual information management system to update a usage preference description scheme, and said usage history description scheme is not used by said audiovisual information management system to do any actions selected from the list of (i) selecting said at least one of an audio, an image, and a video; (ii) filtering said at least one of an audio, an image, and a video; and (iii) searching at least one of an audio, an image, and a video; and (b) said system capturing content for said usage history description scheme at a selectable level of detail.

8. The combination of claim 7 wherein said level of detail is based, at least in part, on the capabilities of said system.

9. The combination of claim 8 wherein said different said selectable level of detail is suitable for interchangeability with other such systems.

10. The combination of claim 7 wherein one of said selectable level captures all user actions.

11. The combination of claim 7 wherein one of said selectable level captures statistical information regarding user actions.

12. The combination of claim 7 wherein said usage history description scheme describes information of said user with respect to said audio.

13. The combination of claim 7 wherein said usage history description scheme describes information of said user with respect to said image.

14. The combination of claim 7 wherein said usage history description scheme describes information of said user with respect to said video.

15. The method of claim 7 wherein said information is processed to determine preferences of said user.

16. In combination with an audiovisual information management system resident on an electronic device having a memory, a usage history description scheme for at least one of an audio, an image, and a video comprising a plurality of frames, said usage history description scheme comprising:

(a) information about a user with respect to said at least one of said audio, image, and video based upon previous usage of said at least one of said audio, image, and video; and (b) said system permitting a user to selectively define multiple levels of granularity by which the content of said usage history description scheme is automatically accumulated, wherein the content of said usage history description scheme is used to update a usage preference description scheme.

17. The combination of claim 16 wherein said levels of granularity are defined for multiple users.

18. The combination of claim 16 wherein said levels of granularity are used to generate personalized programming.

19. The combination of claim 16 wherein said usage history description scheme describes information of said user with respect to said audio.

20. The combination of claim 16 wherein said usage history description scheme describes information of said user with respect to said image.

21. The combination of claim 16 wherein said usage history description scheme describes information of said user with respect to said video.

22. The method of claim 16 wherein said information is processed to determine preferences of said user.

23. The method of claim 16 wherein said information is processed to determine preferences of said user.

24. A method of using usage history information describing at least one of an audio, an image, and a video comprising a plurality of frames comprising:

(a) providing said usage history information stored on a mobile storage device selectively insertable into a multimedia system, and containing information about a user with respect to said at least one of said audio, image, and video based upon previous usage of said at least one of said audio, image, and video; and (b) selectively defining multiple levels of granularity by which the content of said usage history description scheme may be automatically accumulated and stored on said mobile storage device while inserted in said multimedia system.

25. The method of claim 24 wherein said levels of granularity are defined for multiple users.

26. The method of claim 24 wherein said levels of granularity are used to generate personalized programming.

27. The method of claim 24 wherein said content is used by parents to track their children's viewing habits.

28. The method of claim 27 wherein said tracking is used to control the children's access to objectionable content.

29. The method of claim 24 wherein said information is processed to determine preferences of said user.

* * * * *

UNITED STATES PATENT AND TRADEMARK OFFICE

CERTIFICATE OF CORRECTION

PATENT NO. : 8,020,183 B2
APPLICATION NO. : 09/823377
DATED : September 13, 2011
INVENTOR(S) : Ahmet M. Ferman et al.

It is certified that error appears in the above-identified patent and that said Letters Patent is hereby corrected as shown below:

Col. 3, Line 21

Figure 44A:
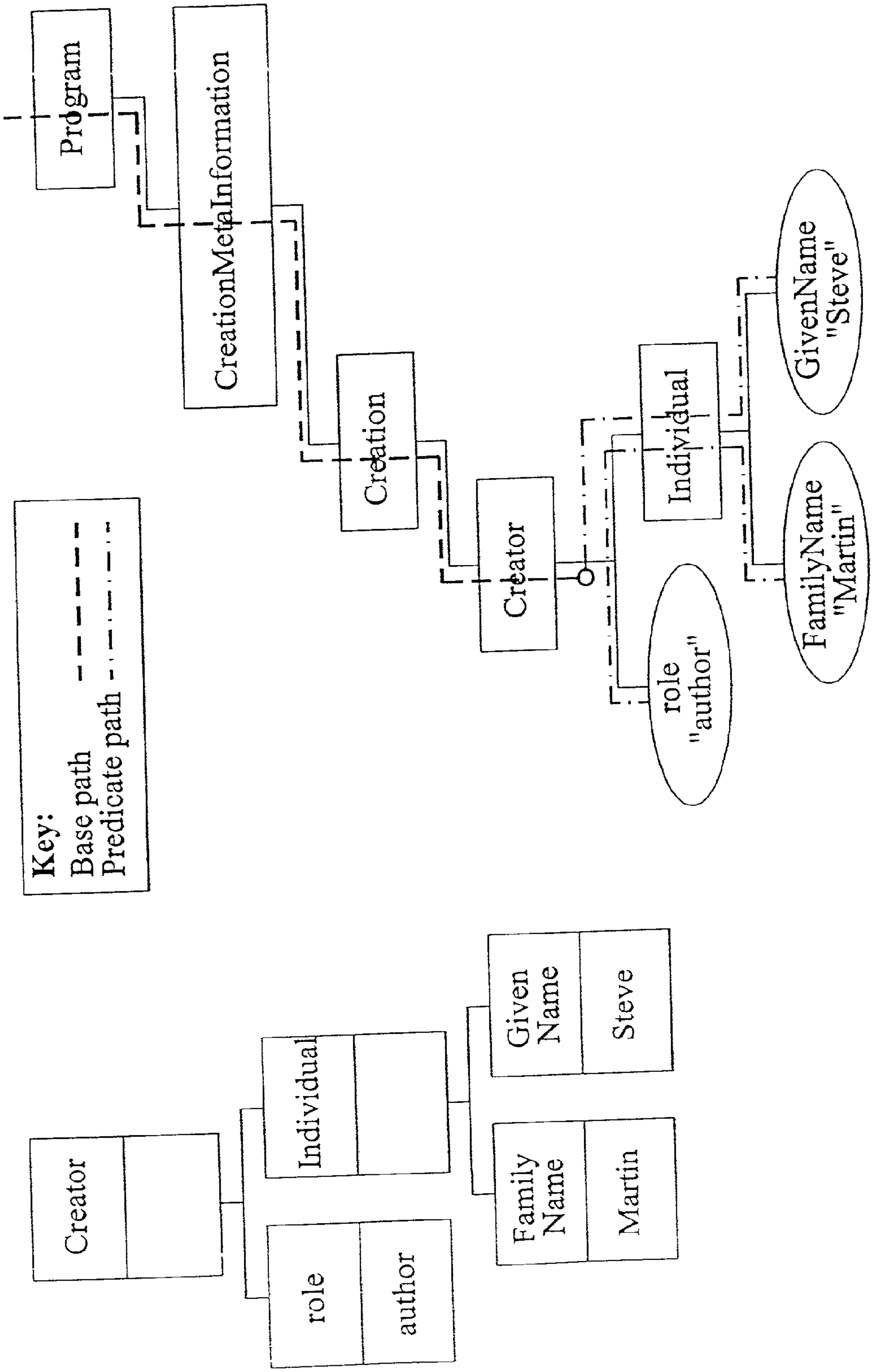
FIGS. 44A and 44B are an exemplary embodiment of constrained-AND combinatorial operator.
Figure 44B:
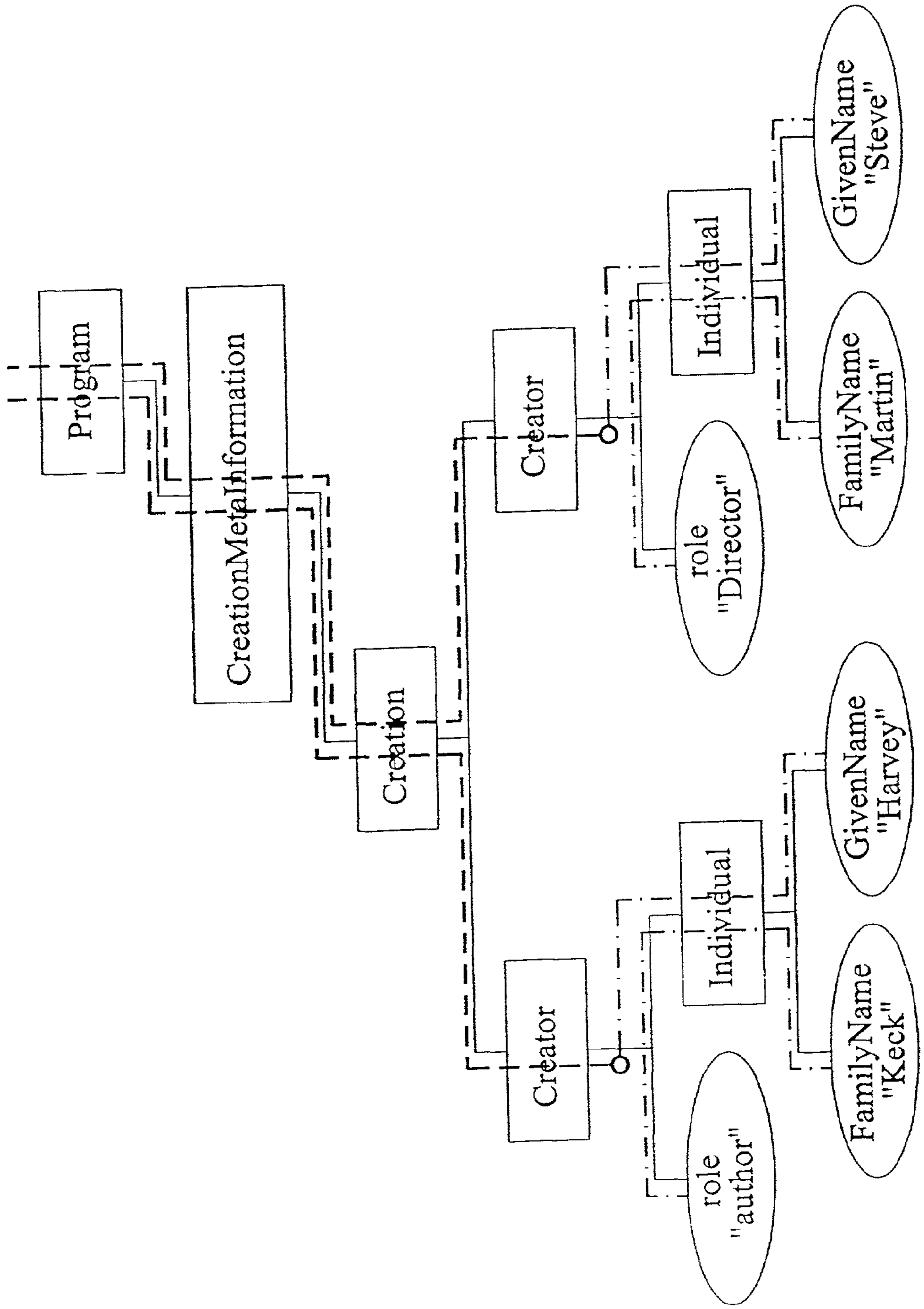

Change: “combinatorial operator” to read: --combinatorial operator.--; and “FIGS. 44A and 44B” should start a new paragraph.

Col. 48, Line 43

Change: “Test a AND b” to read: --Test=a AND b--.

Col. 58, Line 33

Change: “SummarizationHistory DS Semantics” to read: --KeywordHistory DS Semantics--.

Col. 58, Line 44

Insert subheading: --SummarizationHistory DS Semantics--.

Col. 60, Line 23

Change “<ProgramIdentifier>” to read: --</ProgramIdentifier>--.

Col. 61, Line 3

Change “<ProgramIdentifier>” to read: --</ProgramIdentifier>--.

Col. 63, Line 44-45

After “define” insert: --the content of said usage history description scheme at--.

Col. 64, Line 33

After “multimedia system” insert: --at multiple levels of granularity--.

Signed and Sealed this
Twentieth Day of March, 2012

David J. Kappos
*Director of the United States Patent and Trademark Office*